US011546929B2

United States Patent
Cao et al.

(10) Patent No.: US 11,546,929 B2
(45) Date of Patent: Jan. 3, 2023

(54) SYSTEMS AND METHODS FOR SIGNALING FOR SEMI-STATIC CONFIGURATION IN GRANT-FREE UPLINK TRANSMISSIONS

(71) Applicants: Yu Cao, Kanata (CA); Liqing Zhang, Ottawa (CA); Jianglei Ma, Ottawa (CA)

(72) Inventors: Yu Cao, Kanata (CA); Liqing Zhang, Ottawa (CA); Jianglei Ma, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/830,928

(22) Filed: Dec. 4, 2017

(65) Prior Publication Data

US 2018/0199359 A1    Jul. 12, 2018

Related U.S. Application Data

(60) Provisional application No. 62/447,906, filed on Jan. 18, 2017, provisional application No. 62/447,437, (Continued)

(51) Int. Cl.
*H04W 72/12* (2009.01)
*H04L 1/18* (2006.01)
(Continued)

(52) U.S. Cl.
CPC ......... *H04W 72/1268* (2013.01); *H04L 1/189* (2013.01); *H04L 1/1816* (2013.01); (Continued)

(58) Field of Classification Search
CPC .............. H04W 72/042; H04W 72/04; H04W 72/1289; H04W 72/02; H04W 72/1268; (Continued)

(56) References Cited

U.S. PATENT DOCUMENTS 9,750,056 B2    8/2017  Au
9,775,141 B2    9/2017  Nimbalker et al.
(Continued)

FOREIGN PATENT DOCUMENTS

CN    101816133 A    8/2010
CN    102595605 A    7/2012
(Continued)

OTHER PUBLICATIONS

3GPP TSG RAN WG1 Meeting #86bis R1-1609398, "Uplink Grant-free Access for 5G mMTC", Lenovo, Oct. 10-15, 2016, total 4 pages.
(Continued)

*Primary Examiner* — Khaled M Kassim
*Assistant Examiner* — Najeeb Ansari

(57) ABSTRACT

Methods and systems are provided for signaling for semi-static configuration in grant free uplink transmissions. Radio resource control (RRC) signaling is used to provide information from a base station to a user equipment (UE) that configure the grant free transmission resource to be used by the UE. In some implementations, the RRC signaling may be used in conjunction with system information that is transmitted to all UEs and/or Downlink Control Information (DCI) that the UE needs to access subsequent to the RRC signaling. In some implementations, the DCI includes an activation or deactivation indicator that the UE monitors to determine when the UE is allowed to transmit to the BS or should stop transmitting. Implementations allow for grant free transmission resources to be configured on an individual user based and a group basis.

36 Claims, 26 Drawing Sheets

Related U.S. Application Data filed on Jan. 17, 2017, provisional application No. 62/444,210, filed on Jan. 9, 2017.

(51) Int. Cl.

| | | |
|---|---|---|
| *H04W 28/04* | (2009.01) | |
| *H04W 72/14* | (2009.01) | |
| *H04W 74/00* | (2009.01) | |
| *H04L 5/00* | (2006.01) | |
| *H04W 72/04* | (2009.01) | |
| *H04L 1/00* | (2006.01) | |

(52) U.S. Cl.
CPC .......... *H04L 1/1896* (2013.01); *H04L 5/0012* (2013.01); *H04L 5/0044* (2013.01); *H04L 5/0051* (2013.01); *H04L 5/0053* (2013.01); *H04L 5/0094* (2013.01); *H04L 5/0096* (2013.01); *H04W 28/04* (2013.01); *H04W 72/1289* (2013.01); *H04W 72/14* (2013.01); *H04W 74/006* (2013.01); *H04L 1/0079* (2013.01); *H04L 5/0007* (2013.01); *H04L 5/0055* (2013.01); *H04W 72/044* (2013.01); *H04W 72/0486* (2013.01)

(58) Field of Classification Search
CPC ............. H04W 72/14; H04W 72/0413; H04W 72/0446; H04W 74/006; H04W 48/12
See application file for complete search history.

(56) References Cited

U.S. PATENT DOCUMENTS

| | | | |
|---|---|---|---|
| 10,645,730 | B2 | 5/2020 | Cao et al. |
| 2010/0254329 | A1 | 10/2010 | Pan et al. |
| 2010/0284363 | A1 | 11/2010 | Ahn et al. |
| 2011/0250918 | A1 | 10/2011 | Jen |
| 2012/0014330 | A1 | 1/2012 | Damnjanovic et al. |
| 2012/0057449 | A1 | 3/2012 | Takaoka et al. |
| 2013/0142098 | A1* | 6/2013 | Kwon .................... H04W 52/04 370/311 |
| 2014/0078972 | A1 | 3/2014 | Sorrentino |
| 2014/0192767 | A1 | 7/2014 | Au et al. |
| 2014/0254544 | A1* | 9/2014 | Kar Kin Au .......... H04L 5/0033 370/330 |
| 2014/0313997 | A1 | 10/2014 | Xu et al. |
| 2015/0016377 | A1 | 1/2015 | Kim et al. |
| 2015/0257173 | A1 | 9/2015 | You et al. |
| 2015/0341922 | A1 | 11/2015 | Han et al. |
| 2016/0095137 | A1 | 3/2016 | Chen et al. |
| 2016/0374089 | A1 | 12/2016 | Kim et al. |
| 2017/0019894 | A1 | 1/2017 | Nimbalker et al. |
| 2017/0034845 | A1* | 2/2017 | Liu ....................... H04L 1/0003 |
| 2017/0111894 | A1 | 4/2017 | Wanshi et al. |
| 2017/0202009 | A1 | 7/2017 | Kim et al. |
| 2017/0214442 | A1 | 7/2017 | Chae et al. |
| 2017/0215201 | A1 | 7/2017 | Kim et al. |
| 2017/0367110 | A1 | 12/2017 | Li et al. |
| 2017/0367116 | A1* | 12/2017 | Li ........................... H04W 74/08 |
| 2018/0042016 | A1 | 2/2018 | Babaei et al. |
| 2018/0092125 | A1* | 3/2018 | Sun ....................... H04W 74/02 |
| 2018/0098360 | A1* | 4/2018 | Vos ......................... H04W 4/70 |
| 2018/0124813 | A1* | 5/2018 | Li ........................ H04W 72/0446 |
| 2018/0139778 | A1* | 5/2018 | Chou .................... H04W 76/27 |
| 2018/0146402 | A1* | 5/2018 | Seo ....................... H04W 24/10 |
| 2018/0146495 | A1 | 5/2018 | Xu et al. |
| 2018/0183551 | A1 | 6/2018 | Chou et al. |
| 2018/0199334 | A1 | 7/2018 | Ying et al. |
| 2019/0037442 | A1* | 1/2019 | Yi ....................... H04W 28/065 |
| 2019/0268924 | A1 | 8/2019 | Kim et al. |
| 2019/0320446 | A1* | 10/2019 | Li ....................... H04W 72/1252 |

FOREIGN PATENT DOCUMENTS

| | | |
|---|---|---|
| CN | 102668673 A | 9/2012 |
| CN | 104838713 A | 8/2015 |
| CN | 105284172 A | 1/2016 |
| CN | 105323858 A | 2/2016 |
| CN | 105338640 A | 2/2016 |
| CN | 106507486 A | 3/2017 |
| CN | 106507497 A | 3/2017 |
| CN | 106550439 A | 3/2017 |
| EP | 3340726 A1 | 6/2018 |
| EP | 3050369 B1 | 11/2018 |
| JP | 2020530701 A | 10/2020 |
| KR | 20120105458 A | 9/2012 |
| RU | 2522175 C2 | 7/2014 |
| WO | 2014135126 A1 | 9/2014 |
| WO | 2016032376 A1 | 3/2016 |
| WO | 2016167828 A1 | 10/2016 |
| WO | 2016171046 A1 | 10/2016 |
| WO | 2016182533 A1 | 11/2016 |
| WO | 2017011944 A1 | 1/2017 |
| WO | 2018090861 A1 | 5/2018 |

OTHER PUBLICATIONS

3GPP TSG RAN WG1 Meeting #86bis R1-1609400, "Discussion on retransmission design for grant-free based UL transmission", Lenovo, Oct. 10-14, 2016, total 3 pages.

Huawei et al.,"Discussion on grant-free transmission",3GPP TSG RAN WG1 Meeting #86 R1-166095,Gothenburg, Sweden, Aug. 22-26, 2016, total 5 pages.

Huawei et al.,"The retransmission and HARQ schemes for grant-free",3GPP TSG RAN WG1 Meeting #86bis R1-1608859,Lisbon, Portugal, Oct. 10-14, 2016, total 5 pages.

NTT DOCOMO,"Multiplexing mechanism for eMBB and URLLC",3GPP TSG RAN WG1 Meeting #86bis R1-1610082, Lisbon, Portugal Oct. 10-14, 2016, total 6 pages.

Huawei et al.,"Grant-free transmission for UL URLLC",3GPP TSG RAN WGI Meeting #88b R1-1704222,Spokane, USA, Apr. 3-7, 2017,total 7 pages.

Huawei et al.,"UL data transmission procedure with and without UL grant",3GPP TSG RAN WGl Meeting #90bis R1-1717091,Prague, Czech Republic, Oct. 9-13, 2017,total 17 pages.

ZTE et al.,"Basic Grant-free Transmission for URLLC",3GPP TSG RAN WG1 Meeting #88 R1-1701594,Athens Greece Feb. 13-17, 2017,total 8 pages.

LG Electronics, "General procedures for grant-free/grant-based MA", R1-1609228, 3GPP TSG RAN WG1 Meeting 186bis, Oct. 10-14, 2016, total 3 pages.

Nokia, Alcatel-Lucent Shanghai Bell, "Grant-free to grant-based switching for URLLC", R1-1612253, 3GPP TSG-RAN WG1 #87, Nov. 14-18, 2016, total 3 pages.

Intel Corporation, "Support of link adaptation for UL grant-free NOMA schemes", 3GPP TSG-RAN WG1 #86bis R1-1610374, Lisbon, Portugal, Oct. 10-14, 2016, 4 pages.

Samsung, "On grant-free UL transmissions for URLLC", 3GPP TSG RAN WG1 Meeting #88, Athens, Greece, Feb. 13-17, 2017, R1-1702996, 3 pages.

ZTE, consideration on SPS and grant-free, 3GPP TSG RAN WG2 #9, 9bis R2-1710322, Sep. 29, 2017, 7 pages.

NTT Docomo, Inc., "Summary of offline discussions on UL transmission without UL grant", 3GPP TSG RAN WG1 Meeting #90, Prague, Czechia, Aug. 21-25, 2017, R1-1714813, 23 pages.

NEC, "Remaining issues on UL transmission without grant", 3GPP TSG-RAN WG1 Meeting #90bis, Prague, Czech Republic, Oct. 9-13, 2017, R1-1718230, 6 pages.

Samsung, "Discussion on NoMA related procedure", 3GPP TSG RAN WG1 Meeting #93, Busan, Korea, May 21-25, 2018, R1-1806753, 7 pages.

MediaTek Inc., "On UL data transmission without grant design and configuration"; 3GPP TSG RAN WG1 Meeting #91, Reno, USA, Nov. 27-Dec. 1, 2017, R1-1719586, 7 pages.

* cited by examiner

SYSTEMS AND METHODS FOR SIGNALING FOR SEMI-STATIC CONFIGURATION IN GRANT-FREE UPLINK TRANSMISSIONS

RELATED APPLICATIONS

This application claims priority to U.S. Provisional Application Nos. 62/444,210 filed on Jan. 9, 2017, 62/447,437 filed on Jan. 17, 2017 and 62/447,906 filed on Jan. 18, 2017, which are all incorporated herein by reference in their entirety.

TECHNICAL FIELD

The present disclosure relates generally to wireless communications, and in particular embodiments, to methods and systems for grant-free uplink transmissions.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data to a base station in an uplink transmission at a particular frequency and/or during a particular slot in time. The frequency and time slot used are examples of resources.

In some wireless communication systems, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

The base station is aware of the identity of the UE sending the uplink transmission using the granted uplink resources, because the base station specifically granted those uplink resources to that UE. However, there may be schemes in which the base station does not know which UE, if any, is going to send an uplink transmission using certain uplink resources. An example is a grant-free uplink transmission scheme in which UEs may send uplink transmissions using certain uplink resources shared by the UEs, without specifically requesting use of the resources and without specifically being granted the resources by the base station. The base station will therefore not know which UE, if any, is going to send a grant-free uplink transmission using the resources.

In some cases, when a particular UE sends a grant-free uplink transmission, the base station may not be able to decode the data in the uplink transmission.

SUMMARY

Technical advantages are generally achieved by embodiments of this disclosure which describe a system and method for unified resource and reference signal (RS) assignment for uplink (UL) grant-free transmissions.

In accordance with an embodiment of the present disclosure, there is provided a method for a user equipment (UE) for grant free transmissions, the method involving receiving, from a network equipment, a radio resource control (RRC) signaling indicating an uplink grant free transmission resource configuration for the transmission and re-transmission of uplink data, the uplink grant free transmission resource configuration including a time resource, a frequency resource, reference signal (RS) resource information, and an interval between two grant free transmission opportunities. The method further involves obtaining uplink grant free transmission resources based on the RRC signaling, without receiving downlink control information (DCI) for an initial transmission of the uplink data. The method further involves transmitting, to the network equipment, the uplink data using the uplink grant free transmission resources.

In some embodiments, the method further involves receiving, from the network equipment, a DCI message indicating a grant for a re-transmission of the uplink data and re-transmitting, to the network equipment, the uplink data based on the grant.

In some embodiments, the RRC signaling further includes a grant free UE identifier and the method further involves decoding the DCI message using the grant free UE identifier.

In some embodiments, the DCI message comprises a new data indicator field set to a value of 1 indicating the grant for the re-transmission of the uplink data.

In some embodiments, the RRC signaling further includes a number of transmission repetitions of the uplink data.

In some embodiments, the RRC signaling further includes a number of configured HARQ processes.

In some embodiments, the RRC signaling further includes at least one of the following: power control parameters; a group identifier for a plurality of grant free UEs; a resource hopping pattern; a RS hopping pattern; and modulation and coding scheme (MCS) information.

In some embodiments, the method further involves re-transmitting the uplink data using the uplink grant free transmission resources if or when no DCI message indicating an uplink grant for a re-transmission of the uplink data has been received.

In some embodiments, the method further involves re-transmitting the uplink data using the uplink grant free transmission resources until the number of transmission repetitions is reached.

In accordance with an embodiment of the present disclosure, there is provided a user equipment (UE) configured for grant free transmissions, the UE including a processor and a computer readable storage medium. The computer readable storage medium stores programming instructions for execution by the processor. The programming including instructions to receive, from a network equipment, a radio resource control (RRC) signaling from a network equipment, wherein the RRC signaling indicates an uplink grant free transmission resource configuration for the transmission and re-transmission of uplink data, and wherein the uplink grant free transmission resource configuration includes a time resource, a frequency resource, reference signal (RS) resource information, and an interval between two grant free transmission opportunities. The programming including instructions to obtain uplink grant free transmission resources based on the RRC signaling, without receiving downlink control information (DCI) for an initial transmission of the uplink data. The programming including instructions to transmit, to a network equipment, the uplink data using the uplink grant free transmission resources.

In some embodiments, the computer-readable medium has stored thereon additional computer-executable instructions, that when executed by the processor cause the UE to receive, from the network equipment, a first DCI message indicating an uplink grant for a re-transmission of the uplink data and re-transmit, to the network equipment, the uplink data based on the grant.

In some embodiments, the RRC signaling further includes a grant free UE identifier and the computer-readable medium has stored thereon computer-executable instructions, that when executed by the processor cause the UE to: decode the DCI message using the grant free UE identifier.

In some embodiments, the DCI message comprises a new data indicator field set to a value of 1 indicating the grant for the re-transmission of the uplink data.

In some embodiments, the RRC signaling further includes a number of transmission repetitions of the uplink data.

In some embodiments, the RRC signaling further includes a number of configured HARQ processes.

In some embodiments, the RRC signaling further includes at least one of the following: power control parameters; a group identifier for a plurality of grant free UEs; a resource hopping pattern; a RS hopping pattern; and modulation and coding scheme (MCS) information.

In some embodiments, the computer-readable medium has stored thereon computer-executable instructions, that when executed by the processor cause the UE to re-transmit the uplink data using the uplink grant free transmission resources if or when no DCI message indicating an uplink grant for a re-transmission of the uplink data has been received.

In some embodiments, the computer-readable medium has stored thereon computer-executable instructions, that when executed by the processor cause the UE to re-transmit the uplink data using the uplink grant free transmission resources until the number of transmission repetitions is reached.

In accordance with an embodiment of the present disclosure, there is provided a method for a network equipment for grant free transmissions, the method involving transmitting, to a user equipment (UE), a radio resource control (RRC) signaling indicating an uplink grant free transmission resource configuration for the transmission and re transmission of uplink data, wherein the uplink grant free transmission resource configuration includes at least a time resource, a frequency resource, reference signal (RS) resource information, and an interval between two grant free transmission opportunities. The method also involving receiving, from the UE, uplink data transmitted using uplink grant free transmission resources allocated based on the RRC signaling, without the network equipment transmitting downlink control information (DCI) for an initial transmission of the uplink data.

In some embodiments, the method further involves transmitting, to the UE, a DCI message indicating an uplink grant for a re-transmission of the uplink data; and receiving, from the UE, the uplink data re-transmitted based on the grant.

In some embodiments, the RRC signaling further comprises a grant free UE identifier.

In some embodiments, the DCI message comprises a new data indicator field set to a value of 1 indicating the uplink grant for the retransmission of the uplink data.

In some embodiments, the RRC signaling further includes a number of transmission repetitions of the uplink data.

In some embodiments, the RRC signaling further includes a number of configured HARQ processes.

In some embodiments, the RRC signaling further includes at least one of the following: power control parameters; a group identifier for a plurality of grant free UEs; a resource hopping pattern; a RS hopping pattern; and modulation and coding scheme (MCS) information.

In some embodiments, the method further involves receiving a re-transmission of the uplink data using the uplink grant free transmission resources.

In some embodiments, the method further involves receiving a re-transmission of the uplink data using the uplink grant free transmission resources until the number of transmission repetitions is reached.

In accordance with an embodiment of the present disclosure, there is provided a network equipment configured for grant free transmissions, the network equipment includes a processor and a computer readable storage medium storing programming instructions for execution by the processor. The programming includes instructions to transmit, to a user equipment (UE), a radio resource control (RRC) signaling indicating an uplink grant free transmission resource configuration for the transmission and re-transmission of uplink data, wherein the uplink grant free transmission resource configuration includes a time resource, a frequency resource, reference signal (RS) resource information, and an interval between two grant free transmission opportunities. The programming also includes instructions to receive, from the UE, uplink data transmitted using uplink grant free transmission resources allocated based on the RRC signaling, without the network equipment transmitting downlink control information (DCI) for an initial transmission of the uplink data.

In some embodiments, the computer-readable medium having stored thereon computer-executable instructions, that when executed by the processor cause the network equipment to transmit, to the UE, a DCI message indicating a grant for a re-transmission of the uplink data; and receive, from the UE, the uplink data re-transmitted based on the grant.

In some embodiments, the RRC signaling further comprises a grant free UE identifier.

In some embodiments, the DCI message comprises a new data indicator field set to a value of 1 indicating the grant for the retransmission of the uplink data.

In some embodiments, the RRC signaling further includes a number of transmission repetitions of the uplink data.

In some embodiments, the RRC signaling further includes a number of configured HARQ processes.

In some embodiments, the RRC signaling further includes at least one of the following: power control parameters; a group identifier for a plurality of grant free UEs; a resource hopping pattern; a RS hopping pattern; and modulation and coding scheme (MCS) information.

In some embodiments, the computer-readable medium has stored thereon computer-executable instructions, that when executed by the processor cause the network equipment to receive a re-transmission of the uplink data using the uplink grant free transmission resources.

In some embodiments, the computer-readable medium having stored thereon computer-executable instructions, that when executed by the processor cause the network equipment to receive a re-transmission of the uplink data using the uplink grant free transmission resources until the number of transmission repetitions is reached.

In accordance with an embodiment of the present disclosure, there is provided a method for a user equipment for grant free transmissions, the method including receiving, from a network equipment, a radio resource control (RRC) signaling indicating an uplink grant-free transmission resource configuration, the configuration including a number of transmission repetitions K. The method further includes receiving, from the network equipment, a first downlink control information (DCI) message, wherein the DCI message includes an activation indication indicating the UE is permitted to perform uplink grant free data transmissions and reference signal (RS) information indicative of an RS allocated to the UE. The method further includes obtaining, uplink grant free transmission resources based on the uplink grant-free transmission resource configuration indicated in the RRC signaling and the DCI message. The method further includes transmitting, to the network equipment, uplink data using the uplink grant free transmission resources.

In some embodiments, the method further involves receiving, from the network equipment, a second DCI message, wherein the second DCI message includes a deactivation indication indicating the UE is not permitted to perform uplink grant free data transmissions, and stopping uplink data transmissions using the uplink grant free transmission resources.

In some embodiments, the DCI message further includes resource block information and modulation and coding scheme (MCS) information.

In some embodiments, the method further involves receiving, from the network equipment, a third DCI message from the network equipment, wherein the third DCI message indicates an uplink grant for a re-transmission of the uplink data.

The method further involves RRC signaling includes at least one of an interval between two grant free transmission opportunities, power control related parameters, a number of configured HARQ processes, and a grant-free UE identifier.

In accordance with an embodiment of the present disclosure, there is provided a user equipment (UE) configured for grant free transmissions, the UE including a processor and a computer readable storage medium storing programming instructions for execution by the processor. The programming includes instructions to receive, from a network equipment, a radio resource control (RRC) signaling indicating an uplink grant-free transmission resource configuration, the configuration including a number of transmission repetitions K. The programming includes instructions to receive, from the network equipment, a first downlink control information (DCI) message, wherein the DCI message includes an activation indication indicating the UE is permitted to perform uplink grant free data transmissions and reference signal (RS) information indicative of an RS allocated to the UE. The programming includes instructions to obtain uplink grant free transmission resources based on the uplink grant-free transmission resource configuration indicated in the RRC signaling and the DCI message. The programming includes instructions to transmit, to the network equipment, uplink data using the uplink grant free transmission resources.

In some embodiments, the computer-readable medium has stored thereon computer-executable instructions, that when executed by the processor cause the UE to receive, from the network equipment, a second DCI message, wherein the second DCI message includes a deactivation indication indicating the UE is not permitted to perform uplink grant free data transmissions, and stop uplink data transmissions using the uplink grant free transmission resources.

In some embodiments, the DCI message further includes resource block information and modulation and coding scheme (MCS) information.

In some embodiments, the computer-readable medium has stored thereon computer-executable instructions, that when executed by the processor cause the UE to receive, from the network equipment, a third DCI message from the network equipment, wherein the third DCI message indicates an uplink grant for a re-transmission of the uplink data.

In some embodiments, the RRC signaling includes at least one of an interval between two grant free transmission opportunities, power control related parameters, a number of configured HARQ processes, and a grant-free UE identifier.

In accordance with an embodiment of the present disclosure, there is provided a method for a network equipment for grant free transmissions, the method including transmitting, to a user equipment (UE), a radio resource control (RRC) signaling indicating an uplink grant-free transmission resource configuration, the configuration including a number of transmission repetitions K. The method further including transmitting, to the UE, a first downlink control information (DCI) message, wherein the DCI message includes an activation indication indicating the UE is permitted to perform uplink grant free data transmissions and reference signal (RS) information indicative of an RS allocated to the UE. The method further including receiving, from the UE, uplink data transmitted using uplink grant free transmission resources allocated based on the RRC signaling and the DCI message.

In some embodiments, the method further involves transmitting, to the UE, a second DCI message, wherein the second DCI message includes a deactivation indication indicating the UE is not permitted to perform uplink grant free data transmissions.

In some embodiments, the method further includes the DCI message further includes resource block information and modulation and coding scheme (MCS) information.

In some embodiments, the method further involves transmitting, to the UE, a third DCI message from the network equipment, wherein the third DCI message indicates an uplink grant for a re-transmission of the uplink data.

In some embodiments, the method further includes the RRC signaling includes at least one of an interval between two grant free transmission opportunities, power control related parameters, a number of configured HARQ processes, and a grant-free UE identifier.

In accordance with an embodiment of the present disclosure, there is provided a network equipment configured for grant free transmissions, the network equipment including a processor and a computer readable storage medium storing programming instructions for execution by the processor. The programming including instructions to transmit, to a user equipment (UE), a radio resource control (RRC) signaling indicating an uplink grant-free transmission resource configuration, the configuration including a number of transmission repetitions K. The programming also including instructions to transmit, to the UE, a first downlink control information (DCI) message, wherein the DCI message includes an activation indication indicating the UE is permitted to perform uplink grant free data transmissions and reference signal (RS) information indicative of an RS allocated to the UE. The programming also including instructions to receive, from the UE, uplink data transmitted using uplink grant free transmission resources allocated based on the RRC signaling and the DCI message.

In some embodiments, the computer-readable medium has stored thereon computer-executable instructions, that when executed by the processor cause the network equipment to transmit, to the UE, a second DCI message, wherein the second DCI message includes a deactivation indication indicating the UE is not permitted to perform uplink grant free data transmissions.

In some embodiments, the DCI message further comprises resource block information and modulation and coding scheme (MCS) information.

In some embodiments, the computer-readable medium has stored thereon computer-executable instructions, that when executed by the processor cause the network equipment to transmit, to the UE, a third DCI message from the network equipment, wherein the third DCI message indicates an uplink grant for a re-transmission of the uplink data.

In some embodiments, the RRC signaling includes at least one of an interval between two grant free transmission opportunities, power control related parameters, a number of configured HARQ processes, and a grant-free UE identifier.

BRIEF DESCRIPTION OF THE DRAWINGS

For a more complete understanding of the present disclosure, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

In this disclosure, grant-free transmissions refer to data transmissions that are performed without communicating grant-based signaling in a dynamic control channel, such as a Physical Uplink Control Channel (PUCCH) or a Physical Downlink Control Channel (PDCCH). Grant-free transmissions can include uplink or downlink transmissions, and should be interpreted as such unless otherwise specified.

Figure 1:
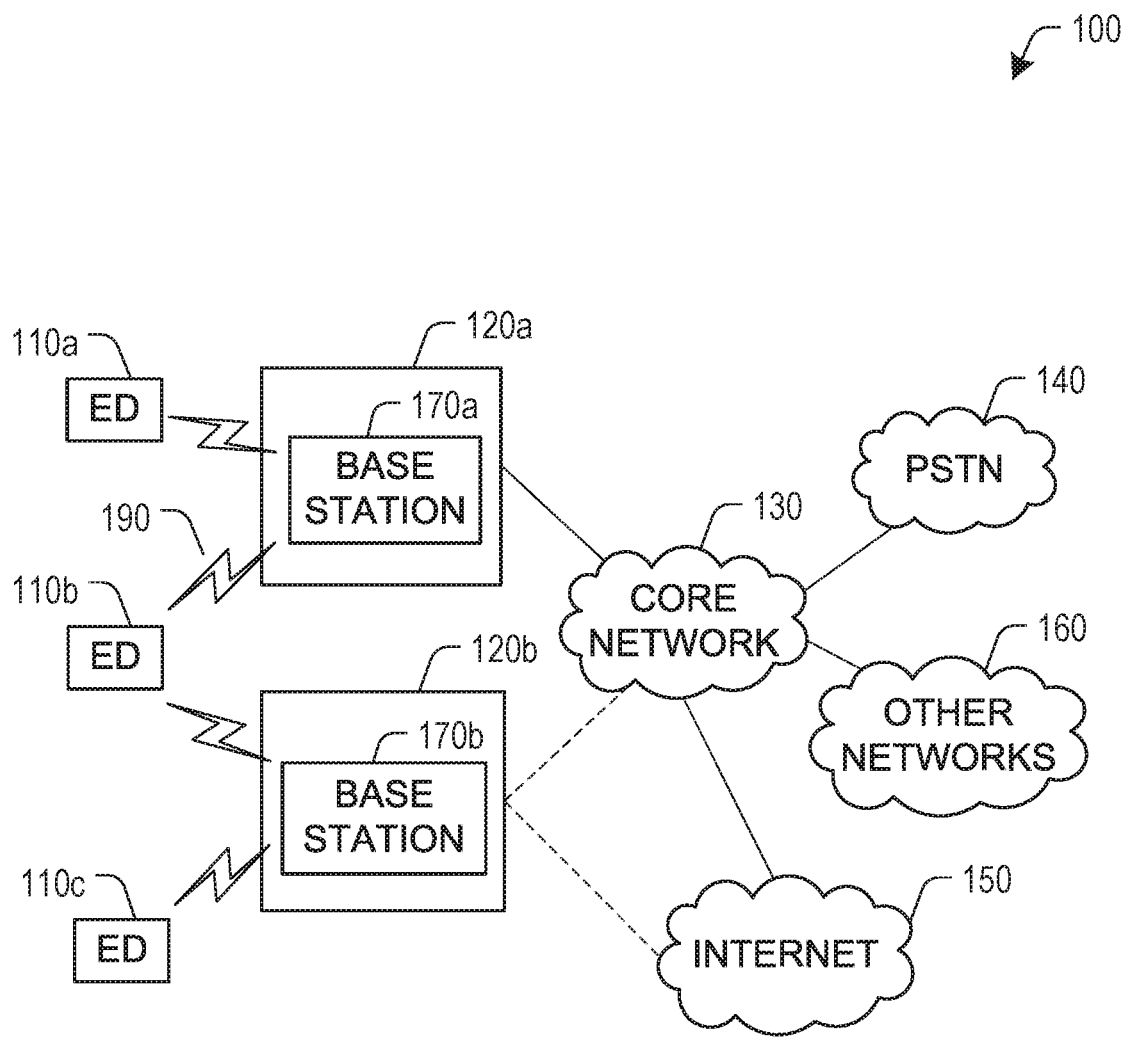
FIG. 1 illustrates a network for communicating data.

FIG. 1 illustrates an example communication system 100. In general, the system 100 enables multiple wireless or wired user devices to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (EDs) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate and/or communicate in the system 100. For example, the EDs 110a-110c are configured to transmit and/or receive via wireless or wired communication channels. Each ED 110a-110c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to a backhaul network, the backhaul network in FIG. 1 comprises the core network 130, the PSTN 140, the Internet 150, and/or the other networks 160. For an example, the backhaul network can comprise 5G communication system network or future next evolution system network. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 110a-110c are configured to interface and communicate with the internet 150 and may access the core network 130, the PSTN 140, and/or the other networks 160.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the EDs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs 110a-110c may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
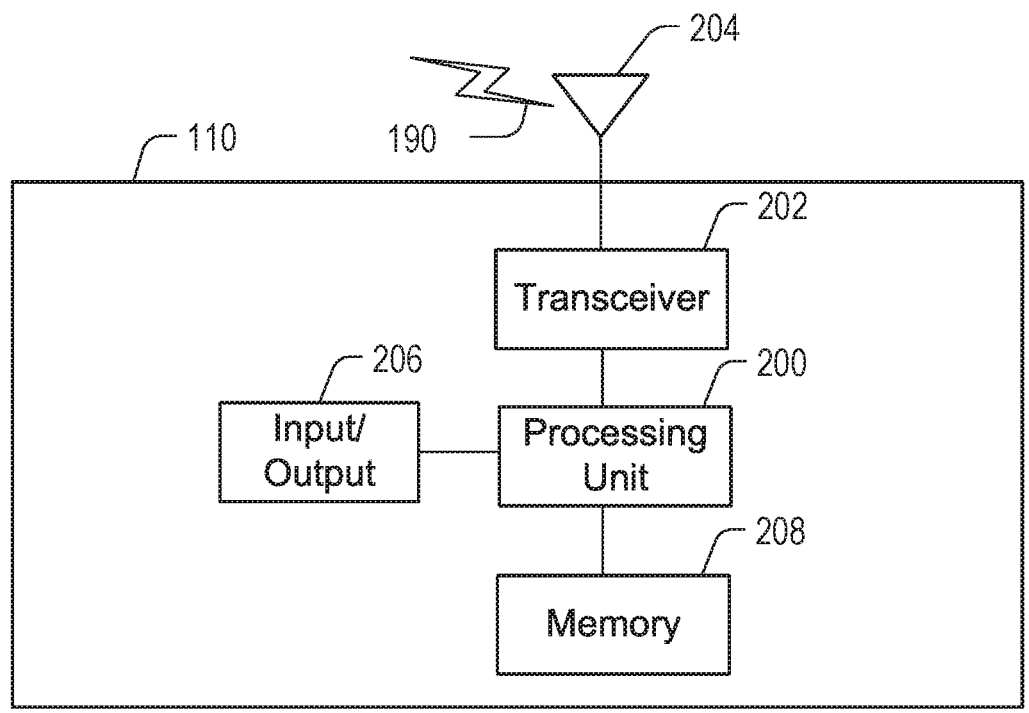
FIG. 2A illustrates a diagram of an embodiment electronic device (ED) such as a user equipment (UE)
Figure 2B:
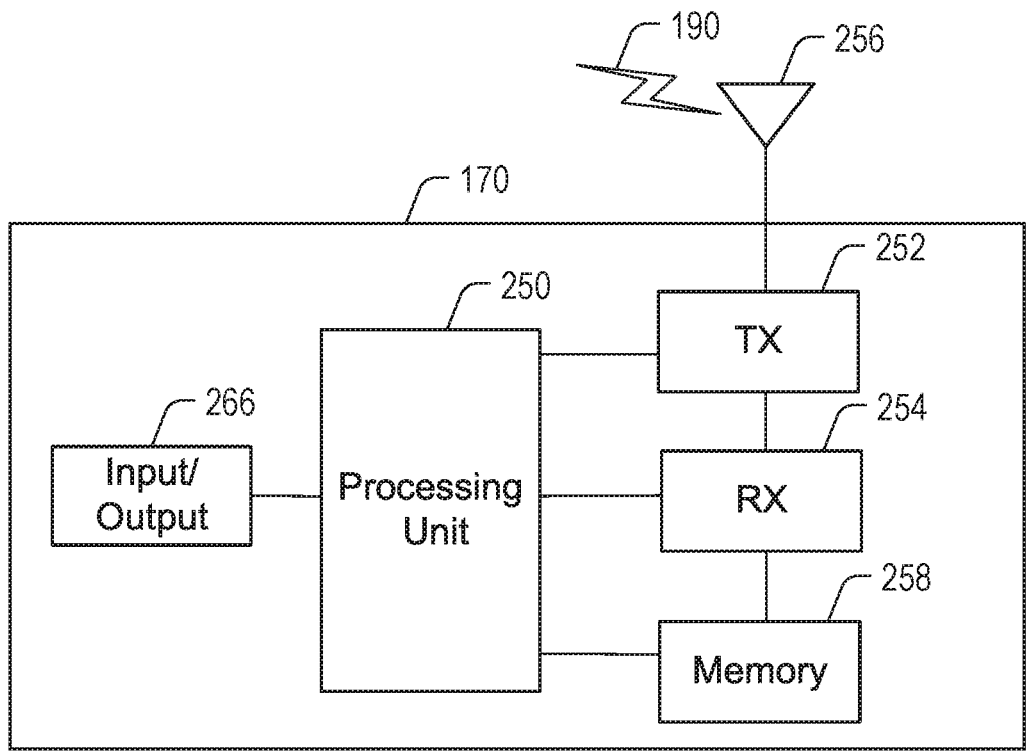
FIG. 2B illustrates a diagram of an embodiment base station.

FIGS. 2A and 2B illustrate example devices that may implement the methods and teachings according to this disclosure. In particular, FIG. 2A illustrates an example ED 110 corresponding to 110a, 110b, 110c, and FIG. 2B illustrates an example base station 170 corresponding to 170a or 170b. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 also supports the methods and teachings described in more detail above and below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or NIC (Network Interface Controller). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A scheduler, which would be understood by one skilled in the art, could also be coupled to the processing unit 250. The scheduler could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate transmitter 252 and receiver 254, these two devices could be combined as a transceiver. Each antenna 256 includes any suitable structure for transmitting and/or receiving wireless or wired signals. While a common antenna 256 is shown here as being coupled to the transmitter 252, one or more antennas 256 could be coupled to the receiver 252, allowing separate antennas 256 to be coupled to the transmitter and the receiver as separate components. Each memory 258 includes any suitable volatile and/or non-volatile storage and retrieval device(s). Each input/output device 266 facilitates interaction with a user or other devices (network communications) in the network. Each input/output device 266 includes any suitable structure for providing information to or receiving/providing information from a user, including network interface communications.

Figure 2C:
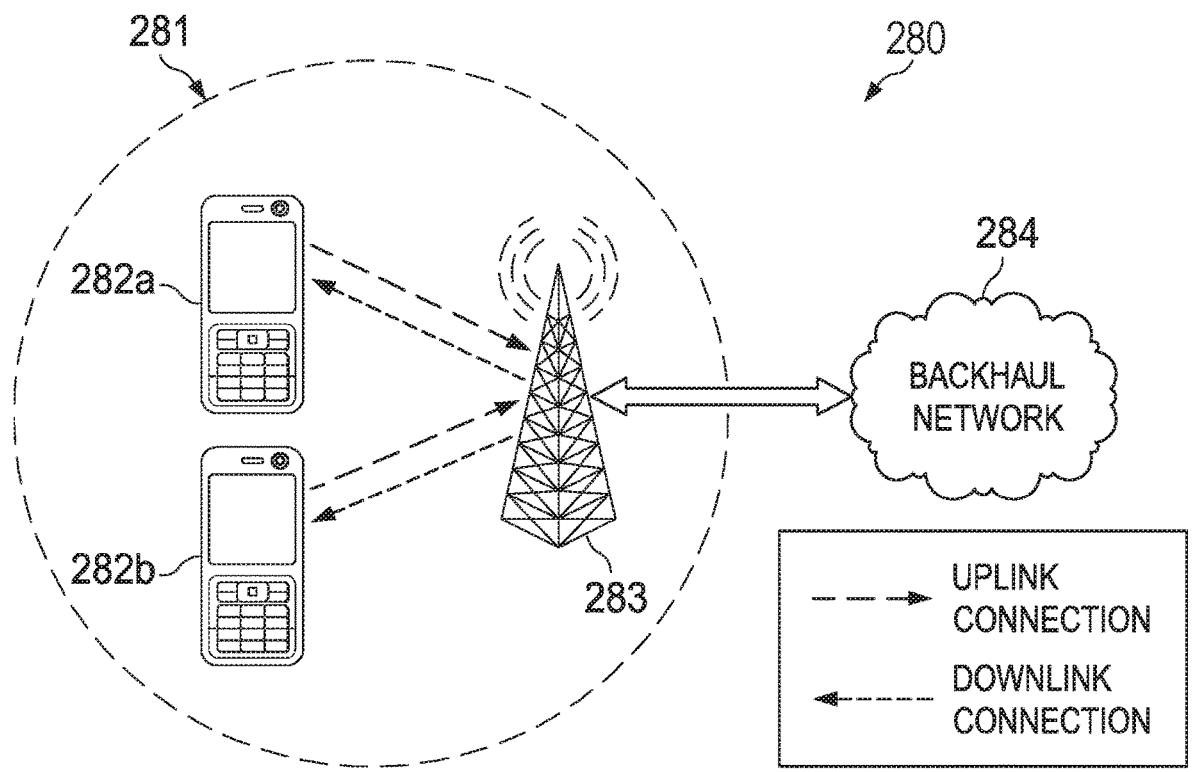
FIG. 2C illustrates a network for communicating data.

FIG. 2C illustrates an example network 280 for communicating data. The network 280 comprises a Base Station (BS) 283 having a coverage area 281, a plurality of mobile devices 282 (282a, 282b), and a backhaul network 284. As shown, the base station 283 establishes uplink (long dashed line) and/or downlink (short dashed line) connections with the mobile devices 282, which serve to carry data from the mobile devices 282 to the BS 283 and vice-versa. Data carried over the uplink/downlink connections may include data communicated between the mobile devices 282, as well as data communicated to/from a remote-end (not shown) by way of the backhaul network 284.

The network 280 may implement a grant free uplink transmission. Grant-free uplink transmissions are sometimes called "grant-less", "schedule free", or "schedule-less" transmissions. Grant-free uplink transmission can also be referred to as "UL transmission without grant", "UL transmission without dynamic grant", "transmission without dynamic scheduling", "transmission using configured grant". Sometimes, grant-free resources configured in RRC without DCI signaling may be called a RRC configured grant or one type of configured grant. Grant-free resource configured using both RRC and DCI signaling may be also called a configured grant, a DCI configured grant or another type of configured grant. Grant-free uplink transmissions from different mobile devices may be transmitted using the same designated resources, for an example, contention transmission unit (CTU) access regions, in which case the grant-free uplink transmissions are contention-based transmissions. One or more base stations, e.g. BS 283, may perform blind detection on the grant-free uplink transmissions.

Grant-free uplink transmissions may be suitable for transmitting bursty traffic with short packets from the mobile devices 282 to the BS 283, and/or for transmitting data to the BS 283 in real-time or with low-latency. Examples of applications in which a grant-free uplink transmission scheme may be utilized include: massive machine type communication (m-MTC), ultra-reliable low latency communications (URLLC), smart electric meters, teleprotection in smart grids, and autonomous driving. However, grant-free uplink transmission schemes are not limited to the applications described above.

BS 283 may implement a grant-free uplink transmission scheme, and contention transmission unit (CTU) access regions may be defined so that mobile devices 282 may contend for and access uplink resources without a request/grant mechanism. The grant-free uplink transmission scheme may be defined by the BS, or it may be set in a wireless standard (e.g., 3GPP). Mobile devices 282 may be mapped to various CTU access regions to avoid collision (i.e., when two or more mobile devices attempt to transmit data on the same uplink resource). However, if collision occurs, mobile devices 282 may resolve collisions using an asynchronous HARQ (hybrid automatic repeat request) method. BS 283 may blindly (i.e., without explicit signaling) detect active mobile devices and decodes received uplink transmissions.

Under this scheme, mobile devices 282 may send uplink transmissions without the BS 283 allocating resources to request/grant mechanisms. Therefore, total network overhead resources may be saved. Furthermore, this system may allow for time savings during uplink by bypassing the request/grant scheme. Although only one BS 283 and two mobile devices 282 are illustrated in FIG. 2C, a typical network may include multiple BS each covering transmissions from a varying multitude of mobile devices in its geographic coverage area.

Network 280 uses various high level signaling mechanisms to enable and configure grant-free transmissions. Mobile devices 282 capable of grant-free transmissions may signal this capability to BS 283. This may allow BS 283 to support both grant-free transmissions and traditional signal/grant transmissions (e.g., for older mobile device models) simultaneously. The relevant mobile devices may signal this capability by, for example, RRC (radio resource control) signaling defined in the 3GPP (third generation partnership project) standard. A new field may be added to the mobile device capability list in RRC signaling to indicate whether the mobile device supports grant-free transmissions. Alternatively, one or more existing fields may be modified or inferred from in order to indicate grant-free support.

BS 283 may also use high-level mechanisms (e.g., a broadcast channel or a slow signaling channel) to notify mobile devices 282 of information necessary to enable and configure a grant-free transmission scheme. For example, BS 283 may signal that it supports grant-free transmissions, a search space location (defining a time-frequency resource) and access codes for CTU access regions, a maximum size of a signature set (i.e., the total number of signatures defined), a modulation and coding scheme (MCS) setting, and the like. Furthermore, BS 283 may update this information from time to time using, for example, a slow signaling channel (e.g., a signaling channel that only occurs in the order of hundreds of milliseconds instead of occurring in every transmit time interval (TTI)).

Grant free resource information common to more than one mobile device can be predefined or defined in a broadcast channel or system information. An example of how the system information may be transmitted by the BS includes using System Information Blocks (SIB). The system information may include, but is not limited to, grant free frequency bands (start and finish) of the grant free boundary in frequency and the grant free partition size.

The SIB may for example include fields in order to define the start of the grant free frequency transmission resource (GFfrequencyStart) and the end of the grant free frequency transmission resource (GFfrequencyFinish) in order to define a total grant free transmission resource for all mobile devices. However, there may be other ways to define the overall available grant free transmission resource.

The SIB may for example include fields in order to define a grant free CTU size, such as the CTU frequency size (GFCTUSizeFrquency) and the CTU time size (GFCTUSizeTime).

The above fields assume a continuous grant free resource allocation. However, in some embodiments, the grant free resource may not be continuous and there may be other ways to define the GF resources. Any of the above fields may also be optional, as the resources may be predefined.

With regard to defining the search space location for control channel (DCI) for grant free mobile devices, the search space location of Downlink Control Information (DCI) may be provided by an index of potential control channel elements (CCEs) in each subframe/TTI, for which the index may have a predefined relation derived from the grant free user equipment identifier (UE ID) (such as a GF_RNTI) or grant free group ID (such as a group_RNTI) assigned to the UE. This method may be similar to the definition of PDCCH search space in Long term Evolution (LTE).

Another way of defining the search space may be to explicitly signal the search space locations of DCI. The format provided may be a time-frequency region, within which the grant free UE (i.e. a UE that is configured for grant free operation) should search for all CCEs. This explicit signaling may be carried out in radio resource control (RRC) signaling. This is similar to Enhanced PDCCH (ePDCCH) search space defined in LTE, e.g., defined in ePDCCH_Config in RRC signaling.

The grant-free transmission uplink scheme implemented by BS 283 may define CTU access regions to enable grant-free transmissions by mobile devices 120. A CTU is a basic resource, predefined by a network, for contention transmissions. The messages are transmitted using a multiple access (MA) resource. A MA resource is comprised of a MA physical resource (e.g. a time-frequency block) and at least one MA signature. The MA signature may include (but is not limited to) at least one of the following: a codebook/ codeword, a sequence, an interleaver and/or mapping pattern, a demodulation reference signal (e.g. a reference signal for channel estimation), a preamble, a spatial-dimension, and a power-dimension. The term "pilot" refers to a signal that at least includes a reference signal (RS). In some embodiments, the pilot may include the demodulation reference signal (DMRS), possibly along with a channel-estimation-oriented preamble, or a random access channel (LTE-like RACH) preamble.

A CTU access region is a time-frequency region where contention transmission occurs. The grant-free uplink transmission scheme may define multiple CTU access regions for a network, such as network 100 in FIG. 1. The grant-free transmission uplink scheme may be defined by BS via high level signaling (e.g., through a broadcast channel) or it may be pre-defined by a standard and implemented in UEs (e.g., in a UE's firmware). The regions may exist in one or more frequency bands (intra-band or inter-band) and may occupy the entire uplink transmission bandwidth or a portion of the total transmission bandwidth of BS 283 or a carrier supported by BS 283. A CTU access region that occupies only a portion of the bandwidth allows BS 283 to simultaneously support uplink transmissions under a traditional request/ grant scheme (e.g., for older mobile device models that cannot support grant-free transmissions). Furthermore, BS 283 may utilize unused CTUs for scheduled transmissions under a request/grant scheme, or BS 283 may adjust the size of CTU access regions if portions of the access regions are not used for a period of time. Furthermore, the CTU access regions may frequency hop periodically. BS 283 may signal these changes in CTU access region size and frequency to mobile devices 282 through a slow signaling channel.

Figure 5A:
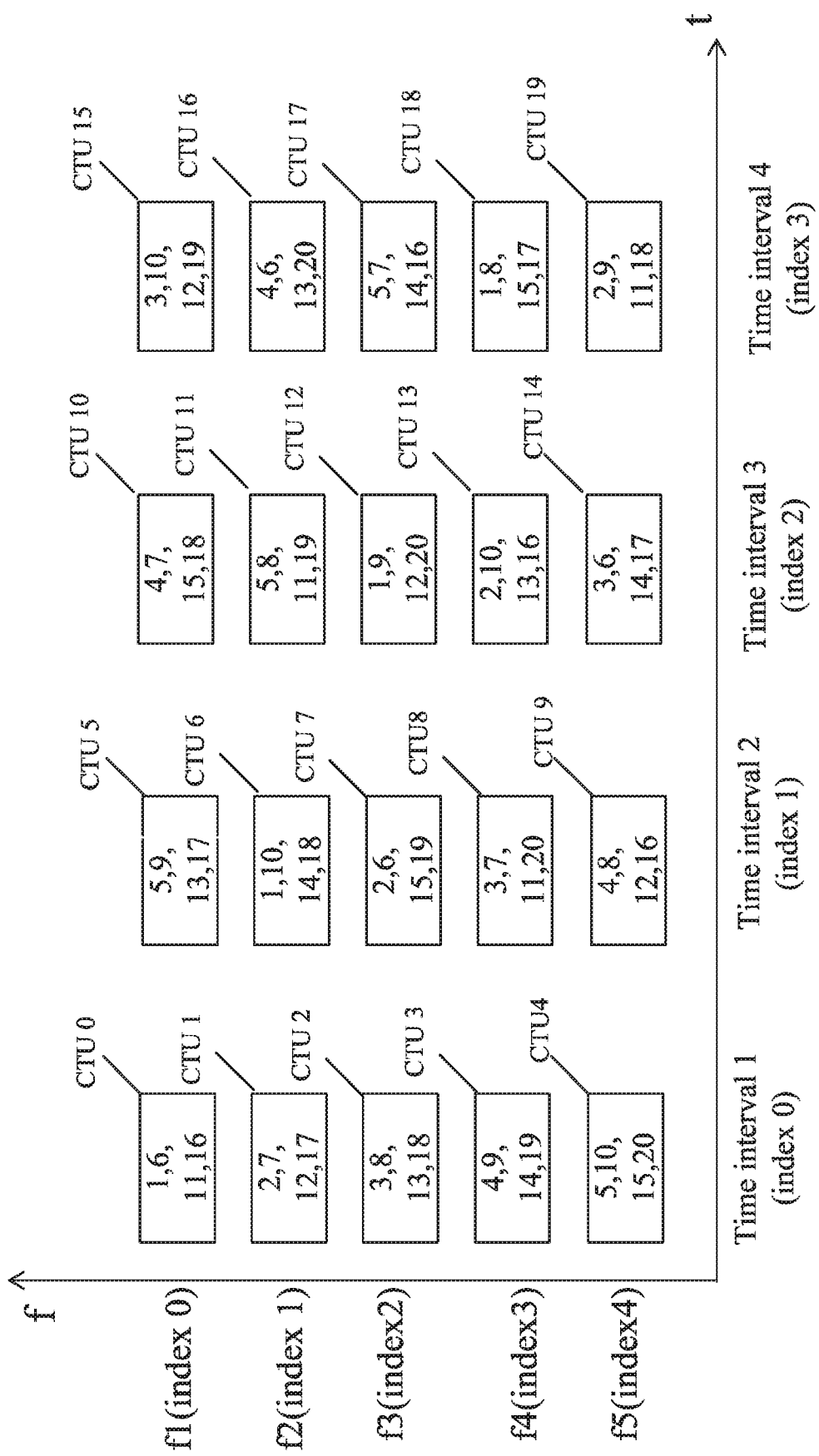
FIGS. 5A-5D illustrate examples of resource assignment patterns according to embodiments of the disclosure.

The CTU access regions can be defined within a total available time-frequency region. FIGS. 5A to 5D show examples of 5 CTU regions defined within a time frame. The CTU regions may not have the same sizes in-terms of time and frequency resources assigned as shown in FIG. 5A. The CTU regions may be indexed by a predefined pattern that is known to both BS and the UEs within a time frame. For example, the 5 CTU regions in FIG. 5A may be indexed as CTU 0-4 as shown in the first time interval (Time interval 1). The CTU regions may also be partitioned into different resource sets, each set typically represents a time interval, and within one resource, there may be multiple CTU regions that typically occupy different frequency bands. In this case, the CTU regions can be index by a two dimensional indexes, containing a time interval index and frequency location index. The time intervals are usually defined as a unit time interval, within which a UE may be given an opportunity or resource to be able to access grant-free. For example, CTU 0 to CTU 4 may be indexed by a time interval index 0 and a frequency location index 0, 1, 2, 3, 4. The CTUs that have the same time slot or frequency location indexes may not necessarily aligned in the actual physical time or frequency domain. However, the combination of a frequency location index and a time location index can uniquely determine the index of the CTU in the frame, which corresponds to a predefined physical frequency and time location. For example, in FIG. 5D, CTUs 0, 5, 10 and 15 have the same frequency location index 0, but their physical frequency location is different as CTU 0 and CTU 10 are at a physical frequency band f1 and CTU 5 and CTU 15 are at a physical frequency band fn. This has the advantage to provide frequency diversity gain through resource frequency hopping when two or more of these CTU regions are assigned to the same UE. For example, both CTU 0 and CTU 6 may be assigned to the same UE (denoted as UE 1). UE 1 may perform a grant-free initial transmission of a packet in CTU 0 and a retransmission of the same packet in CTU 6. The BS combines the signals received from UE 1 in CTU 0 and CTU 6 for decoding. As CTU 0 and CTU 6 locates in different frequency bands, a frequency diversity gain can be obtained to help the decoding in comparison to the case where CTU 0 and CTU 6 occupying the same frequency bands.

Some information of CTU access regions may also be signaled by the BS. For example, the CTU access regions maybe a dedicated frequency bands among all the available bandwidth. In this case, the BS may indicate the start and/or end of the bandwidth allocated to grant-free access. In some scenarios, there are multiple predefined patterns of grant-free CTU access regions. The BS may signal to the grant free UEs the index of the predefined pattern used. The BS may also update information of the CTU region definition through signaling. The signaling and update of information about the CTU regions may be conveyed through broadcast channel or control channel.

With a grant free transmission scheme, the receiver may perform activity detection, channel estimation, and data decoding without a priori knowledge of the transmitter's pilots. Channel estimation may be performed based on pilot signals received from each mobile device. A set of consecutive values used for a pilot signal (e.g., P1, P2, . . . PN) is referred to as a pilot sequence. Mobile devices may generally transmit one or more instances of a pilot sequence in a given uplink frame. By way of example, in 4G LTE, UEs generally transmit two Zadoff-Chu pilot sequences in two OFDM symbols of an uplink sub-frame.

To mitigate interference between pilot sequence transmissions from different mobile devices, the mobile devices may select pilot sequences from a pool of pilot sequences. The pilot sequence selection may be random or based on a predefined selection rule. The pool of pilot sequences may be generated by cyclically shifting a Zadoff-Chu sequence with the same root. The pilot sequences generated using cyclical shifting of a Zadoff-Chu sequence with the same root are orthogonal to each other. Therefore, a pilot pool generated this way contains only orthogonal pilots. Orthogonal pilots are desirable as the mutual interference between two pilot signals using orthogonal pilots are minimal. However, the number of pilot sequences that are orthogonal to each other may be limited for a given pilot sequence length. More pilot sequences can be generated if different pilot sequences are allowed to be non-orthogonal to each other. For example, more pilot sequences can be generated using different roots of Zadoff-Chu sequences. Pilot sequences generated this way may be non-orthogonal to each other, but still have low correlations.

Pilot collision refers to cases when multiple mobile devices simultaneously access the same frequency-time-signature resources by using the same pilot sequence. Pilot collisions may lead to irreparable results in a grant free transmission scheme. This is due to BS 283 being unable to decode a mobile device's transmission information in pilot collision scenarios because BS 283 is unable to estimate the individual channels of mobile devices using the same pilot. For example, assume two mobile devices (mobile devices 282*a* and 282*b*) have the same pilot and their channels are h1 and h2, then BS 283 can only estimate a channel of quality of h1+h2 for both mobile devices 282a and 282b. Thus, the transmitted information will likely not be decoded correctly. Various embodiments may define a number of unique pilots depending on the number of mobile devices supported in the system. Because many mobile devices may access the same uplink channel in next-generation networks, a universal RS and resource mapping scheme that supports different numbers of users in uplink grant-free multiple access transmissions for 5G is desirable.

Embodiments of this disclosure provide a universal RS and resource mapping scheme that supports different numbers of users in uplink grant-free multiple access transmissions. In some embodiments, a number of UEs are grouped into a first set of groups based on a predefined rule, and a time-frequency resource is assigned to each group of UEs for a first time interval. The UEs may be regrouped, and reassigned time-frequency resources for a second time interval. The time-frequency resource assignment results may be transmitted to the UEs. RS sequence assignment may be determined based on the time-frequency resource assignment results to avoid RS collisions over the same time-frequency resources. A RS pool may be gradually expanded from orthogonal pilot sequences to non-orthogonal pilot sequences, and then a random pilot sequence pool when more and more UEs need to be supported.

System information broadcast to all UEs may include information that can be used by all grant free UEs. For example, the system information may include grant free frequency bands (starting and finish) of the grant free boundary in frequency and the grant free partition size. However, such information may not necessarily be included in the system information, and if it is not, then it may be included in the RRC signaling. In some other embodiments, such information of the common grant free resources may be predefined. The RRC signaling information is UE specific or group specific and may include information such as one or more of UE ID, DCI search space, resource hopping, RS hopping and modulation and coding information (MCS) information. Further control signaling may be transmitted to the UEs in DCI messages. The DCI may be used to send MCS information, first RS, first transmission resources, ACK, NACK or grant for transmission information or possibly additional updates for grant free resource assignments.

In some embodiments the grant free UE is semi-statically configured to combine 1) the RRC signaling information and the system information, 2) the RRC signaling information and the DCI information or 3) the RRC signaling information, the system information and the DCI information, to determine an assigned transmission resource. Whether the UE specific information is provided in an index/sequence based format or is fully defined may depend on, for example, the type of information that is defined in the system information and whether complementary DCI is available.

Semi-static is defined in comparison with the dynamic option that is operating in every time slot. For example, semi-static can mean periodically within a given time period, such as, for example, 200 or longer time slots. Semi-static can also means configuring it once and only update once in a while.

In some embodiments, a grant free UE can configure the resources in a semi-static way where the LTE paging-like or Physical Broadcast Channel (PBCH)-like signaling can be used for resource (re-) configuration signaling message. For example, for a group of UEs with the same group ID, the group ID can be used to configure or update the grant free resources for the group of UEs, using DCI configuration indication and a RRC message in the DL data channel (indicated in DCI), or using PBCH-like signaling message (multiplexing with other system information in Frequency Division Multiplexing (FDM) or Time Divisional Multiplexing (TDM)). Moreover, the UEs in the group can be associated with same or different beams in multi-beam system, and in case of UEs being associated with different beams, this paging-like or PBCH-like signaling message should be designed in a way to be able to support the group of UEs using different beams, for example, the same signaling message for semi-static resource (re-)configuration can be transmitted through the different supported beams to the UEs.

In some embodiments, for an UL transmission scheme without grant, at least semi-static resource (re-)configuration can be used, where the resource includes at least physical resource in time and frequency domain, and other MA resources/parameters such as RS and code. The resource configuration signaling can be done, for example, like LTE semi-persistent configuration. Moreover, the RS is transmitted together with data, where the channel structure of grant-based data transmission and/or LTE DMRS designs can be considered as a starting point and enhancements can be used. For an UL transmission scheme with/without grant, K repetitions (K>=1, i.e., with the same or different redundancy versions (RV) and/or different MCSs) for the same transport block with pre-configured resources can be used, where K is determined, e.g., by the number of transmissions until ACK is received, or a pre-configured or fixed number. In some embodiments, UE resource hopping over the transmissions can be configured.

In other embodiments, the UE can start to transmit data using grant-based transmissions for one or more times by scheduling request (SR) and DCI signaling, and then switch to grant free transmissions over the resource(s) once there is data arrival without SR signaling, where the grant free resource(s) of the UE can be configured by RRC signaling, e.g., at the UE initial access and subsequently semi-statically updated. This may be beneficial when the arrival packet size is small. This can reduce the signaling overhead and also latency.

In other embodiments, the UE can be configured semi-statically grant-free resources and start transmitting initial data without grant. The UE can then start to monitor constantly the DCI signaling from the base station. If there is a scheduling grant is received, the UE can dynamically switch to grant-based transmission. If there is no dynamic grant, such as a DCI signaling, received beyond a certain time period after transmitting the data with grant free, the UE may keep using grant free transmissions for the data arrivals.

Use RRC Signaling Alone for Grant Free Resource Assignment

Figure 3A:
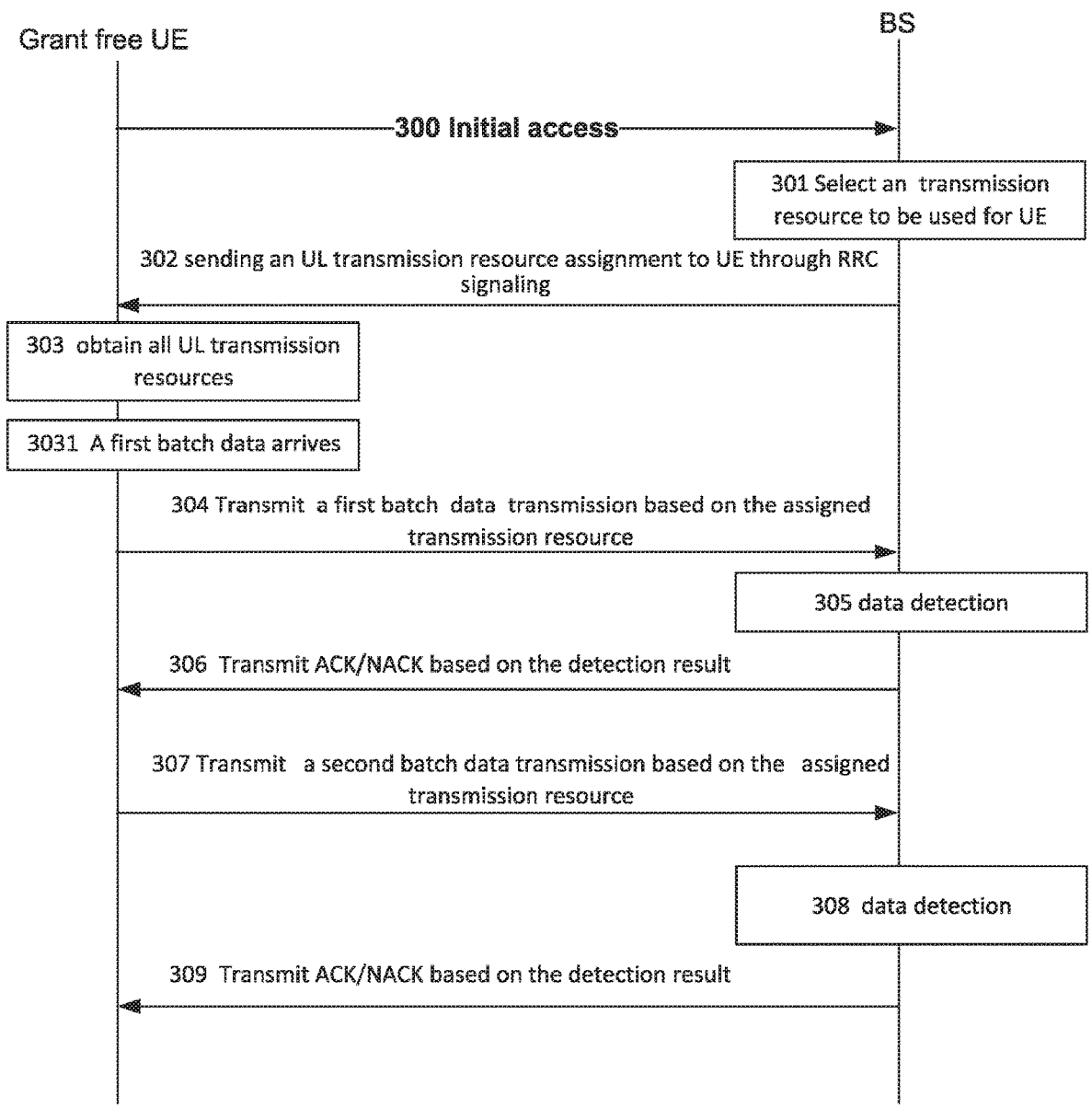
FIGS. 3A-3K illustrate eleven flowcharts of eleven examples of methods for grant-free transmissions according to an embodiment of the disclosure.

FIG. 3A illustrates an embodiment for uplink (UL) grant-free transmissions using Radio Resource Control (RRC) information without a UE having to check for Downlink Control Information (DCI) prior to initial transmitting of data. The grant free UE may still check for ACK/NACK feedback either through a dedicated ACK/NACK channel, such as Physical HARQ Indication Channel (PHICH) or DCI.

The RRC signaling is used for signaling UE specific and/or group specific transmission resource and/or reference signaling configuration.

With regard to the UE specific information, the RRC signaling may be used to notify the grant free UE about information relevant to grant free transmission such as, but not limited to, UE ID, DCI search space, grant-free transmission resources, RS resources and other relevant information that may include for example, MCS.

The RRC signaling may include a grant free ID field (such as GF-RNTI) and one or more configuration fields for configuring for UL (gf-ConfigUL) and/or for configuring for downlink (DL) (gf-ConfigDL).

Fields in the UL configuration signaling may include, but are not limited to, the following examples.

A grant free frame interval UL field that defines the periodicity of the resource hopping pattern in terms of a number of sub-frames. It may use frame length, in which case the field may be optional (use frame length defined for the system by default).

A grant free schedule interval UL field that defines the interval between two grant free transmission opportunities. In some implementations, the field default is 1 if not specified. The interval may be the time interval between two grant-free resources, which is sometimes called periodicity of the grant-free resource.

There may also be fields for power control related parameters that may serve a similar purpose as the one used for LTE semi-persistent scheduling (SPS).

A CTU size frequency field that defines the number of resource blocks (RB) used per CTU in frequency domain or CTU region block size. In some embodiments, the frequency domain indication of the grant free resource may indicate the resource block index (physical resource block index or virtual resource block index). The resource block index can also be indicated using the starting or ending RB index and the number of RBs. In some implementations, time domain size may default to a subframe or TTI, so only frequency domain size is needed. The field is not needed if defined in SIB or there is complementary DCI signaling. The time domain size of the resource (e.g. TTI) can also be defined in RRC, e.g. a slot, a mini-slot, multiple slots, an OFDM symbol or multiple OFDM symbols. There may be another field that defines the time domain location of the grant free resources. For example, there may be an offset value besides the periodicity signaled in RRC signaling. The offset value indicates the time location of one grant free resource, e.g. the offset value can indicate the time location (e.g. a slot index) of the grant-free resource with respect to a system frame number (SFN)=0. In some embodiments, the offset may not need to be signaled, it can have a default value, e.g. at slot 0.

A resource hopping pattern field to define the resource hopping pattern. In some embodiments, the resource hopping pattern field is defined by a sequence of frequency location indices at each frame and at each time interval with unit time equals to a grant free schedule interval UL value. In some embodiments, the resource hopping pattern field is defined as a sequence of frequency location indexes at each frame at each time interval in general. The time interval can be a TTI, a slot, a time slot, a sub-frame, a mini-slot, an OFDM symbol, a number of OFDM symbols, or any time unit. The time interval can also be the time location of the grant-free resources, the location of grant-free resources can be separated by the configured periodicity of the resource. For example, the resource hopping pattern can be defined as a frequency partition or sub-band index at each slot within a frame or within a resource hopping pattern periodicity. In some embodiments, the resource hopping pattern field is defined by a sequence of CTU indices at each time interval in each frame. A resource hopping pattern may be provided to the grant free UE in the form of any one of 1) a single UE index defined from a predefined resource assignment rule, 2) a resource hopping index sequence indicating the frequency index of each time interval, or 3) any implicit or explicit signaling of actual physical time-frequency resources that can be used at each time slot. Here, the resource hopping pattern also includes the indication of time-frequency resource of the grant-free resources.

A RS hopping sequence field to define the RS hopping sequence. The RS hopping sequence field may include an index of RS to be used in frame n. If RS changes every time interval, the field may include a sequence of indices at each time interval. The RS hopping sequence may not be needed if a complementary DCI is available. A RS hopping sequence may be provided to the grant free UE in the form of any one of 1) Fixed RS and 2) a RS hopping sequence in each frame. The RS hopping sequence in general refers to the indication of a reference signal at different resources. It can be a single RS index or different RS indices at different time-frequency grant free resources. There may be multiple RS indices signaled for different transmission or retransmission states. For example, a RS index may be signaled to a UE for initial grant free transmission and another RS index may be signaled to the UE for the rest of the repetitions/retransmissions.

An MCS field to provide MCS information, if no complementary DCI signaling is being used.

A search space field for further DCI grant that may also be predefined by a grant free identifier (GF_ID) or a Group grant free identifier (Group_ID).

The RRC format may include an indication that the UE is a grant free UE or that the UE is allowed to transmit using grant free resources. The RRC format may include a grant free UE ID (such as GF_RNTI) or a group based ID (such as Group_RNTI) that is used for decoding further instructions using DCI.

In the example of FIG. 3A the grant free UE does not need to constantly check for DCI inside search space and does not need DCI to activate grant free transmission. DCI signaling can provide further control signaling to the UE.

Prior to the start of the steps of FIGS. 3A to 3H, system information (described above) may be periodically transmitted by the base station. The system information may include information that can be used by the UE. If information that would be used by the UE is not defined in the system information, then that information will be provided in the RRC signaling and or DCI messages.

As shown in FIG. 3A, at step 300, a UE capable of grant free transmissions first enters a network supported by a transmit receive point (TRP) or BS and may perform initial access, for example by sending a preamble through a random access (RA) channel as part of a random access procedure (RACH) in an LTE network. The UE may signal to the BS an indication indicating that the UE is grant free transmission capable, for example when the UE expects to transmit a large amount of small data packets.

At step 301, the BS may receive the RACH RA preamble and select a UL transmission resource to be used by the UE. An embodiment of this disclosure provides the UL transmission resources comprise a pre-defined MA hopping pattern in a frame. For example, the MA hopping pattern may include a pre-defined time-frequency resource hopping pattern in a frame and/or a pre-defined RS hopping pattern. The MA hopping pattern provides a universal RS and transmission resource mapping scheme that supports different numbers of UEs in uplink grant-free multiple access transmissions. The BS can obtain the pre-defined MA hopping pattern from the network, for example to save the MA hopping pattern, or the BS may obtain the MA hopping pattern by generating the MA hopping pattern based on a predefined pattern generating scheme or a predefined rule. As described above, in addition to the MA hopping pattern there are various other elements used to define the transmission resource that are included in RRC signaling that are transmitted to the UE.

At step 302 of FIG. 3A, the BS sends an UL transmission resource assignment to the UE through RRC signaling after selecting the transmission resource to be used for the grant free UE. Examples of the message contents of the RRC signaling have been described above.

In step 303, the grant free UE obtains all UL transmission resources. In some embodiments, the UE can derive the transmission resources based on predefined rules, which will be described in greater detail below, after receiving the transmission resource assignment. Alternatively, the UE can look up the tables and the predefined transmission resource hopping pattern after receiving the above transmission resource assignment. The UE can save the predefined transmission resource pattern and tables. Furthermore, the UE can update the predefined transmission resource pattern and tables after receiving the signaling to instruct the update information. In another words, the UE can update the grant free resource after receiving signaling to instruct the update of resource parameters. The signaling can be DCI signaling or RRC signaling as described in the present disclosure.

At step 3031, a first batch data arrives at the grant free UE for transmission to the BS.

Figure 6A:
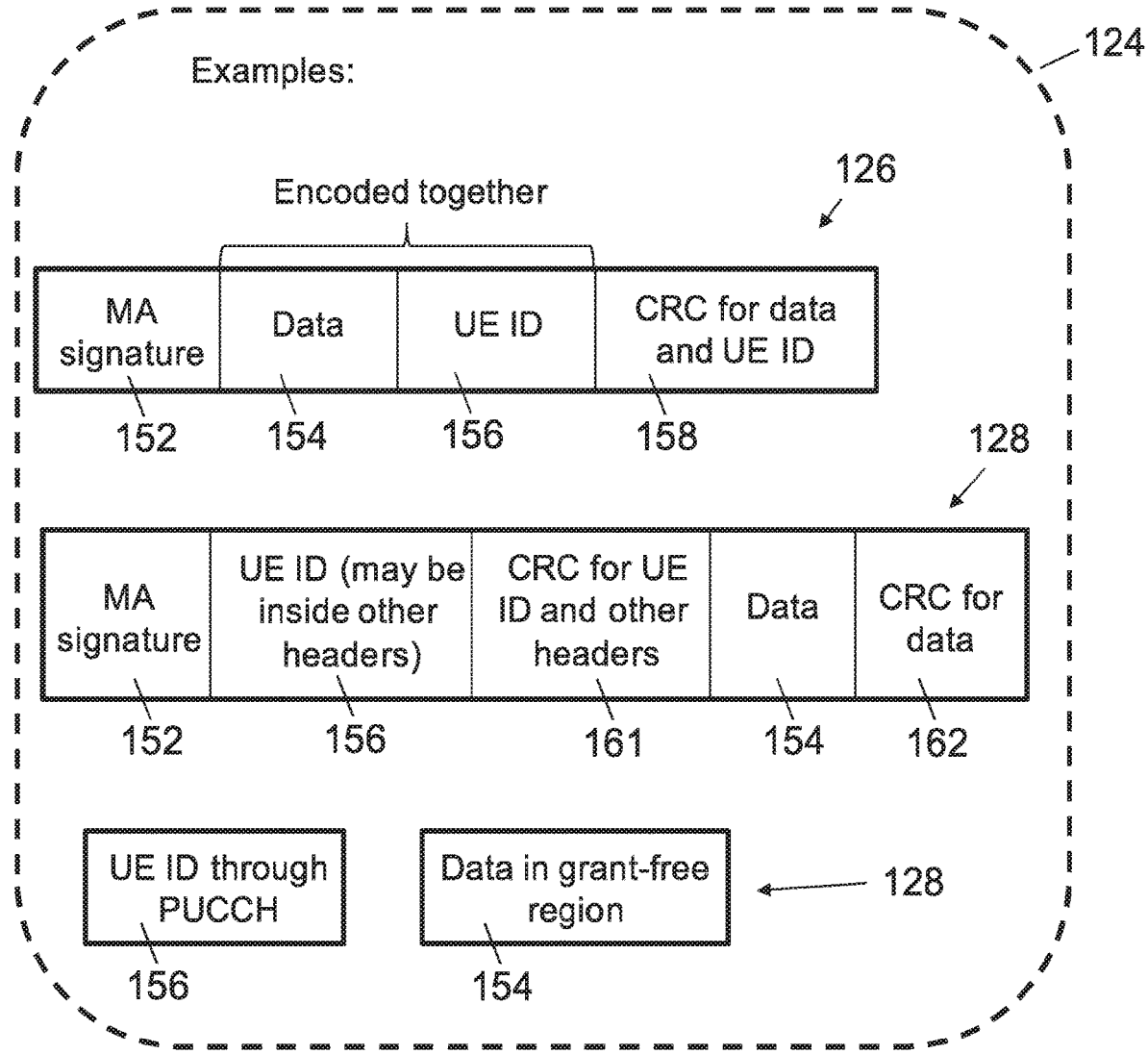
FIG. 6A illustrates examples of formats for messages according to embodiments of the disclosure.
Figure 6B:
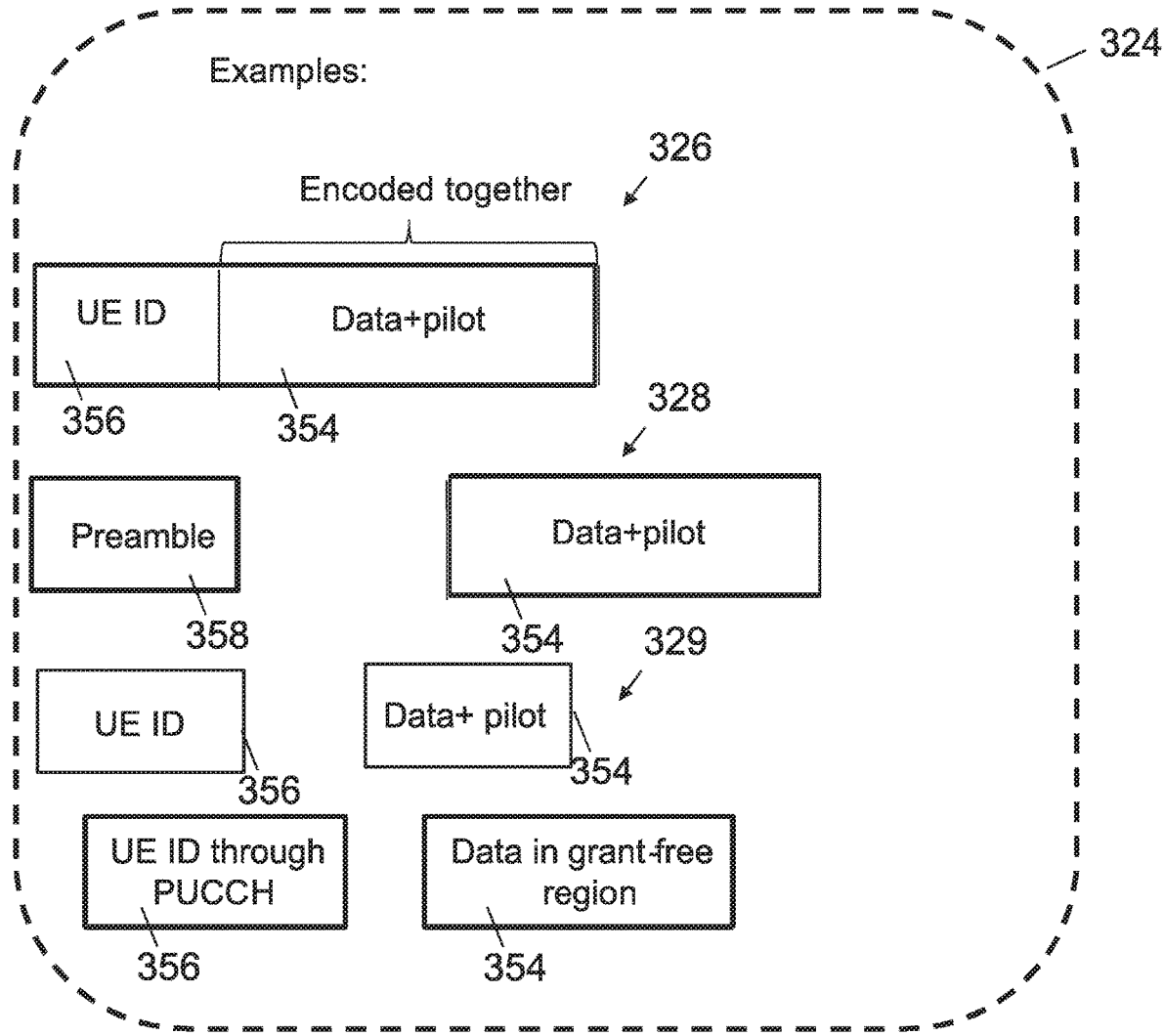
FIG. 6B illustrates additional examples of formats for messages according to an embodiment of the disclosure.

In step 304, after the first batch data has arrived, the UE transmits the first batch data transmission based on the assigned grant free transmission resource. The grant free resources may be assigned to the UE semi-statically. Semi-static is used here in comparison with the "dynamic" option that is operating in every time slot. For example, semi-static can operate periodically with a given time period, say, 200 or longer time slots. Once the grant-free UE obtains the assigned resources, it may transmit data using assigned resources right after data arrives without obtaining a grant. The UE may transmit the initial transmission of the first batch data using the assigned UL transmission resources. In some embodiments, once the first batch data arrives in the grant free UE's buffer, the UE determines the CTU regions of the next time interval or the earlier opportunity it can access from the resource assigned to the UE. The UE determines the next time interval for CTU access after data arrives, the UE searches for the CTU region at that time interval based on the assigned resource hopping sequence. The UE may then transmit the initial transmission of first batch of data using that CTU region and RS assigned for that region. The transmission may include a RS signal and a data signal. Examples of the transmitted data format are shown in FIGS. 6A and 6B and will be described below.

In step 305, the BS detects the data after receiving the first batch data transmission. In some embodiments, when the UE sends a message to the BS, the BS first attempts to detect the MA signature. Detecting the MA signature is referred to as activity detection. By successfully performing activity detection, the BS knows that a UE has sent a grant-free uplink transmission. However, successful activity detection may or may not reveal the identity of the UE to the base station. If there is a predefined RS pattern between a UE and an MA signature, for example as shown in Tables 8 and 9 below, then successful activity detection reveals the identity of the UE that sent the grant-free uplink transmission. In some embodiments, activity detection may further include obtaining the UE ID, e.g. if the UE ID is encoded separately from the data.

After activity detection is successful, the BS then attempts to perform channel estimation based on the MA signature and optionally additional reference signals multiplexed with the data message, and then decodes the data.

In step 306, the BS sends an ACK or NACK based on the decoding result.

The BS attempts to decode the initial transmission of the first batch data by first performing activity detection by decoding the RS signal, performing channel estimation using the RS signal and then attempting to decode the data. If the BS can successfully decode the data, the BS may send an ACK to the UE to confirm the successful decoding. If the BS does not decode the data successfully, the BS may send a NACK to the UE or does not send any feedback at all. In some embodiments, after initial transmission of first batch of data in step 304, the UE may choose to immediately retransmit the first batch data using the next available resources according to the resource assignment in step 303. In some other embodiments, the UE may wait for a predefined period, and if the UE receives an ACK within the predefined period, the UE will not perform the retransmission. Otherwise, the UE may retransmit the first batch data at the next available CTU resources after the predefined period.

The UE may check for ACK/NACK feedback either through a dedicated ACK/NACK channel, such as the Physical HARQ Indicator Channel (PHICH) or through DCI by searching the search space.

In FIG. 3A, it is assumed that the BS has transmitted an ACK in step 306 as the grant free UE has received a second batch data transmission and is not retransmitting the first batch data transmission. The UE transmits the second batch data in step 307 based on the obtained transmission resource without communicating, to the network entity, a corresponding transmission resource assignment assigning the transmission resources to the UE. In step 308, the BS detects the data after receiving the second batch data transmission. The steps 307 to 309 perform the similar activity with steps 304 to 306.

If the BS had sent a NACK, then the UE would retransmit the first batch data transmission based on the assigned transmission resource defined in the RRC signaling or an alternative transmission resource that is provided to the UE.

In some embodiments of FIG. 3A, the UE may only check for a dedicated ACK/NACK channel, like PHICH, but does not check for DCI after a first transmission. Therefore, the UE may only perform grant free transmission and retransmission. The UE may save energy by not requiring to check DCI even after the first transmission.

RRC Signaling and DCI for Retransmission

Figure 3B:
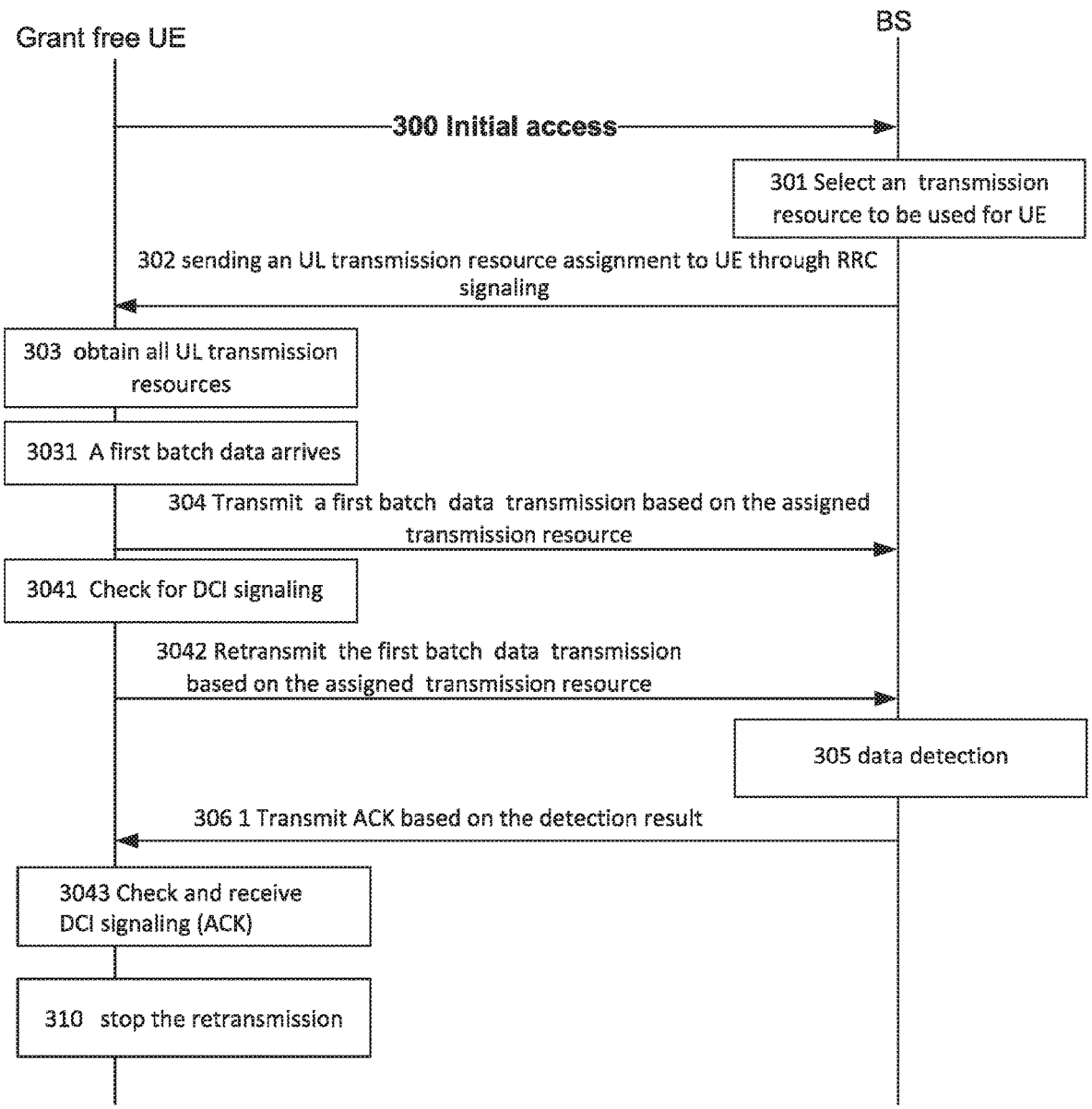

FIG. 3B illustrates another embodiment procedure for UL grant free transmissions that includes using RRC signaling and complementary DCI after an initial transmission. In a similar manner to FIG. 3A, as part of the initial resource configuration the grant free UE does not check the DCI before the initial transmission to the BS. After the initial transmission, the UE checks the DCI for possible retransmission instructions. In some embodiments, if retransmission is necessary, the BS may switch to a grant based scheme.

Steps 300, 301, 302, 303, 3031 and 304 of FIG. 3B are the same as in FIG. 3A.

In step 3041 of FIG. 3B, the grant free UE checks for DCI signaling at a designated time after the transmission of step 304. Based on the information received from the BS, such as the system information and/or assigned UE ID defining the search space where the DCI message is located, the grant free UE detects the DCI. The grant free UE then decodes the DCI by first verifying that the CRC in the DCI payload is scrambled using a grant free UE ID (such as GF_RNTI). If the CRC includes the grant free UE ID, the UE decodes all other fields. Otherwise, the DCI is not a target for the UE.

The DCI message may indicate an ACK, NACK or grant for retransmission as appropriate. If there is no DCI signaling detected by the grant free UE, the UE may retransmit the first batch data based on the assigned transmission resource, as shown in step 3042.

Once the BS has detected the data in step 305, the BS is shown sending an ACK to the grant free UE in the DCI message at step 3061 because the data was successfully detected.

Once the UE has checked for DCI and detected the ACK 3043, the UE can stop any retransmission that may have been planned.

Alternatively, the BS could send a grant for retransmission. Such a situation is shown in FIG. 3C.

Figure 3C:
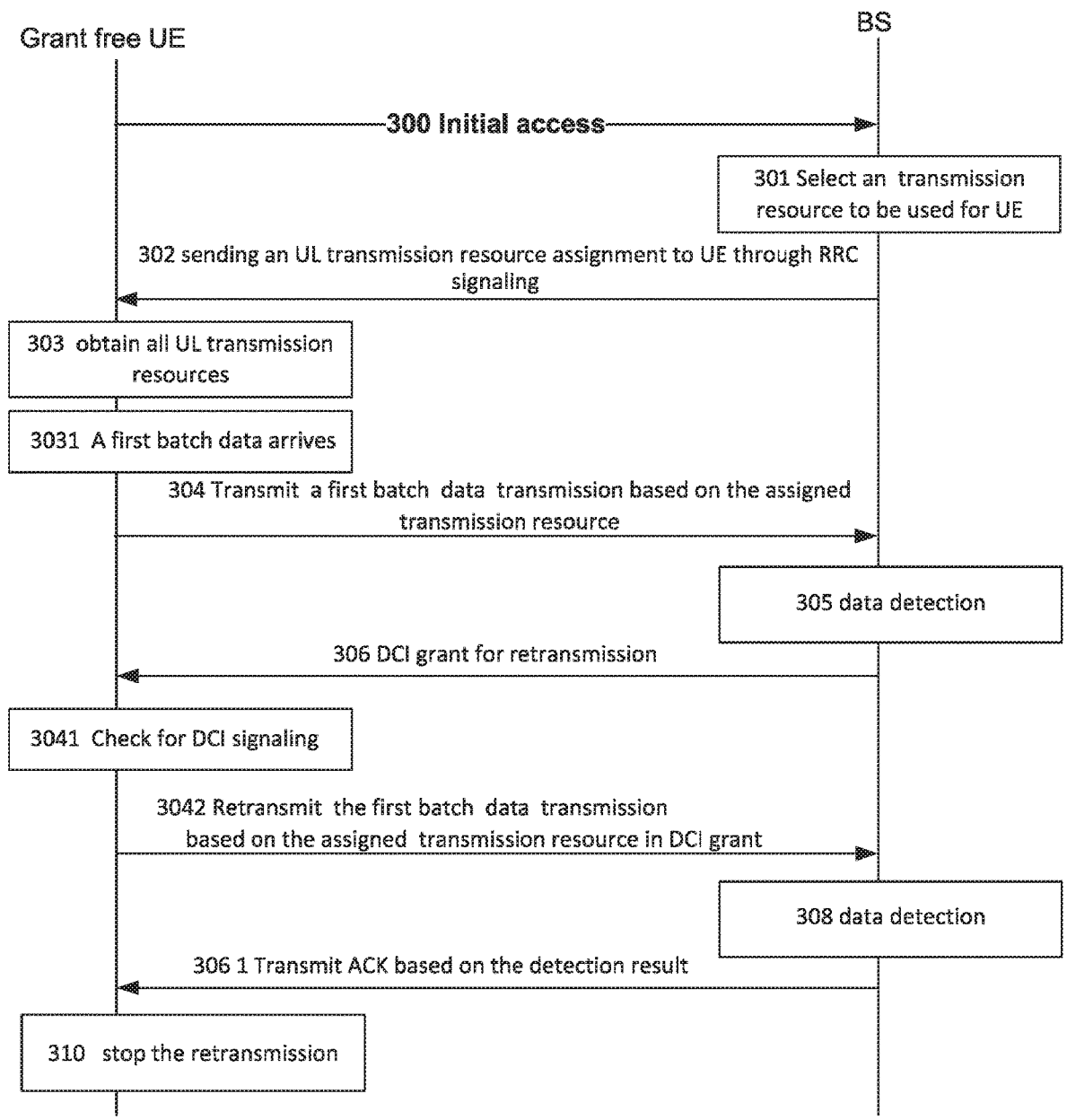

FIG. 3C illustrates another embodiment procedure for UL grant-free transmissions that includes using RRC signaling and DCI for retransmission. FIG. 3C provides an example of when the data is not successfully received by the BS and thus the BS arranges for a retransmission by the UE.

Steps 300, 301, 302, 303, 3031 and 304 are the same as in FIG. 3B.

Once the BS has detected the data in step 305, if the BS is not successful in detecting the data, the BS may send a DCI message that includes a grant for retransmission of the data, as shown at step 306.

In some embodiments, the DCI message may implicitly or explicitly include a NACK. If the UE receives a NACK without the grant for retransmission, the UE may retransmit on the same grant free resource configured in the RRC signaling of step 302. In some embodiments, the DCI message may define a new grant and an indication to reschedule the failed packet transmission. In some embodiments, the DCI message may define a same transmission resource that was previously defined for the grant free transmission for the UE to retransmit on. In some embodiments, the DCI may include an updated transmission scheme such as MCS to be used by the UE.

In step 3041, the grant free UE checks for DCI signaling. This is the same as in FIG. 3B and is described above. Upon detecting the grant for retransmission from the BS, at step 3042 the UE may retransmit the first batch data transmission based on the assigned transmission resource in the grant for retransmission.

Once the BS has detected the data in step 308, if the data is successfully detected, the BS sends an ACK to the UE, as shown at step 3061. If the data is not successful, the BS sends a NACK or another grant for retransmission and steps 306, 3041 and 3042 may be repeated.

Once the UE has detected the ACK, the UE can stop any retransmission of the first batch data transmission at step 310.

The DCI signaling format may include, for grant based retransmission, a typical DCI format. The DCI format may include, for example, MCS, resources block used, redundancy version (RV), new data indicator (NDI) etc.). The DCI format for a grant based retransmission may look like the following Table 1. Setting NDI to 1 may implicitly indicate this is a NACK and retransmission is granted using the resource defined in the DCI.

TABLE 1

DCI Fields and Formats

| Field | Value |
|---|---|
| MCS/RV | RV = next RV value (not 0), may include new MCS value for retransmission |
| NDI | 1 (retransmission) |
| DMRS Cyclic Shift | Signal the actual RS value to be used for grant based retransmission |
| Resource Block Allocation | Signal the actual resource block to be used for the grant based retransmission |

More generally, the DCI message or signaling used for retransmissions may indicate whether the retransmission is grant free and/or grant-based. For example, for single packet retransmissions, the DCI may include a new or existing field that indicates whether the retransmission is grant-based using the assigned transmission resource in the grant for retransmission as suggested above or grant free using the pre-configured grant-free resources. In one implementation, one NDI value indicates a grant-based retransmission while a different NDI value indicates a grant free retransmission. In some embodiments, whether the retransmission is grant free or grant-based is can be implicitly derived from some existing field.

Alternatively, the DCI signaling may indicate different resources for different retransmissions. For example, the DCI signaling may indicate (implicitly or explicitly) grant-based resources for a first retransmission and/or grant free resource for the second (up to N) retransmissions using the pre-configured grant-free resources. In another example, the DCI signaling may indicate (implicitly or explicitly) grant-based resources for a first retransmission and/or different grant-based resources for the second (up to N) retransmission in the same or different DCI signaling. Other possibilities exist for DCI signaling that indicates whether a retransmission is grant free or grant based and the resources indicated to be used.

In some embodiments, a UE starts initial (or first packet) grant-free transmission of one packet, where one or multiple repetitions can be included in the initial transmission based on the grant-free resource pre-configuration for the UE. After the initial transmission, the UE will wait for an ACK, a NACK, or a DCI signaling grant from the BS. If the NACK (e.g., to the UE pilot) message, or nothing, is received, the UE can use the grant-free resource for retransmissions as configured. The number of repetitions to be performed by the UE, K, can be configured in RRC signaling as described in the present disclosure. The grant free retransmission may include another set of K repetitions. If the DCI signaling includes a UL grant, the UE can switch to the grant-based retransmissions, where the BS can optionally use another DCI based signaling to change the grant-based retransmissions for the packet to grant-free retransmissions using the preconfigured resources.

In other embodiments, indicated by another DCI signaling, the first retransmission of one packet uses the grant based resource, and the second-N retransmission of the packet (if applicable) uses the grant free assigned resources. In another embodiment, the first retransmission of one packet uses the grant based resource, indicated by one DCI signaling and the second-N retransmission of the packet (if applicable) uses the grant free assigned resources, indicated by another DCI signaling. These changes can also be indicated by other indicators or options. For next new data packet transmission, the UE still uses the grant free transmissions with pre-assigned (or pre-configured) resource. This may mean that in the grant free scheme, the new data packet always uses the grant free transmissions and retransmissions, until the UE is notified by the BS to switch to the grant based transmissions for the retransmission packets.

The two examples of FIGS. 3B and 3C illustrate initial access and then a single data transmission and ACK and initial access then a single data transmission and grant for retransmission. It is to be understood that initial access is not required before each transmission. The examples each show a single scenario for the sake of clarity and thus it would be understood that a series of ACK, NACK or grant for retransmit occurrences could occur for series of data packets being transmitted from UE to BS.

RRC Signaling with a Group Assignment

Figure 3D:
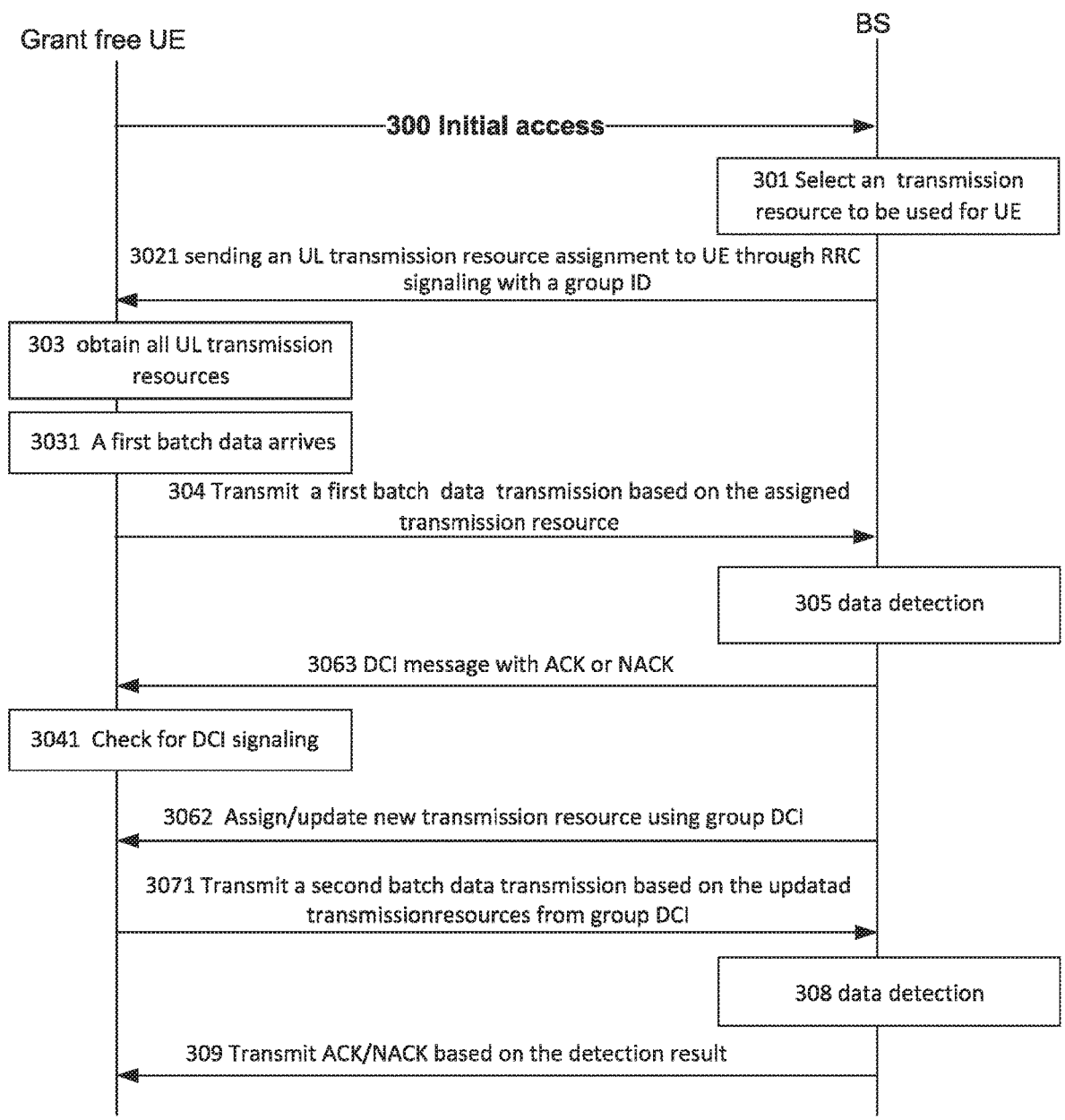

FIG. 3D illustrates another embodiment procedure for UL grant-free transmissions that includes using RRC signaling with a group assignment. The RRC signaling assigns a group ID to the grant free UE. Other UEs in the same group may be given the same group ID through the other UE's own respective RRC signaling, as the RRC signaling is UE specific. The UE is configured to search a predefined search space of a transmission resource for further DCI messages that are addressed for a group of grant free UEs that are assigned the group ID.

Figure 3E:
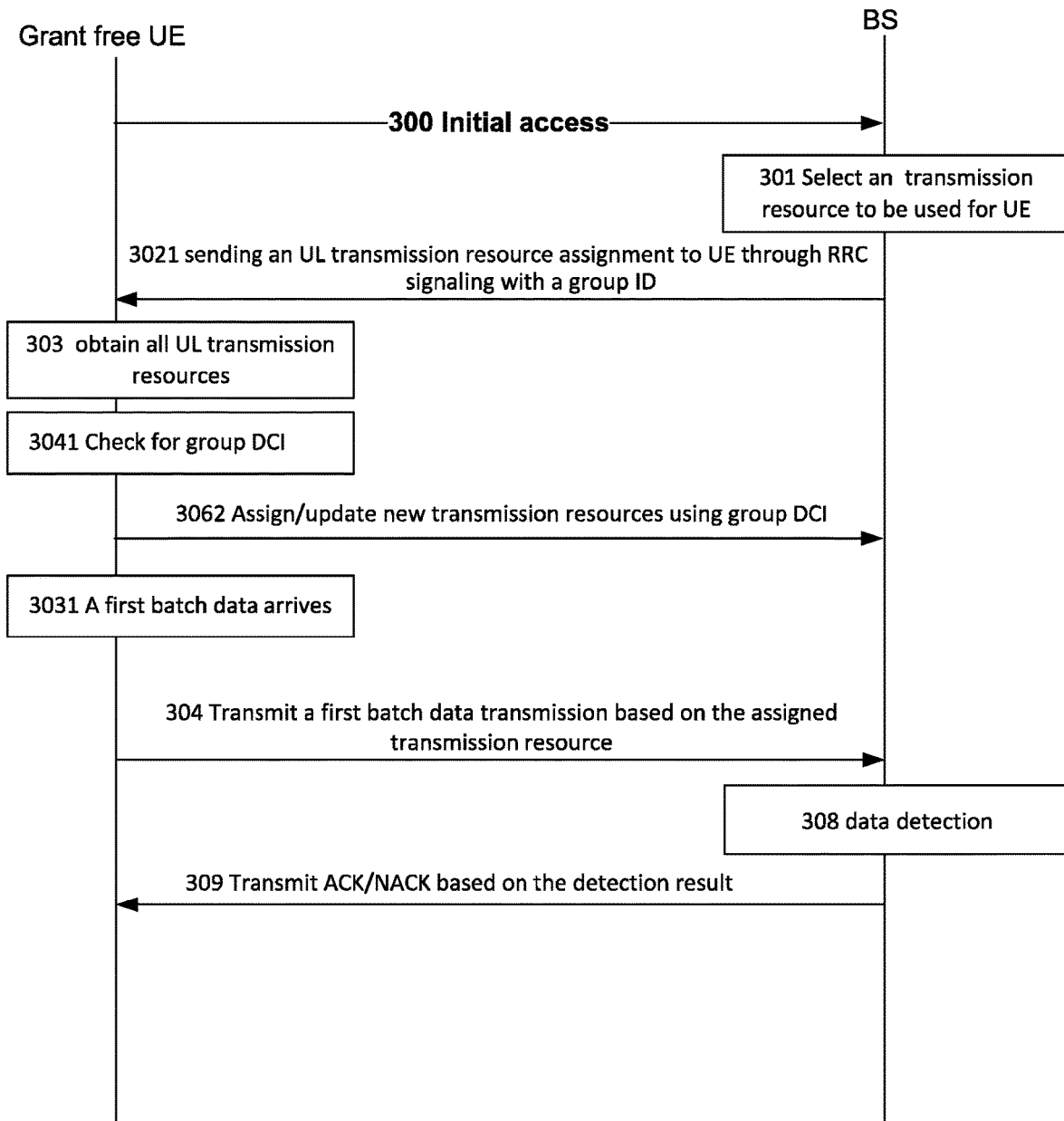

In FIG. 3D, the UE does not need to check for group DCI before first transmission. In FIG. 3E that will be described below, the UE needs to constantly check for group DCI, and after obtaining the group DCI, it can perform grant free transmission. Also, because FIG. 3E includes DCI signaling before grant free resource assignment, while FIG. 3D relies on RRC signaling only, the signaling format may also be different.

Steps 300 and 301 are the same as in FIG. 3A.

Step 3021 is similar to step 302 in FIG. 3A, except that the RRC signaling includes a group ID.

Steps 303, 3031, 304 are the same as in FIG. 3D.

Once the BS has detected the data in step 305, the BS sends a DCI message that includes an ACK or NACK, as shown at step 3063.

In step 3041, the grant free UE checks for DCI signaling in a similar manner as that described in FIGS. 3B and 3C. The grant free UE checks at a predefined search space and uses the group ID to decode the DCI for further instructions on resource assignment and other instructions.

In step 3062, the BS assigns or updates a new transmission resource using the DCI with the group identifier.

When a second batch data transmission arrives at the UE, the UE transmits the second batch data in step 3071 based on the updated transmission resource from the group DCI. Steps 308 and 309 perform the similar activity as steps 305 and 306.

FIG. 3E illustrates another embodiment procedure for UL grant-free transmissions that includes using RRC signaling with a group assignment.

Steps 300, 301, 3021 and 303 are the same as in FIG. 3D.

In step 3041, the grant free UE checks for DCI signaling in a similar manner as that described in FIG. 3D. The UE checks at the predefined search space and uses the group ID to decode the DCI for further instructions on resource assignment and other instructions.

In step 3062, the BS assigns or updates a new transmission resource using a group DCI.

When a first batch data arrives at the UE (step 3031), the UE transmits the first batch data in step 304 based on the assigned transmission resource from the group DCI. Once the BS has detected the data in step 308, the BS sends a DCI message that includes an ACK or NACK, as shown at step 309.

RRC Signaling with DCI Activation

Figure 3F:
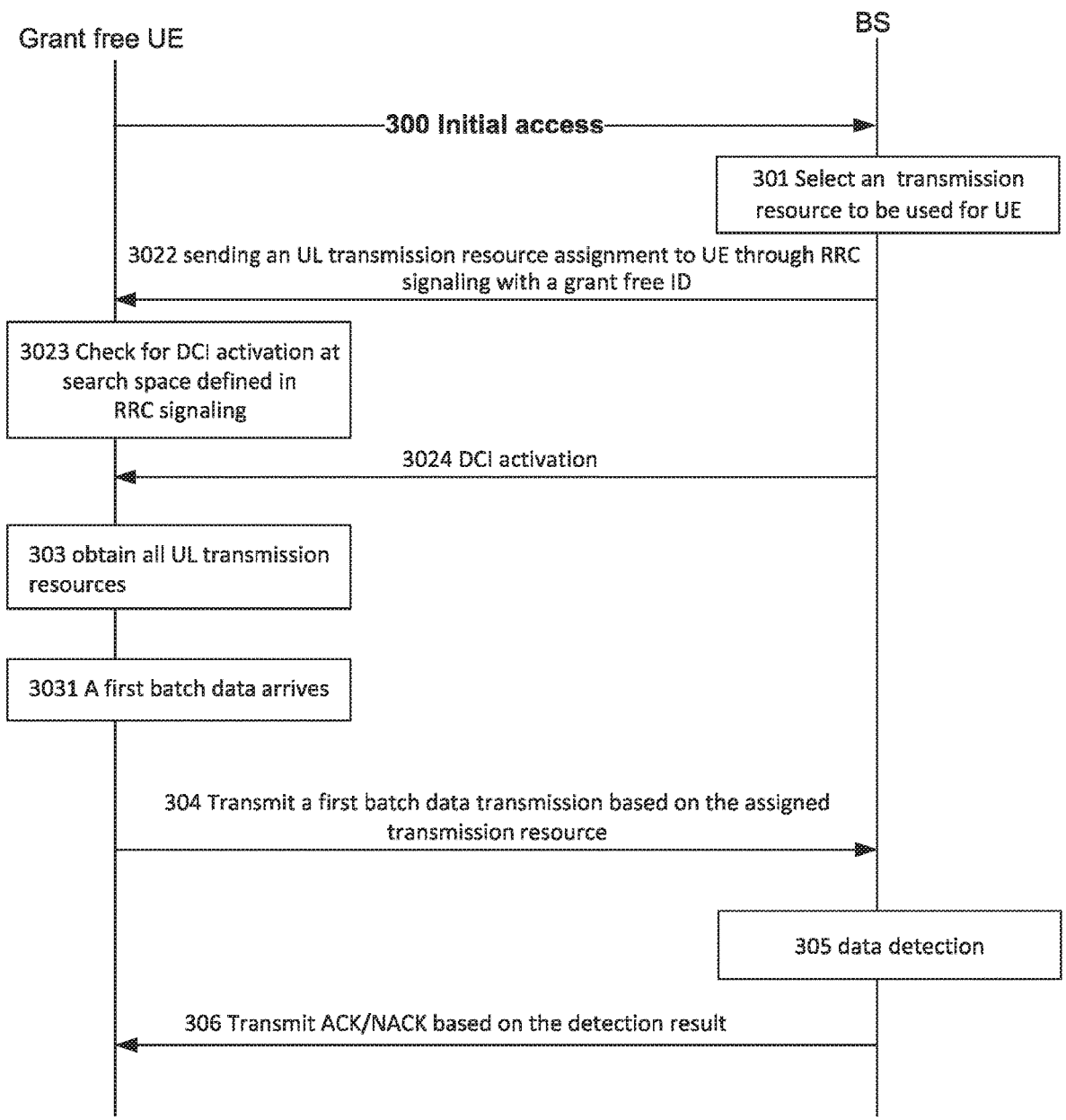

FIG. 3F illustrates another embodiment procedure for UL grant-free transmissions that includes using RRC signaling with complementary DCI Signaling. The DCI signaling may function as activation or deactiviation for transmission on the assigned grant free resource. Activation and deactivation indicators are sent by the BS using DCI messages to indicate that the UE is permitted or not permitted to perform grant free transmission. In this case, the DCI activation may provide further information for grant free resource assignment. Without the DCI activation, the UE may not get enough information for grant free transmission using RRC signaling alone.

In some embodiments, the DCI may have the format shown in Table 2 below.

TABLE 2

| DCI Fields and Formats | |
|---|---|
| Field | Value |
| MCS/RV | Initial MCS value, RV = 0 |
| NDI | 0 (new transmission) |
| DMRS Cyclic Shift | Signal the first RS value at a given frame |
| Resource Block Allocation | Signal a first resource block allocation at a first time interval |

Based on the first RS value, first resource block in combination with resource hopping sequence and RS hopping sequence (or just predefined RS hopping rule over frames), the UE can figure out the particular resource/RS allocation at each CTU.

The RRC signaling assigns a grant free UE ID or a group ID to a group of UEs. The RRC signaling also includes the definition of the search space so that the UE knows where to search for the DCI activation. After receiving RRC signalling, the UE still cannot perform GF transmission until receiving a further DCI signalling. In some cases, the DCI signalling may serve as an activation of the grant free transmission. In some embodiments, the DCI signalling just serves as a semi-static complementary signalling to help specify some grant free resources for the UE. The UE must wait until receipt of the DCI activation. Thus, the UE must monitor the search space for the activation and deactivation indicators. The grant free UE decodes the DCI using the assigned grant free or group ID for activation or deactivation of grant free transmissions.

Steps 300 and 301 are the same as in FIG. 3A.

Step 3022 is similar to step 302 in FIG. 3A, except that the RRC signaling includes a grant free ID.

Step 3023 includes the UE checking for a DCI message including an activation at a search space defined in the RRC signaling or possibly a combination of the RRC and system signaling.

In step 3024, the BS sends a DCI activation message to the UE.

Step 303, 3031, 304, 305 and 306 are the same as in FIG. 3A.

After activation, the UE performs grant free transmission on the assigned resources based on both the RRC signaling and the DCI activation.

The UE does not constantly check DCI after receiving the DCI activation. The UE may transmit in grant based format until DCI activation is activated.

The DCI message may also be used for deactivation. When the UE receives a deactivation DCI, the UE stops transmitting on the grant free resources.

The DCI for grant-free UE resource configuration or activation may include a first RS value, a first resource block and a first MCS value at a first subframe. With this information in combination with a resource hopping sequence and RS hopping sequence that is configured in RRC signaling, the UE can figure out exact resource/RS allocation at each CTU.

In some other embodiments, after RRC signaling, the UE may keep checking for further DCI messages. If there is a DCI that dynamically schedules the UE for grant-based transmission, the grant free UE may still be able to perform grant-based transmission based on the DCI. After the transmission, the grant free UE can switch back to grant-free transmission. In some other embodiments, the DCI may schedule an initial transmission for the UE, and also provide the information, such as MCS, initial RS, initial resource that help configure UE's grant-free assignment together with RRC signaling.

In some embodiments, a UE starts initial (or first packet) grant free transmission of one packet, where one or multiple repetitions can be included in the initial transmission based on the grant free resource pre-configuration for the UE. After the initial transmission, the UE will wait for an ACK, a NACK, or a DCI signaling grant from the BS. If the NACK (e.g., to the UE pilot) message, or nothing, is received, the UE will use the grant free resource for retransmissions as configured, and if the DCI signaling includes a UL grant, the UE will switch to the grant-based retransmissions, where the BS can optionally use another DCI based signaling to change the grant-based retransmissions for the packet to grant free retransmissions using the preconfigured resources.

In other embodiments, indicated by another DCI signaling, the first retransmission of one packet uses the grant based resource, and the second-N retransmission of the packet (if applicable) uses the grant free assigned resources. In another embodiment, the first retransmission of one packet uses the grant based resource, indicated by one DCI signaling and the second-N retransmission of the packet (if applicable) uses the grant free assigned resources, indicated by another DCI signaling. These changes can also be indicated by other indicators or options. For a next new data packet transmission, the UE still uses the grant free transmissions with pre-assigned (or pre-configured) resources, which means that in the grant free scheme, the new data packet always uses the grant free transmissions and retransmissions, until the UE is notified by the BS to switch to the grant based transmissions for the retransmission packets.

For retransmissions of one packet, the BS can use DCI signaling to change to grant-based transmissions. In some embodiments, there can be a new DCI signaling to change the retransmissions back to grant-free transmission mode with the preconfigured resources. The signaling of the new DCI signaling may be one bit. For example, in the DCI format, there may be a new field, a grant free or grant-based retransmission indicator, where the value of this field equal to 0 indicates the retransmission is grant-based transmission and a value equal to 1 indicates retransmission is switching back to grant-free transmission.

There may be at least two types of UEs that are configured by the BS. The configuration may be done in RRC signaling, control channel or predefined for the UE. For the first type of UE, after initial GF transmission, the UE only monitors for an ACK/NACK message. There may be different possibilities for the UE when monitoring for an ACK. In some embodiments, the UE may continuously monitor for an ACK/NACK and conduct consecutive transmissions until it correctly receives an ACK. There may be a maximum number of consecutive transmissions K, the number K may be configured by the network, e.g., through RRC signaling or configured in DCI. In another embodiment, the UE may wait for an ACK/NACK to arrive within a predefined time slot before retransmission. If the UE receives an ACK within the predefined time limit, the UE stops retransmission, otherwise the UE retransmits. In some other embodiments, the UE may continuously perform K transmissions before checking for ACK/NACK feedback. If the UE does not receive an ACK when the UE checks, the UE may perform another K transmissions. In another embodiment, the UE may perform continuous transmissions K times without checking for ACK/NACK and then enter DRX/sleeping mode. The ACK/NACK may be transmitted through a dedicated ACK/NACK channel, like PHICH or a control channel, e.g., in a DCI.

For the second type of UE, after initial grant free transmission, the UE can monitor both ACK/NACK and scheduling information. The scheduling information is typically transmitted in a DCI. Scheduling information may include transmission resource blocks, a reference signal, MCS, redundancy version (RV) and other transmission parameters. In some embodiments, the UE monitoring interval T (in the unit of subframes/TTIs) may be configured by the network. In some embodiments, T>1. In other embodiments, T=1.

Figure 3G:
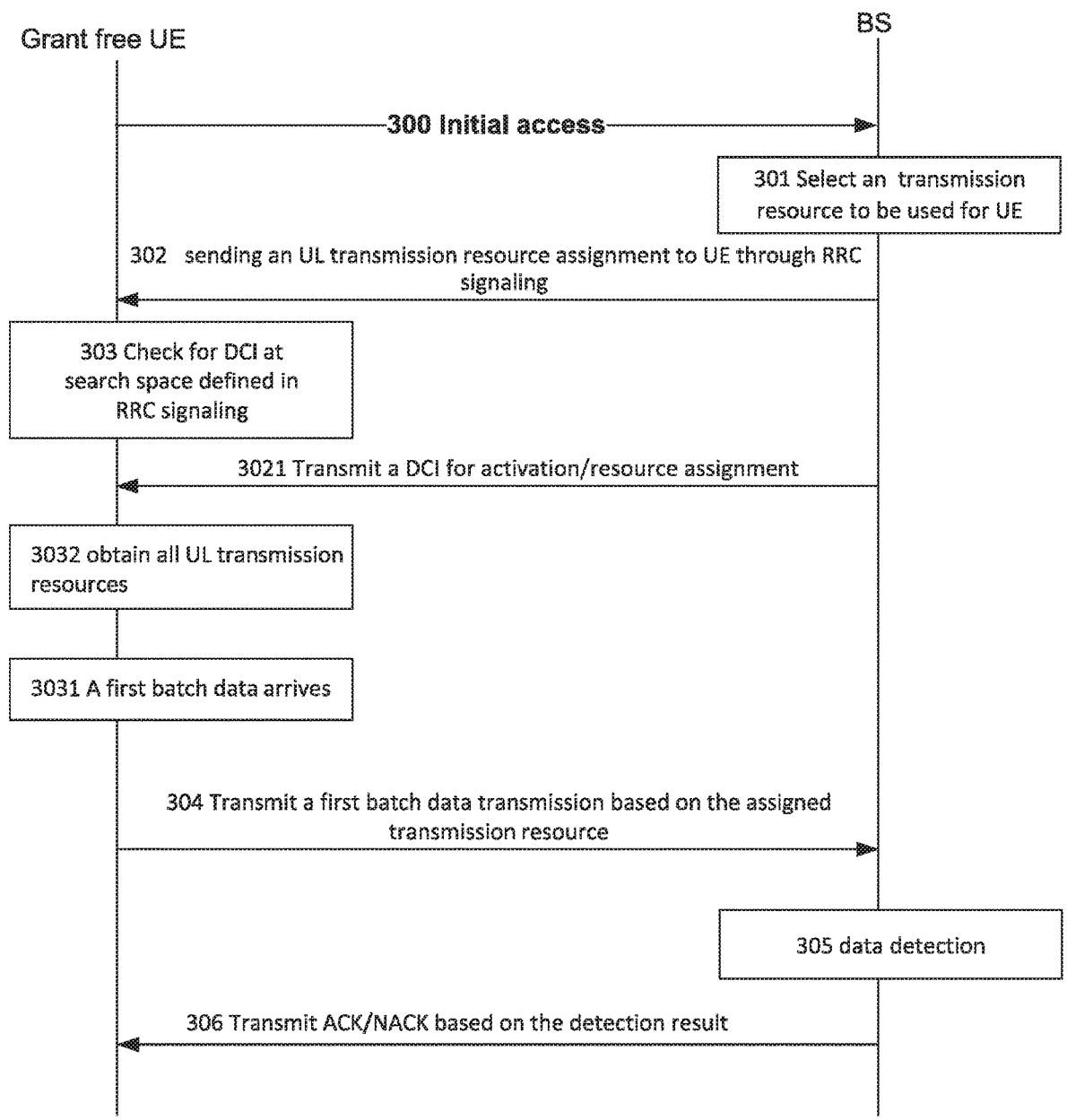

FIG. 3G illustrates another embodiment procedure for UL grant-free transmissions that includes using RRC signaling with complementary DCI signaling.

The RRC signalling information described below may be also applicable to all other embodiments and examples (FIG. 3A to 3G) described in this disclosure.

The RRC signaling may include information for defining the grant free transmission resource that has a format that is similar to that of known semi-persistent scheduling (SPS), for example, the RRC signalling for LTE-SPS format configuration.

Fields in the UL configuration field may include, but are not limited to, the following examples.

The RRC signaling may include a grant free ID field (such as GF-RNTI) and one or more configuration fields for configuring for UL (gf-ConfigUL) and/or for configuring for downlink (DL) (gf-ConfigDL).

In some embodiments, the grant-free ID (GF-RNTI) or group ID (group_RNTI) may be assigned such that it has a predefined mapping relationship with the resource hopping pattern. For example, the GF-RNTI may include the UE index shown in FIG. 5A, which has a unique mapping with the resource hopping pattern as described in the disclosure. In some embodiments, the GF-RNTI may contain both the UE index (that is used to identify the resource hopping pattern and RS hopping pattern) and a UE ID (C-RNTI) that is used for decoding DCI. In some embodiments, the UE index may be among the first few bits of GF-RNTI and the UE ID for decoding DCI may be the other few bits. In some embodiments, the UE index and the UE ID for decoding DCI may be masked together in GF-RNTI and can be retrieved by performing a XOR function with a predefined value. In some embodiments, GF-RNTI has a one to one mapping relationship with the resource hopping pattern and RS hopping pattern. In such scenarios, the resource hopping pattern and RS hopping pattern may not need to be explicitly signaled in RRC.

Fields in the UL configuration field may include, but are not limited to, the following examples. All the fields may be optional depending on the situations.

A field indicating a number of empty transmissions before an implicit release. Value e2 corresponds to 2 transmissions, e3 corresponds to 3 transmissions and so on. (implicitReleaseAfter)[see 3GPP TS 36.321: "Evolved Universal Terrestrial Radio Access (E-UTRA); Medium Access Control (MAC) protocol specification". [6, 5.10.2]

A field for List of parameter: $n_{PUCCH}^{(1,p)}$ for antenna port P0 and for antenna port P1 respectively. Field n1-PUCCH-AN-PersistentListP1 is applicable only if the twoAntennaPortActivatedPUCCH-Format1a1b in PUCCH-ConfigDedicated-v1020 is set to true. Otherwise this field may not configured. (n1PUCCH-AN-PersistentList, n1PUCCH-AN-PersistentListP1) [see 3GPP TS 36.213: "Evolved Universal Terrestrial Radio Access (E-UTRA); Physical layer procedures". [23, 10.1]

A field that defines a number of configured HARQ processes for downlink Semi-Persistent Scheduling. (numberOfConfSPS-Processes) [see TS 36.321 [6]].

A field that defines the number of configured HARQ processes for uplink Semi-Persistent Scheduling or uplink grant-free transmission. This field may be configured for asynchronous UL HARQ. Otherwise this field may not be configured. (numberOfConfUlSPS-Processes) see TS 36.321 [6]

A field that is a parameter: $P_{O\_NOMINAL\_PUSCH}(0)$. unit dBm step 1. This field is applicable for persistent scheduling or grant-free transmission configuration, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1. (p0-NominalPUSCH-Persistent) See TS 36.213 [23, 5.1.1.1]

A field that is a parameter: $P_{O\_NOMINAL\_PUSCH}(0)$. unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2. (p0-NominalPUSCH-PersistentSubframeSet2) See TS 36.213 [23, 5.1.1.1], A field that is a parameter: $P_{O\_UE\_PUSCH}(0)$. unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1. (p0-UE-PUSCH-Persistent) See TS 36.213 [23, 5.1.1.1], A field that is a parameter: $P_{O\_UE\_PUSCH}(0)$. unit dB. This field is applicable for persistent scheduling and grant-free transmission, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2. (p0-UE-PUSCH-PersistentSubframeSet2) See TS 36.213 [23, 5.1.1.1]

A field to define the Semi-persistent Scheduling C-RNTI, [see TS 36.321 [6]]. (semiPersistSchedC-RNTI) and in the case of grant-free transmission, the UE ID for grant-free transmission (GF-RNTI) or a group ID for group based grant-free transmission (Group-RNTI)

A field defining a semi-persistent scheduling interval in downlink. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. (semiPersistSchedIntervalDL), see TS 36.321 [6]

A field defining a semi-persistent scheduling interval or grant-free transmission interval in uplink, Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames. (semiPersistSchedIntervalUL)[see TS 36.321 [6].]

A field for triggering of two-intervals-Semi-Persistent Scheduling or two-intervals-grant-free transmission in uplink. If this field is present, two-intervals-SPS is enabled for uplink. Otherwise, this field may be disabled. (twoIntervalsConfig) [See TS 36.321 [6, 5.10]].

A grant free frame interval for UL field that defines the periodicity of the resource hopping pattern in terms of number of sub-frames. It may use frame length, in which case the field may be optional (use frame length defined for the system by default).

A grant free schedule interval UL field that defines the interval between two grant free transmission opportunities. In some implementations, the field default is 1 if not specified. The interval may be the time interval between two grant free resources, which is sometime called periodicity of the grant-free resource.

There may also be fields for power control related parameters that may serve a similar purpose as the one used for LTE semi-persistent scheduling (SPS).

A CTU size frequency field that defines the number of RBs used per CTU in frequency domain or CTU region block size. In some embodiment, the frequency domain indication of grant-free resource may indicate the resource block index (physical resource block index or virtual resource block index). The resource block index can also be indicated using the starting or ending RB index and the number of RBs. In some implementations, time domain size may default to a subframe or TTI, so only frequency domain needed. The field is not needed if defined in SIB or there is complementary DCI signaling. The time domain size of the resource (e.g. TTI) can also be defined in RRC, e.g. a slot, a mini-slot, multiple slots, an OFDM symbol or multiple OFDM symbols. There may be another field defines the time domain location of the grant-free resources. For example, there may be an offset value besides the periodicity signaled in RRC signaling. The offset value indicate the time location of one grant-free resource, e.g. it can indicate the time location (e.g. a slot index) of grant-free resource with respect to system frame number (SFN)=0. In some embodiment, offset may not need to be signaled, it can have a default value, e.g. at slot 0.

A resource hopping pattern field to define the resource hopping pattern. In some embodiments, the resource hopping pattern field is defined as a sequence of frequency location indices at each frame and at each time interval with unit time equals to a grant free schedule interval UL value. In some embodiments, the resource hopping pattern field is defined as a sequence of frequency location indexes at each frame at each time interval in general. The time interval can be a TTI, a slot, a time slot, a sub-frame, a mini-slot, an OFDM symbol, a number of OFDM symbols, or any time unit. The time interval can also be the time location of the grant free resources, the location of grant free resources can be separated by the configured periodicity of the resource. For example, the resource hopping pattern can be defined as a frequency partition or sub-band index at each slot within a frame or within a resource hopping pattern periodicity. In some embodiments, the resource hopping pattern field is defined by a sequence of CTU indices at each time interval in each frame. A resource hopping pattern may be provided to the grant free UE in the form of any one of 1) a single UE index defined from a predefined resource assignment rule, 2) a resource hopping index sequence indicating the frequency index of each time interval, or 3) any implicit or explicit signaling of actual physical time-frequency resources that can be used at each time slot. Here, the resource hopping pattern also includes the indication of time-frequency resource of the grant-free resources.

A RS hopping sequence field to define the RS hopping sequence. The RS hopping sequence field may include an index of RS to be used in frame n. If RS changes every time interval, the RS hopping sequence field may include a sequence of indices at each time interval. The RS hopping sequence may not be needed if a complementary DCI is available. A RS hopping sequence may be provided to the grant free UE in the form of any one of 1) Fixed RS and 2) a RS hopping sequence in each frame. The RS hopping sequence in general refers to the indication of reference signal at different resources. It can be a single RS index or different RS index at different time-frequency grant-free resources. There may be multiple RS index signaled for different transmission or retransmission state. For example, a RS index may be signaled to a UE for initial grant-free transmission and another RS index may be signaled to the UE for the rest of the repetitions/retransmissions.

An MCS field to provide MCS information, if no complementary DCI signaling is being used.

A search space field for further DCI grant that may also be predefined by GF_ID or Group_ID.

The RRC format may include an indication that the UE is a grant-free UE or that the UE is allowed to transmit using GF resource. The RRC format may include a grant free UE ID (such as GF_RNTI) or a group based ID (such as Group_RNTI) that is used for decoding further instructions using DCI.

In some embodiments, DCI signaling may be used to provide additional relevant information to the UE. In some implementations, an activation or deactiviation indicator may be provided using DCI. Activation and deactivation indicators can be sent by the BS to indicate that the UE is permitted or not permitted to be using the grant-free transmission resource defined for the UE.

In some embodiments, without the DCI activation, the UE may not get enough information for grant free transmission using RRC signaling alone.

DCI Format

The DCI format that is used to activate/release grant free in UL or sending or grant for transmission/retransmission or used for configure grant-free resource along with RRC signaling. The DCI format may be similar to the DCI format that is used for the scheduling of PUSCH in one UL cell.

The following information may be included in the DCI format transmitted by means of the DCI format. The DCI format may have other new fields, some of them are described in the disclosure and all of the fields may be optional.

A carrier indicator field that may be 0 or 3 bits. This field is present according to the definitions in (3GPP TS 36.213: "Evolved Universal Terrestrial Radio Access (E-UTRA); Physical layer procedures". [3])

A flag for format0/format1A differentiation that may be 1 bit, where a value equal to 0 indicates format 0 and a value equal to 1 indicates format 1A.

A frequency hopping flag that is 1 bit as defined in section 8.4 of [3]. This field is used as the most significant bit (MSB) of the corresponding resource allocation field for resource allocation type 1.

A resource block assignment and hopping resource allocation field that is $\lceil \log_2(N_{RB}^{UL}(N_{RB}^{UL}+1)/2) \rceil$ bits. In the case of PUSCH hopping for a resource allocation type 0 only), $N_{UL\_hop}$ MSB bits are used to obtain the value of $\tilde{n}_{PRB}(i)$ as indicated in section 8.4 of [3]. A number of bits equal to $(\lceil \log_2(N_{RB}^{UL}(N_{RB}^{UL}+1)/2) \rceil)-N_{UL\_hop}$ bits provides the resource allocation of the first slot in the UL subframe. In the case of non-hopping PUSCH with resource allocation type 0, $(\lceil \log_2(N_{RB}^{UL}(N_{RB}^{UL}+1)/2) \rceil)$ bits provide the resource allocation in the UL subframe as defined in section 8.1.1 of [3]. In the case of non-hopping PUSCH with resource allocation type 1, the concatenation of the frequency hopping flag field and the resource block assignment and hopping resource allocation field provides the resource allocation field in the UL subframe as defined in section 8.1.2 of [3].

A modulation and coding scheme and redundancy version field that is 5 bits as defined in section 8.6 of [3].

A new data indicator field that is 1 bit.

A TPC command for scheduled PUSCH-2 bits as defined in section 5.1.1.1 of [3].

A Cyclic shift for DM RS and OCC index field that is 3 bits as defined in section 5.5.2.1.1 of (3GPP TS 36.211: "Evolved Universal Terrestrial Radio Access (E-UTRA); Physical channels and modulation". [2]).

A UL index field that is 2 bits as defined in sections 5.1.1.1, 7.2.1, 8 and 8.4 of [3]. This field is present only for TDD operation with uplink-downlink configuration 0.

A Downlink Assignment Index (DAI) field that is 2 bits as defined in section 7.3 of [3]. This field is present only for cases with TDD primary cell and either TDD operation with uplink-downlink configurations 1-6 or FDD operation. A CSI request field that is 1, 2 or 3 bits as defined in section 7.2.1 of [3]. The 2-bit field applies to UEs configured with no more than five DL cells and to UEs that are configured with more than one DL cell and when the corresponding DCI format is mapped onto the UE specific search space given by the C-RNTI as defined in [3], UEs that are configured by higher layers with more than one CSI process and when the corresponding DCI format is mapped onto the UE specific search space given by the C-RNTI as defined in [3] and UEs that are configured with two CSI measurement sets by higher layers with the parameter csi-MeasSubframe-Set, and when the corresponding DCI format is mapped onto the UE specific search space given by the C-RNTI as defined in [3]. The 3-bit field applies to UEs that are configured with more than five DL cells and when the corresponding DCI format is mapped onto the UE specific search space given by the C-RNTI as defined in [3]. For scenarios not cover by the 2 bit or 3 bit fields, the 1-bit field applies.

An SRS request field that is 0 or 1 bit. This field can only be present in DCI formats scheduling PUSCH which are mapped onto the UE specific search space given by the C-RNTI as defined in [3]. The interpretation of this field is provided in section 8.2 of [3].

A resource allocation type field that is 1 bit. This field is only present when $N_{RB}^{UL} \leq N_{RB}^{DL}$. The interpretation of this field is provided in section 8.1 of [3]. If the number of information bits in format 0 mapped onto a given search space is less than the payload size of format 1A for scheduling the same serving cell and mapped onto the same search space (including any padding bits appended to format 1A), zeros shall be appended to format 0 until the payload size equals that of format 1A.

In some embodiments, the activation DCI may have the following format:

TABLE 3

DCI Fields and Formats

| Field | Value for DCI 0 |
|---|---|
| TPC Command for Scheduled PUSCH | "00" |
| Cyclic shift DM RS | "000" |
| Modulation and Coding Scheme and Redundancy Version | MSB set to "0" |
| HARQ Process Number | N/A |
| Modulation and Coding Scheme | N/A |
| Redundancy Version | N/A |

In some embodiments, the deactivation (or release) DCI may have the following format:

TABLE 4

DCI Fields and Formats

| Field | Value for DCI 0 |
|---|---|
| TPC Command for Scheduled PUSCH | "00" |
| Cyclic shift DM RS | "000" |
| Modulation and Coding Scheme and Redundancy Version | "11111" |
| Resource block assignment and hopping resource allocation | set to all "1"s |
| HARQ Process Number | N/A |
| Modulation and Coding Scheme | N/A |
| Redundancy Version | N/A |
| Resource block assignment | N/A |

In some embodiments, the activation DCI may have the following format:

TABLE 5

DCI Fields and Formats

| Field | Value |
|---|---|
| MCS/RV | Initial MCS value, RV = 0 |
| NDI | 0 (new transmission) |
| DMRS Cyclic Shift | Signal the first RS value at a given frame |
| Resource Block Allocation | Signal a first resource block allocation at a first time interval |

In the above format, the DCI activation also includes some information for semi-static resource configuration or an initial scheduling grant. When used for semi-static resource configuration. Based on the first RS value, first resource block in combination with resource hopping sequence and RS hopping sequence (or just predefined RS hopping rule over frames), the UE can figure out the particular resource/RS allocation at each CTU.

In some embodiments, the DCI may be used to schedule a continuous transmission until an ACK is received instead of a single transmission. The hopping pattern of the transmission may be predefined, configured for the UE in RRC signaling or indicated in the DCI format. The indicator for the hopping pattern of continuous retransmission may be in the existing field, e.g. defined in the resource block field or a new field, e.g. a hopping index that indicate the hopping pattern.

In some implementations, additional information regarding the grant-free resource assignment may be provided by the BS using DCI. For example, the DCI may be used to provide the UE with information such as a resource hopping pattern or a reference signal (RS) hopping pattern. In this scenario, the RRC signaling may not need to configure the resource hopping pattern and reference signal (RS) hopping pattern. In some embodiments, there may be new fields in DCI, such as the resource hopping pattern or RS hopping pattern that is similar to the field as described with regard to RRC signaling. In some scenarios, this information may be indicated in an existing DCI format. For example, the resource hopping pattern can be indicated in the resource block assignment field. In some embodiments, the RS hopping pattern can be indicated in the DMRS cyclic shift field.

The RRC signaling assigns a grant free UE ID or a group ID to a group of UEs. The RRC signaling may also include the definition of the search space so that the UE knows where to search for the DCI activation. Alternatively, this may be included in the system information broadcast by the BS.

After receiving RRC signalling, the UE still cannot perform grant free transmission until the UE receives DCI signalling. In some cases, the DCI signalling may serve as the activation of the grant free transmission. In some embodiments, the DCI signalling just serves as a semi-static complementary signalling to help specify some grant free resources for the UE. The UE must wait until receipt of the DCI activation before performing any grant free transmission. Thus, the UE monitors the search space for at least activation and deactivation indicators, but also possibly for additional features that may be used by the UE to help determine the transmission resource.

The grant free UE decodes the DCI using the assigned grant free UE ID or group ID for activation or deactivation of grant free transmissions or additional information that may be used by the UE.

Referring to FIG. 3G, steps 300 and 301 are the same as in FIG. 3F.

At step 302, the BS sends an UL transmission resource assignment to the UE through RRC signaling after selecting the transmission resource to be used for the grant free UE. The RRC signaling includes a grant free ID and other fields that may be consistent with existing SPS signaling and as described above. There may be other fields not used in LTE SPS signaling, such as the resource hopping pattern fields or grant free frame interval fields described earlier in the disclosure. The RRC signaling can optionally include all of the RRC signaling fields described for FIG. 3A. The RRC signaling may include the periodicity of resource, the power control parameters, number of repetition K, an hopping flag indicating whether frequency hopping is used or not etc.

Step 303 includes the UE checking for a DCI at search space defined in RRC signaling. In some implementations, the DCI may include additional information to be used by the UE to determine the grant free transmission resource in combination with the RRC signaling and/or the system information. In some implementations, the DCI may include an activation indicator. The UE may search for the DCI at a search space defined in the RRC signaling or possibly a combination of the RRC signaling and the system signaling.

In step 3021, the BS sends a DCI message that may include an activation indicator and/or information for use in defining the resource assignment to the UE.

At step 3032 the UE obtains all UL transmission resources. This may involve the UE using any of the RRC signaling information, system information, DCI information or combinations thereof to determine the grant free transmission resource.

At step 3031, a first batch data arrives at the grant free UE for transmission to the base station.

In step 304, after the first batch data has arrived, the UE transmits the first batch data transmission based on the assigned grant free transmission resource. The grant free resources may be assigned to the UE semi-statically. Semi-static is used here in comparison with the "dynamic" option that is operating in every time slot. For example, semi-static can operate periodically with a given time period, say, 200 or longer time slots. Once the grant free UE obtains the assigned resources, it may transmit data using assigned resources right after data arrives without obtaining a grant. The UE may transmit the initial transmission of the first batch data using the assigned UL transmission resources. In some embodiments, once the first batch data arrives in the grant free UE's buffer, the UE determines the CTU regions of the next time interval or the earlier opportunity it can access from the resource assigned to the UE. The UE determines the next time interval for CTU access after data arrives, the UE searches for the CTU region at that time interval based on the assigned resource hopping sequence. The UE may then transmit the initial transmission of first batch of data using that CTU region and RS assigned for that region. The transmission may include a RS signal and a data signal.

In step 305, the BS detects the data after receiving the first batch data transmission. In some embodiments, when the UE sends a message to the BS, the BS first attempts to detect the MA signature. Detecting the MA signature is referred to as activity detection. By successfully performing activity detection, the BS knows that a UE has sent a grant-free uplink transmission. However, successful activity detection may or may not reveal the identity of the UE to the BS. If there is a predefined RS pattern between a UE and an MA signature, for example as shown in tables 8 and 9 below, then successful activity detection reveals the identity of the UE that sent the grant free uplink transmission. In some embodiments, activity detection may further include obtaining the UE ID, e.g. if the UE ID is encoded separately from the data.

After activity detection is successful, the BS then attempts to perform channel estimation based on the MA signature and optionally additional reference signals multiplexed with the data message, and then decode the data.

In step 306, the BS sends the ACK or NACK based on the decoding result. The BS attempts to decode the initial transmission of the first batch data by first perform activity detection by decoding the RS signal, perform channel estimation using the RS signal and then attempt to decode the data. If the BS can successfully decode the data, the BS may send an ACK to the UE to confirm the successful decoding. If the BS does not decode the data successfully, the BS may send a NACK to the UE or does not send any feedback at all. In some embodiments, after initial transmission first batch of data in step 304, the UE may choose to immediately retransmit the first batch of data using the next available resources according to the resource assignment in step 303. In some other embodiments, UE may wait for a predefined period, and if the UE receives an ACK within the predefined period, the UE will not perform the retransmission. After activation, the UE performs grant free transmission on the assigned resources based on both the RRC signaling and the DCI activation.

In some embodiments, the UE does not constantly check DCI after receiving the DCI activation. In some embodiments, the UE monitors for DCI messages in case the BS may use DCI to switch the UE to grant-based transmission. In some embodiments, the UE monitors for DCI messages in case there is a DCI deactivation. In some embodiments, the UE may transmit in grant based format until DCI activation is activated.

The DCI message may also be used for deactivation. When the UE receives a deactivation DCI, it stops transmitting on the grant free resources.

The DCI for grant free UE resource configuration or activation may include a first RS value, a first resource block and a first MCS value at first subframe. With this information in combination with resource hopping sequence and RS hopping sequence that is configured in RRC signaling, the UE can figure out exact resource/RS allocation at each CTU.

In some other embodiments, after RRC signaling, the UE may keep checking for further DCI messages. If there is a DCI that dynamically schedules the UE for grant-based transmission, the grant free UE may still be able to perform grant-based transmission based on the DCI. After the transmission, the grant free UE can switch back to grant free transmission. In some other embodiments, the DCI may schedule an initial transmission for the UE, and also provide the information, such as MCS, initial RS, initial resource that help configure the UE's grant-free assignment together with RRC signaling.

Figure 3H:
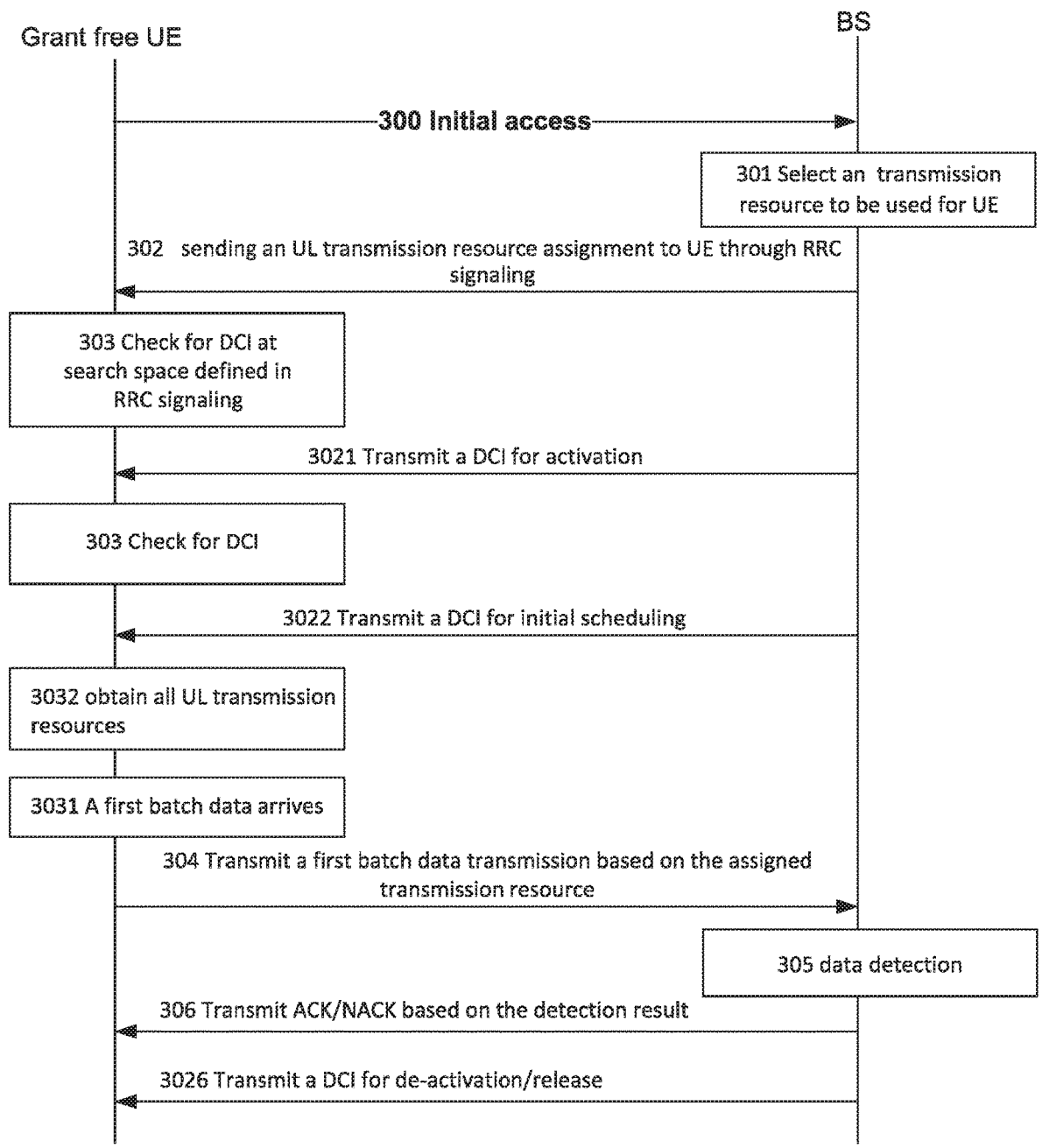

FIG. 3H illustrates another embodiment procedure for UL grant-free transmissions that includes using RRC signaling with complementary DCI signaling. A difference between FIG. 3H and FIG. 3G is that in FIG. 3H, the DCI activation may only provide an activation signal and may not contain necessary information, such as MCS, resource block, RS for resource configuration of the UE. The UE may not have all the information necessary from the RRC and/or system information to enable initial transmission and/or retransmission and thus the UE should be provided additional information defining the transmission resource for the initial transmission or subsequent transmissions in a further DCI beyond the activation DCI. In FIG. 3G, the DCI activation may have also provided some complementary information for resource configuration, such as a first MCS, RS and resource block, therefore, UE can start grant-free transmission after the DCI activation.

Steps 300 and 301 are the same as in FIG. 3G.

At step 302, the BS sends an UL transmission resource assignment to the UE through RRC signaling after selecting the transmission resource to be used for the grant free UE. The RRC signaling includes a grant free ID and other fields that may be consistent with existing SPS signaling and as described above. There may be other fields not used in LTE SPS signaling, such as the resource hopping pattern fields or grant free frame interval fields described earlier in the disclosure.

Step 303 includes the UE checking for a DCI at a search space defined in RRC signaling. In some implementations, the DCI may include additional information to be used by the UE to determine the grant free transmission resource in combination with the RRC signaling and/or the system information. In some implementations, the DCI may include an activation indicator. The UE may search for the DCI at a search space defined in the RRC signaling or possibly a combination of the RRC signaling and the system signaling.

In step 3021, the BS sends a DCI message that may include an activation indicator.

In a repeat of step 303, the UE is again checking the search space for DCI.

At step 3022 the BS transmits a DCI for initial scheduling.

At step 3032 the UE obtains all UL transmission resources. This may involve the UE using any of the RRC signaling information, system information, DCI information or combinations thereof to determine the grant free transmission resource.

At step 3031, a first batch data arrives at the grant free UE for transmission to the base station.

In step 304, after the first batch data has arrived, the UE transmits the first batch data transmission based on the assigned grant free transmission resource. The grant free resources may be assigned to the UE semi-statically. Semi-static is used here in comparison with the "dynamic" option that is operating in every time slot. For example, semi-static can operate periodically with a given time period, say, 200 or longer time slots. Once the grant free UE obtains the assigned resources, it may transmit data using assigned resources right after data arrives without obtaining a grant. The UE may transmit the initial transmission of the first batch data using the assigned UL transmission resources. In some embodiments, once the first batch data arrives in the grant free UE's buffer, the UE determines the CTU regions of the next time interval or the earlier opportunity the UE can access from the resource assigned to the UE. The UE determines the next time interval for CTU access after data arrives, the UE searches for the CTU region at that time interval based on the assigned resource hopping sequence. The UE may then transmit the initial transmission of first batch of data using that CTU region and RS assigned for that region. The transmission may include a RS signal and a data signal.

In step 305, the BS detects the data after receiving the first batch data transmission. In some embodiments, when the UE sends a message to the BS, the BS first attempts to detect the MA signature. Detecting the MA signature is referred to as activity detection. By successfully performing activity detection, the base station knows that a UE has sent a grant-free uplink transmission. However, successful activity detection may or may not reveal the identity of the UE to the BS. If there is a predefined RS pattern between a UE and an MA signature, for example as shown in tables 8 and 9 below, then successful activity detection reveals the identity of the UE that sent the grant-free uplink transmission. In some embodiments, activity detection may further include obtaining the UE ID, e.g. if the UE ID is encoded separately from the data.

After activity detection is successful, the BS then attempts to perform channel estimation based on the MA signature and optionally additional reference signals multiplexed with the data message, and then decode the data.

In step 306, the BS sends the ACK or NACK based on the decoding result.

The BS attempts to decode the initial transmission of the first batch data by first perform activity detection by decoding the RS signal, perform channel estimation using the RS signal and then attempt to decode the data. If the BS can successfully decode the data, the BS may send an ACK to the UE to confirm the successful decoding. If the BS does not decode the data successfully, the BS may send a NACK to the UE or does not send any feedback at all. In some embodiments, after initial transmission first batch of data in step 304, the UE may choose to immediately retransmit the first batch of data using the next available resources according to the resource assignment in step 303. In some other embodiments, UE may wait for a predefined period, and if the UE receives an ACK within the predefined period, the UE will not perform the retransmission. After activation, the UE performs grant free transmission on the assigned resources based on both the RRC signaling and the DCI activation.

At step 3026 the BS may transmit a DCI for de-activation or release of the grant free transmission resource. While only a single transmission is shown before deactivation/release, it is understood that there could be a series of transmissions, some of which are successfully decoded and other that are not that may require retransmission, and any signaling that my encompass.

DCI for Continuous Transmission Until ACK

In some embodiments, a DCI may define a functionality that schedules a transmission resource for multiple transmissions until a trigger is reached to stop the transmissions. For example, in one implementation, the resource may be scheduled to repeatedly transmit from 1 to K times, including the initial transmission. Upon reaching a maximum of K times, the UE would stop using that resource for the attempted transmission of that data. In another implementation, the resource may be scheduled to repeatedly transmit from until an ACK is received from the base station. Once the ACK is received, the UE would stop using that resource for the attempted transmission of that data.

In order to implement the functionality, the DCI may include information for scheduling an initial transmission for the data as illustrated in step 3022 in FIG. 3H. The transmission resource for subsequent retransmissions may be known to the UE from a predefined pattern that is provided to the UE in at least one of RRC signaling or other DCI.

In some embodiments, a UE starts initial (or first packet) grant free transmission of one packet, where one or multiple repetitions can be included in the initial transmission based on the grant-free resource pre-configuration for the UE. After the initial transmission, the UE will wait for the ACK/NACK or a DCI signaling grant from the BS. If the NACK (e.g., to the UE pilot) message, or nothing, is received, the UE will use the grant free resource for retransmissions as configured, and if the DCI signaling includes a UL grant, the UE will switch to the grant-based retransmissions, where the BS can optionally use another DCI based signaling to change the grant-based retransmissions for the packet to grant-free retransmissions using the preconfigured resources.

In other embodiments, indicated by another DCI signaling, the first retransmission of one packet uses the grant-based resource, and the second-N retransmission of the packet (if applicable) uses the grant free assigned resources. In another embodiment, the first retransmission of one packet uses the grant-based resource, indicated by one DCI signaling; and the second-N retransmission of the packet (if applicable) uses the grant free assigned resources, indicated by another DCI signaling. These changes can also be indicated by other indicators or options. For a next new data packet transmission, the UE still uses the grant free transmissions with a pre-assigned (or pre-configured) resource, which means that in the grant free scheme, the new data packet always uses the grant free transmissions and retransmissions, until the UE gets notified by base station to switch to the grant based transmissions for the retransmission packets.

For retransmissions of one packet, the BS can use DCI signaling to change to grant-based transmissions. In some embodiments, there can be a new DCI signaling to change the retransmissions back to grant-free transmission mode with the preconfigured resources. The signaling of the new DCI signaling may be one bit. For example, in the DCI format, there may be a new field, a grant free or grant-based retransmission indicator, where the value of this field equal to 0 indicates the retransmission is grant-based transmission and a value equal to 1 indicates retransmission is switching back to grant-free transmission.

There may be two at least two types of UEs that are configured by the BS. The configuration may be done in RRC signaling, control channel or predefined for the UE. For the first type of UE, after initial GF transmission, the UE only monitor ACK/NACK message. There may be different possibilities for the UE monitoring for an ACK. In some embodiments, the UE may continuously monitor for ACK/NACK and conduct consecutive transmissions until the UE correctly receives an ACK. There may be a maximum consecutive number of transmissions K, the number K may be configured by the network, e.g., through RRC signaling or configured in DCI. In some other embodiments, the UE may continuously transmit K transmissions where K is predefined or signaled. In another embodiment, the UE may wait for an ACK/NACK to arrive within a predefined time slot before retransmission. If the UE receives an ACK within the predefined time limit, the UE stops retransmission, otherwise it retransmits. In some other embodiments, the UE may continuously perform K transmissions before checking for ACK/NACK feedback. If the UE does not receive an ACK when the UE checks, the UE may perform another K transmissions. In another embodiment, the UE may perform K continuous transmissions without checking for ACK/NACK and enter a DRX/sleeping mode. The ACK/NACK may be transmitted through a dedicated ACK/NACK channel, like PHICH or a control channel, e.g., in a DCI.

For the second type of UE, after initial grant-free transmission, the UE can monitor both ACK/NACK and scheduling information. The scheduling information is typically transmitted in a DCI. Scheduling information may include transmission resource blocks, reference signal, MCS, redundancy version (RV) and other transmission parameters. In some embodiments, the UE monitoring interval T (in the unit of subframes/TTis) may be configured by the network. In some embodiments, T>1. In other embodiments, T=1.

The following description may be applied to all the cases described in the disclosure. After a grant-free UE performs initial transmission, one option is the UE continuously transmits until an ACK is received, so the number of transmissions K is dynamic depending on channel conditions and ACK delay. Another option is to set a fixed number for consecutive transmission, e.g., 3, 4, which is semi-statistically configured. There following are two options to determine the number of transmissions K. For a UL grant free transmission occasion, K consecutive transmissions (or repetitions) are performed without expecting to have an ACK/NACK until K transmissions are finished. For a UL grant free transmission occasion, up to K consecutive transmissions (or repetitions) are performed with the expectation that an ACK can arrive at any time slot for early transmission termination.

Figure 3I:
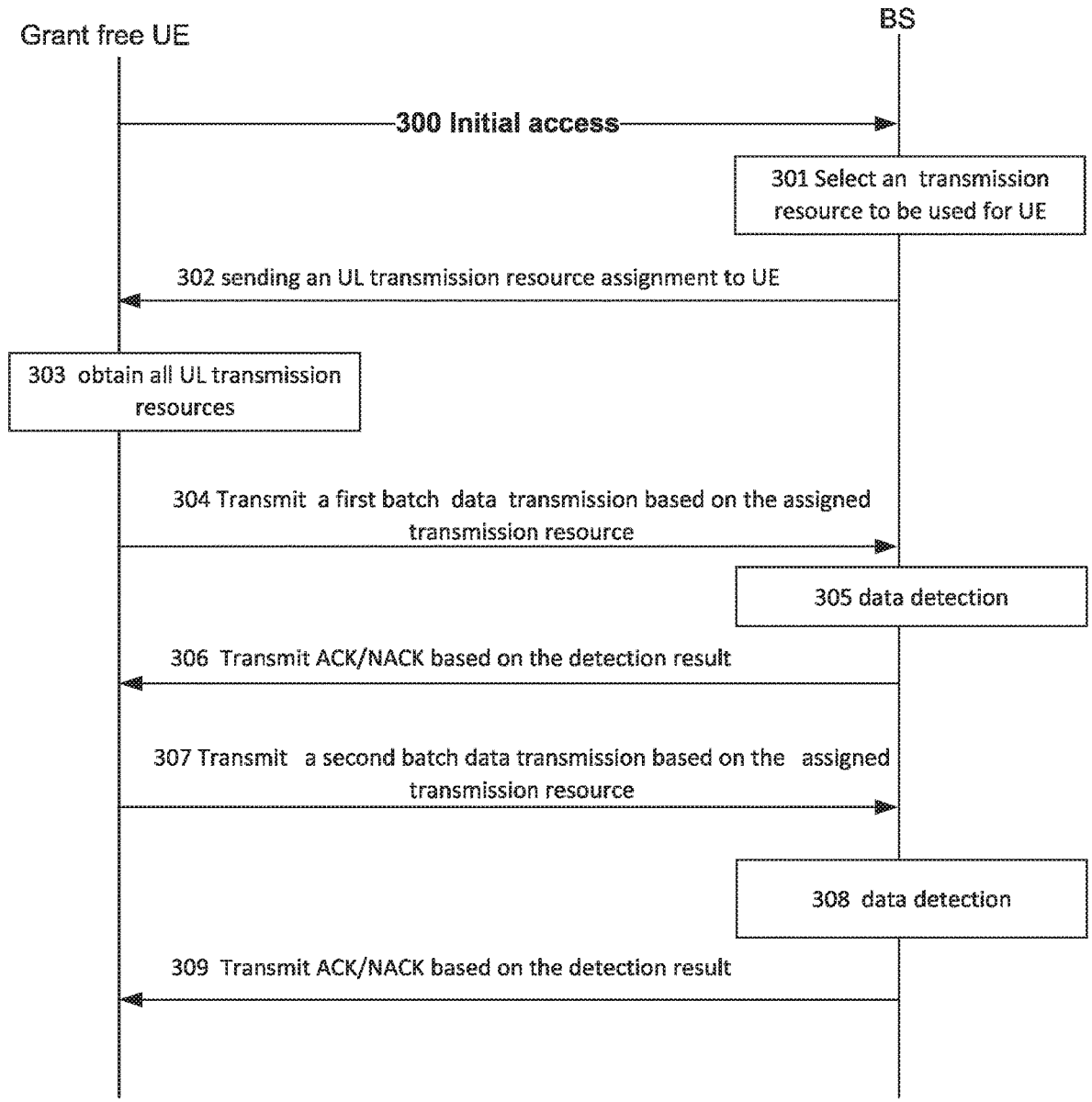

FIG. 3I illustrates another embodiment of procedures for UL grant free transmissions. As shown in FIG. 3I, at step 300, a UE capable of grant-free transmissions first enters a network supported by a TRP or BS and may perform initial access, for example by sending a preamble through a random access (RA) channel as part of a random access procedure (RACH) in an LTE network. The UE may signal to the BS an indication indicating that the UE is grant free transmission capable, for example when the UE expects to transmit a large amount of small data packets.

At step 301, the BS may receive the RACH RA preamble and select a UL transmission resource to be used by the UE. Embodiments of providing the UL transmission resources may include a pre-defined MA hopping pattern in a frame. As an example, the MA hopping pattern may include a pre-defined time-frequency resource hopping pattern in a frame or a pre-defined RS hopping pattern, or both. The MA hopping pattern provides a universal RS and transmission resource mapping scheme that supports different numbers of UEs in uplink grant-free multiple access transmissions. The BS can obtain the pre-defined MA hopping pattern from network, for an example to save the MA hopping pattern, or the BS can obtain the MA hopping pattern by generating the MA hopping pattern based on a predefined pattern generating scheme or a predefined rule.

At step 302 of FIG. 3I, the UE sends an UL transmission resource assignment to the UE after selecting the transmission resource to be used for the UE. In this embodiment, there are 3 options to allocate the transmission assignment. These will be described in greater detail below.

In step 303, the UE obtains all UL transmission resources. In some embodiments, the UE can derive the transmission resources based on predefined rules described in the present disclosure after receiving the transmission resource assignment. In some embodiments, the UE can look up the tables and the predefined transmission resource hopping pattern after receiving the above transmission resource assignment. The UE can save the predefined transmission resource pattern and tables, and also the UE can update the predefined transmission resource pattern and tables after receiving the signaling to instruct the update information.

In step 304, when the data arrives at the UE, the UE transmits a first batch data transmission based on the assigned transmission resource. The grant free resources may be assigned to the UE semi-statically. Once the grant free UE obtains the assigned resources, the UE may transmit data using assigned resources right after data arrives without obtaining a grant. In step 304, the UE may transmit the initial transmission of the first batch of data using the assigned UL transmission resources. Before step 304, the UE have figured out the resources it can access from any method described above. In some implementations, step 304 may include the following procedure: once the first batch of data arrives in the UE's buffer, the UE determines the CTU regions of the next time interval or the earliest opportunity it can access from the resource assigned to the UE. The process may be as follows: the UE determines the next time interval for CTU access after data arrives, the UE searches for the CTU region at that time interval based on the assigned resource hopping sequence. The UE may then transmit the initial transmission of first batch of data using that CTU region and RS assigned for that region. The transmission may include a RS signal and a data signal. In step 305, the BS detects the data after receiving the first batch data transmission. When the UE sends a message to the BS, the BS first attempts to detect the MA signature. Detecting the MA signature is referred to as activity detection. By successfully performing activity detection, the BS knows that a UE has sent a grant free uplink transmission.

However, successful activity detection may or may not reveal the identity of the UE to the BS. There is a predefined RS pattern between a UE and an MA signature showing in tables 8 and 9, then successful activity detection reveals the identity of the UE that sent the grant free uplink transmission. In some embodiments, activity detection may further include obtaining the UE ID, e.g. if the UE ID is encoded separately from the data, as in example message 128 of FIG. 6A described below.

After activity detection is successful, the BS then attempts to perform channel estimation based on the MA signature and optionally additional reference signals multiplexed with the data message, and then decode the data.

In step 306, the BS sends the ACK or NACK based on the decoding result. The BS attempts to decode the initial transmission of the first batch of data by first performing activity detection by decoding the RS signal, performing channel estimation using the RS signal and then attempting to decode the data. If the BS can successfully decode the data, the BS may send an ACK to the UE to confirm the successful decoding. If the BS does not decode the data successfully, the BS may send a NACK to the UE or does not send any feedback at all. In some embodiments, after initial transmission of the first batch of data in step 304, the UE may choose to immediately retransmit the first batch of data using the next available resources according to the resource assignment in step 303. In some other embodiments, the UE may wait for a predefined period, if the UE receives an ACK within the predefined period, the UE will not perform the retransmission. Otherwise, the UE will retransmit the first batch of data at the next available CTU resources after the waiting period.

When the second batch data arrives at the UE, the UE transmits the second batch data in step 307 based on the obtained transmission resource without communicating, to the network entity, a corresponding transmission resource assignment assigning the transmission resources to the UE. In step 308, the BS detects the data after receiving the second batch data transmission. The steps 307 to 309 perform similar activity to steps 304 to 306.

Figure 3J:
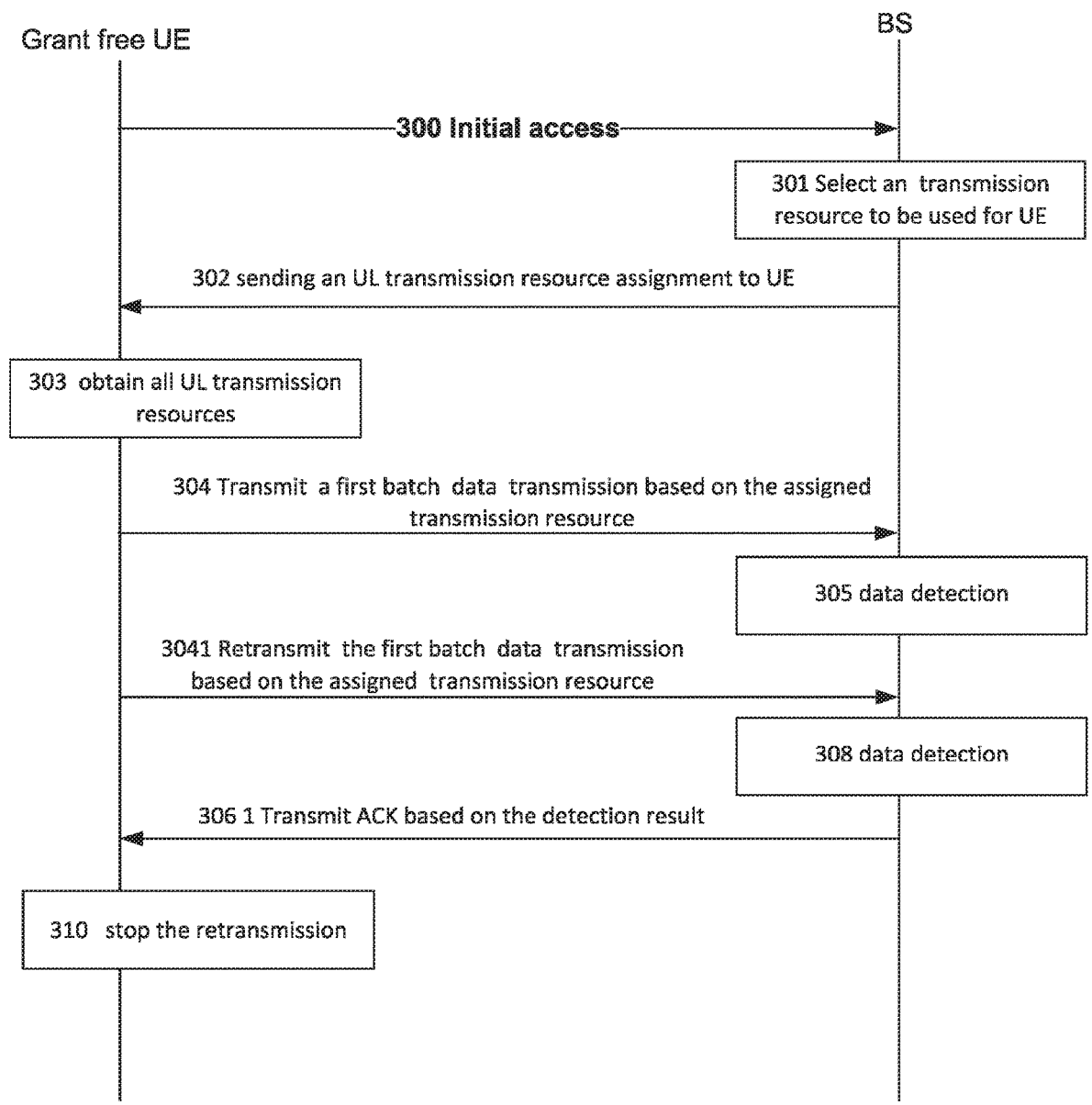

FIG. 3J illustrates another embodiment procedure for UL grant free transmissions. Comparing with FIG. 3I to FIG. 3J, FIG. 3J shows a retransmission process. The retransmission process may be an ARQ or HARQ process. The HARQ retransmission may be implemented using Chase combing (CC) or Incremental redundancy (IR) as similar HARQ process used in LTE. Steps 300, 301, 302, 303 and 304 are similar to the same steps in FIG. 3I. In step 305, the BS detects the data after receiving the first batch data transmission. The attempt decoding may fail, and the BS may not send an ACK after first transmission.

At step 3041, the UE sends the retransmission data packet based on the above obtained transmission resources based on FIGS. 5A to 5D, and tables 7 to 10. At step 308, the BS attempts to decode the data after receiving the retransmission of the first batch of the signal. The decoding may involve combing signals received from the retransmission and initial transmission to decode the data signal. If the data is successfully decoded, in step 3061, the BS may send an ACK to the UE. The UE may keep retransmitting the first batch of data using next available resources according to the resource assignment in step 303 after step 3061 until an ACK is received, if an ACK is not received after the initial transmission. The resource used from the initial transmission to the retransmissions may follow the resource and RS hopping pattern or sequence assigned. When the UE receives an ACK from the BS (e.g. after step 3061), in step 310, UE may stop retransmit the first batch of data.

In some situations, the first batch of data may have been successfully decoded but the UE may have not received an ACK from the BS yet because of a delay. In this case, the UE may still retransmit the first batch of data as in step 3041 until an ACK is received. The BS may receive redundant data as the data has been decoded in previous transmissions. In this case, the BS may choose to discard the data signal received after successful decoding of the same batch of data.

Figure 3K:
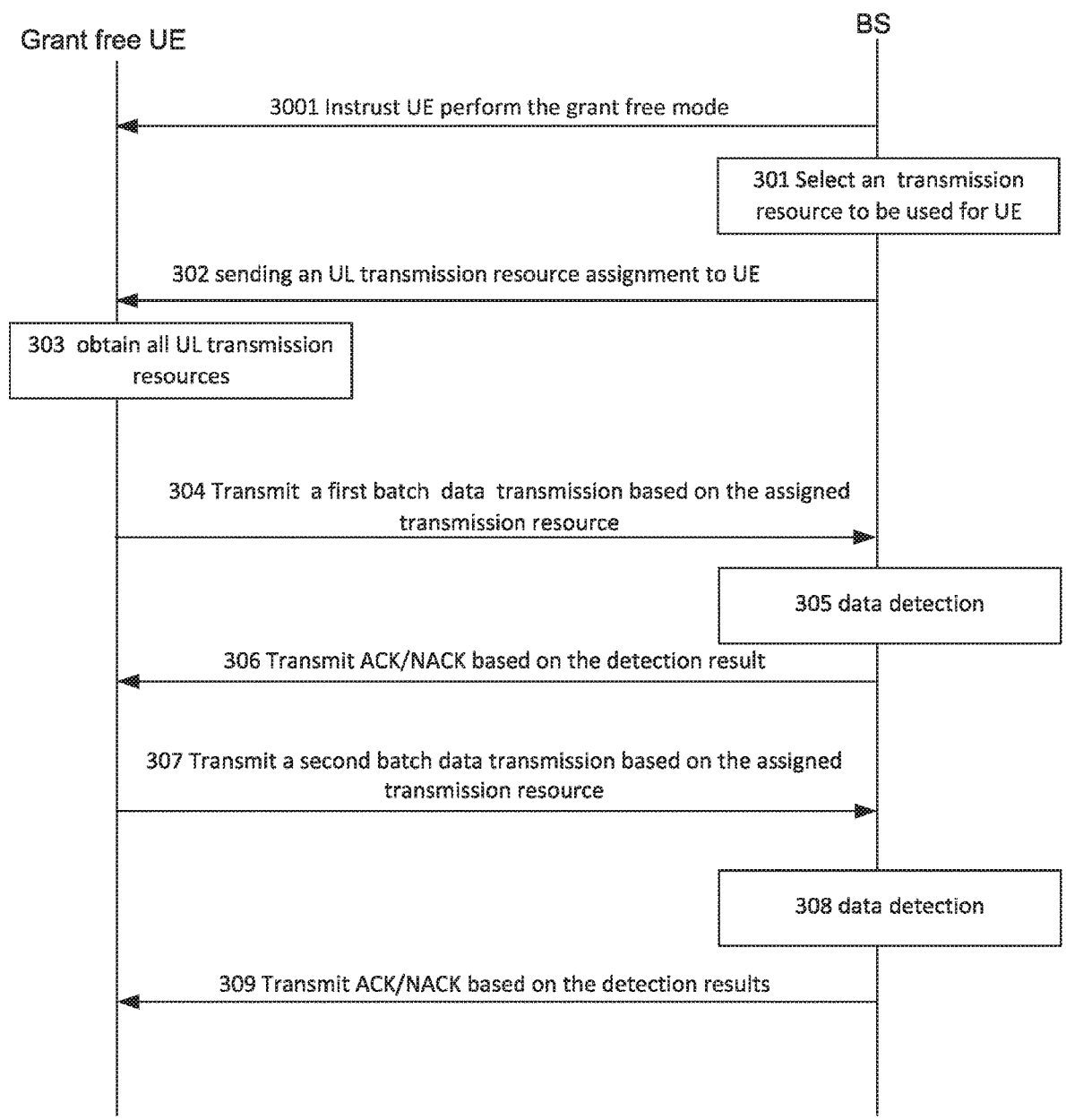

FIG. 3K illustrates another embodiment of procedures for UL grant free transmissions. Resource regions may be allocated as grant-based only or a mixture of both grant free and grant-based. There may be no dedicated grant free region because a BS may determine whether to schedule anything in a grant free region. Alternatively or additionally, resource regions may be allocated for different applications. For example, an mMTC region may be different from a URLLC region since mMTC regions may be divided into sub-regions for different coverage levels. URLLC may be assigned to mixed grant free/grant-based region only when eMBB may be always scheduled and/or in any region. Comparing with FIG. 3I, in step 3001 of FIG. 3K, the UE receives signaling to instruct the UE to perform the grant free mode. In this situation, the BS monitors that the UE has a batch of small data packets to transmit, and select the grant free transmission resource to indicate that the UE is to transmit in grant free mode. In some embodiments, the BS may inform the UE to perform the grant free mode and assign the grant free transmission resources at the same time, e.g. step 3001 and step 302 may be signaled in one step. Steps 303, 304, 305, 306, 307, 308 and 309 are similar to the same steps in FIG. 3I.

RS for Transmission/Retransmission Identification

In some of the above examples, a single RS is assigned to a UE. When a RS is also used to identify initial transmission/retransmission attempt(s) and a redundancy version (RV), multiple RS or a RS tuple may be assigned to a single UE. Initial transmissions and retransmissions may use different RVs. When data is encoded, the encoded bits may be partitioned into different sets (that possibly overlap with each other). Each set is a different RV. For example, some RVs may have more parity bits than other RVs. Each RV is identified by an RV index (e.g. RV 0, RV 1, RV 2, . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder in a UE may perform the channel coding. In order to decode the data, it may be necessary for a base station to know the RV index of the data being received in a grant-free uplink transmission, unless there is only one predefined RV.

For example, when only one RS is assigned to a single UE, p1 may be assigned to UE1. When two RSs are assigned to a single UE, p11 may indicate an initial transmission attempt and p12 may indicate any retransmission attempts. When more than two RSs are assigned to a single UE, p11 may indicate an initial transmission, and each following retransmission attempt may be indicated by p12 (RV2), p13 (RV3), p14 (RV1), etc.

Fixed Group Assignment

Figure 5B:
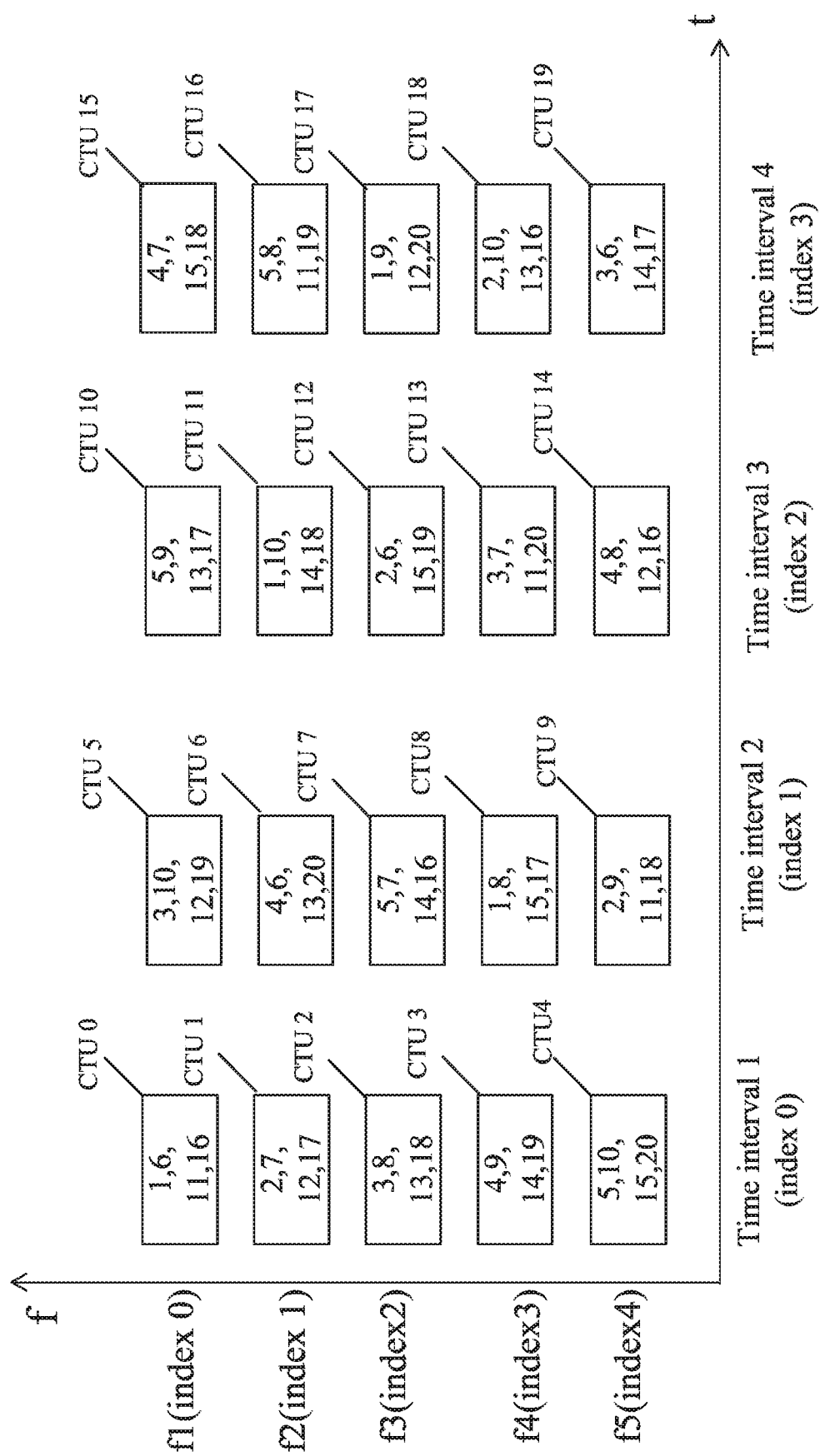
Figure 5C:
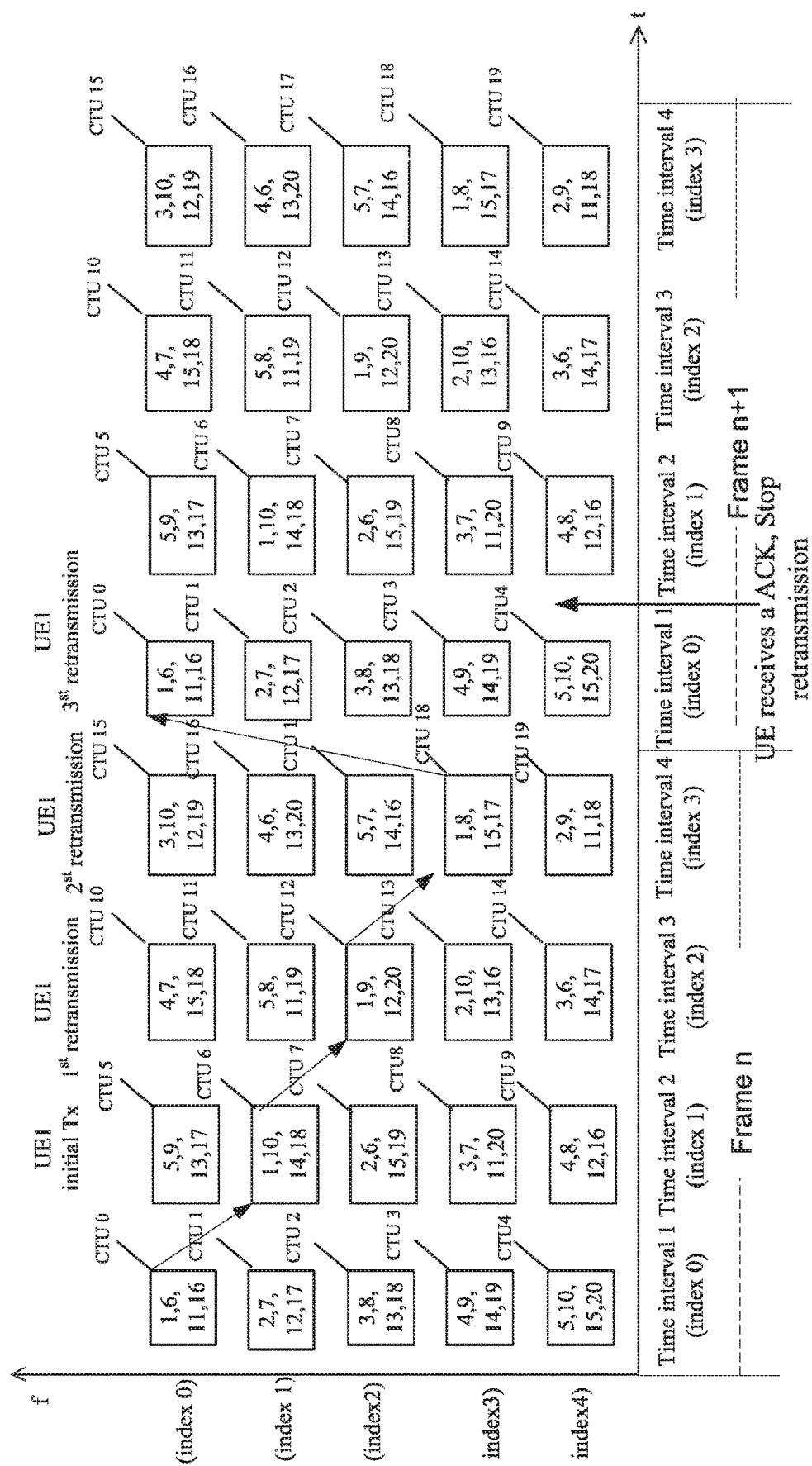
Figure 5D:
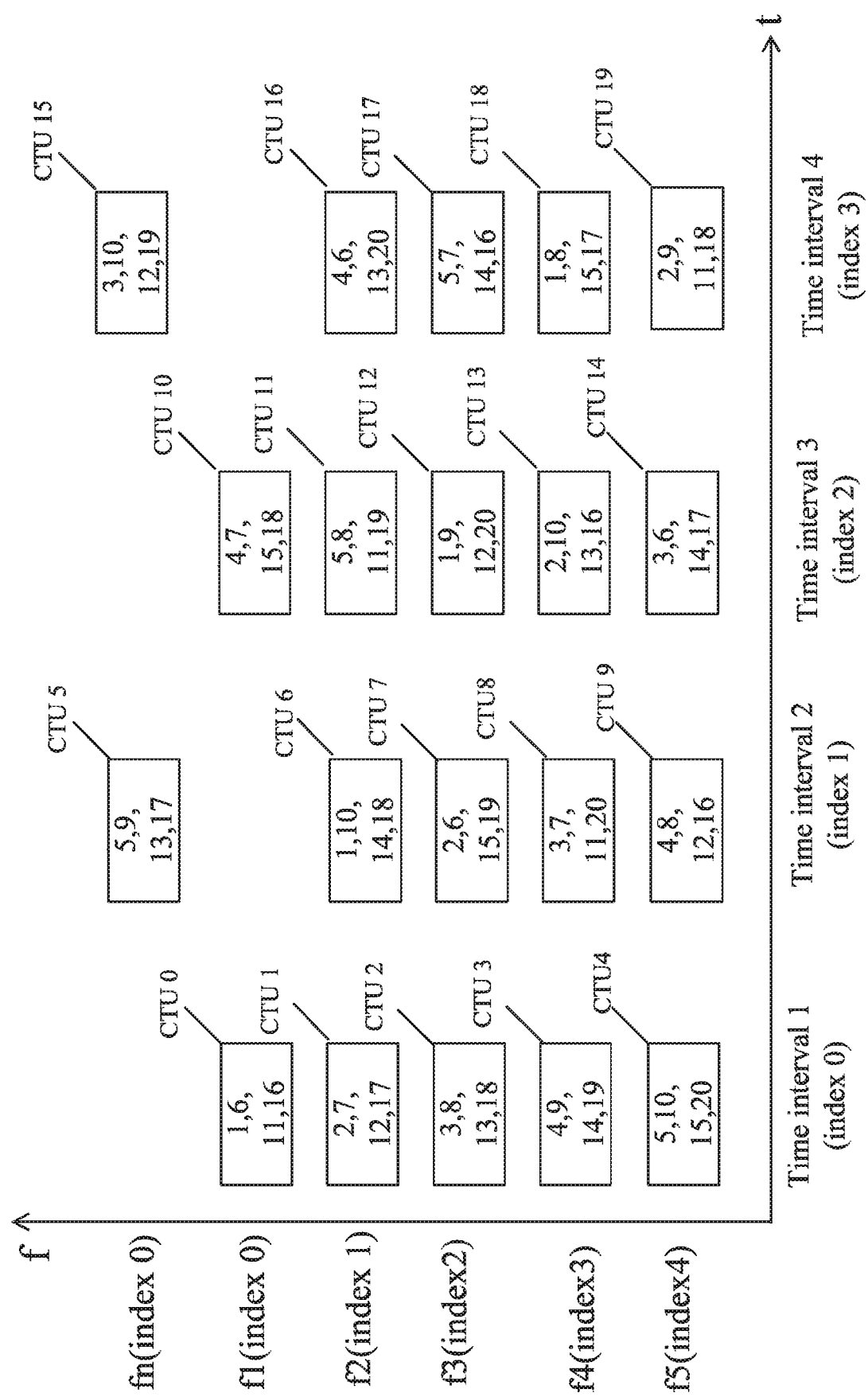
Figure 5E:
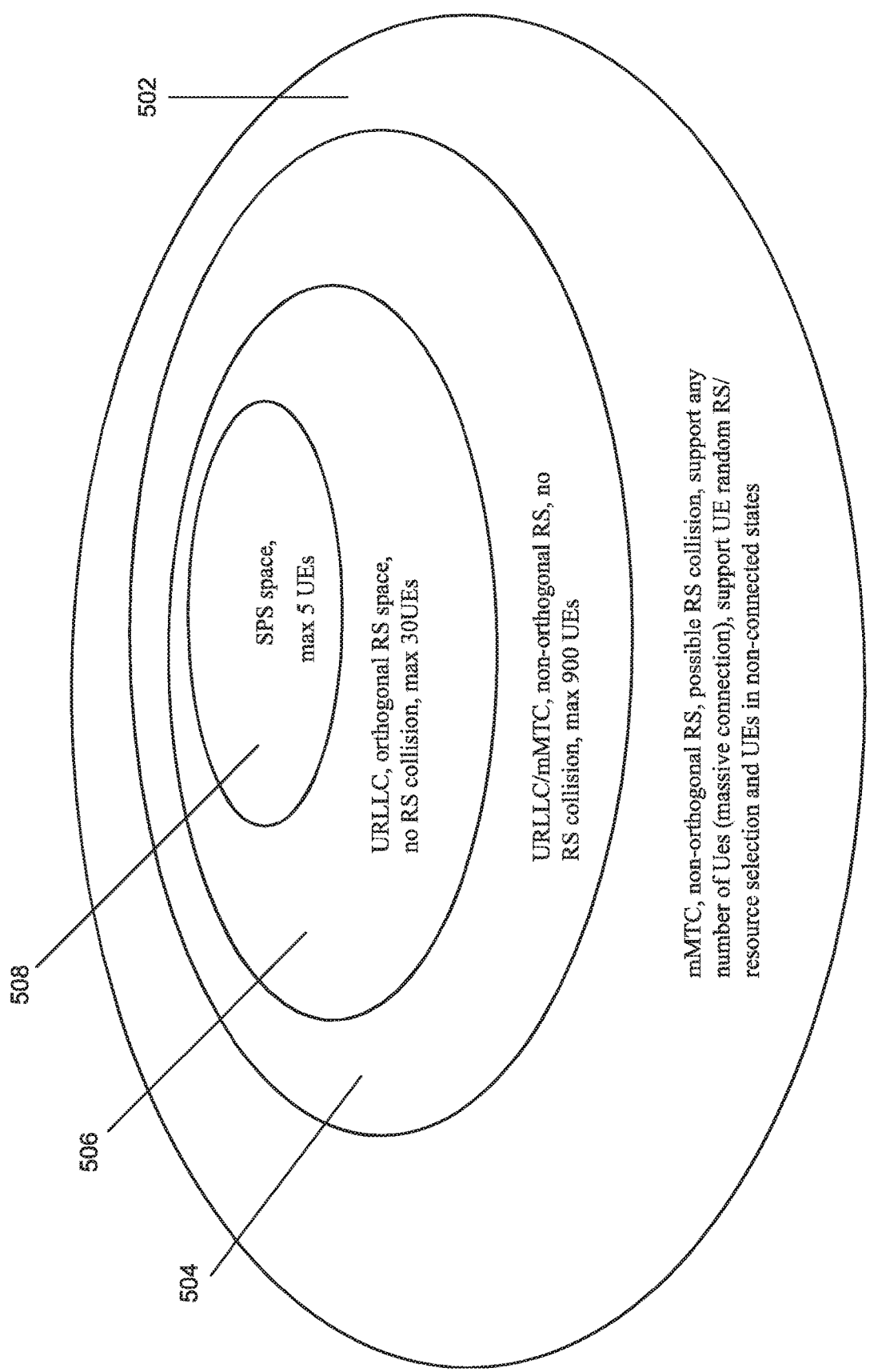
FIG. 5E illustrates an example reference signal (RS) space expansion scheme according to an embodiment of the disclosure.
Figure 5F:
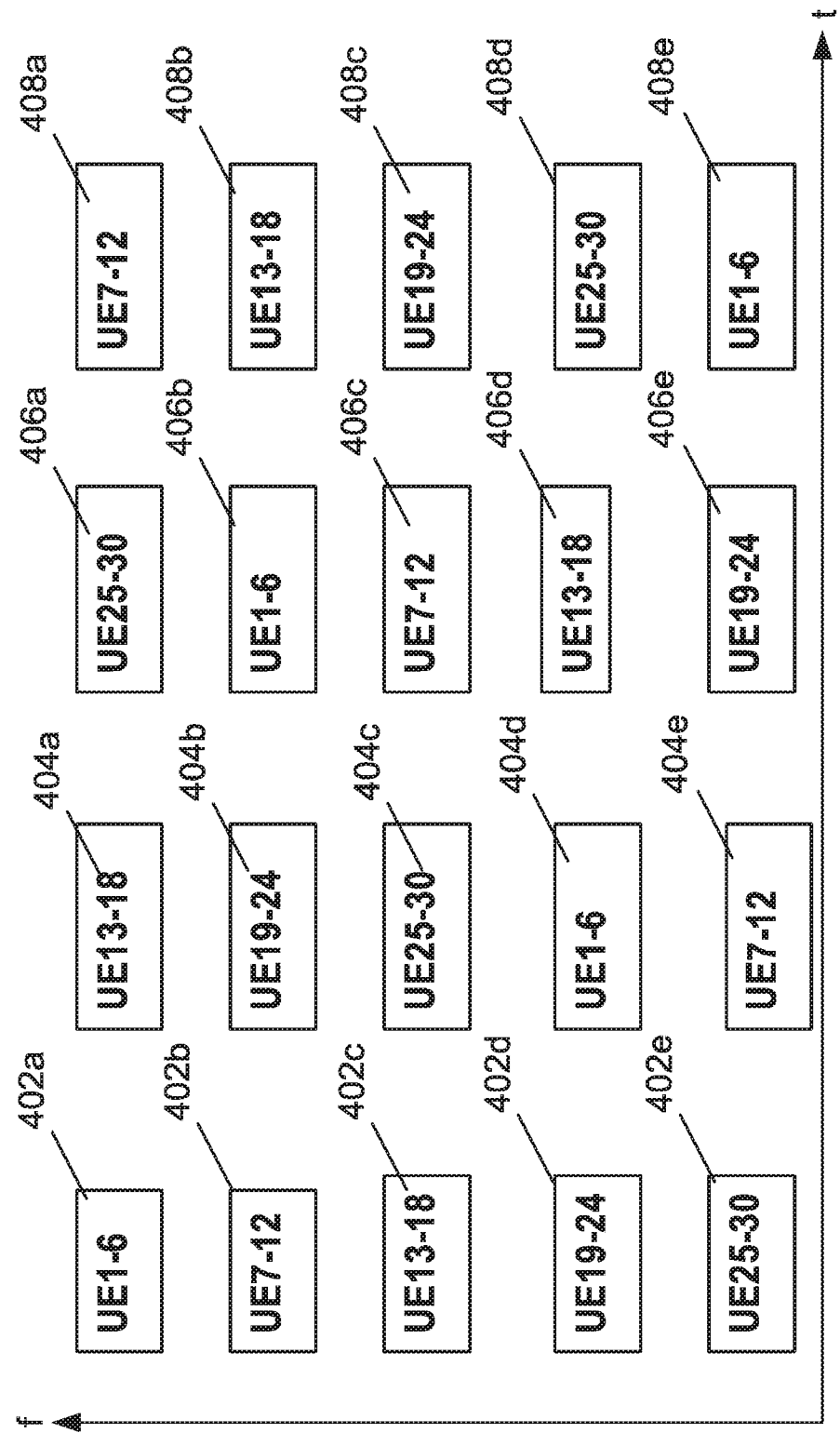
FIG. 5F illustrates an example fixed resource grouping pattern according to an embodiment of the disclosure.

As illustrated in FIG. 5F, grouping of UEs may not change with the fixed group assignment scheme. Each group of UEs may be assigned different resources 402-408 for each time interval within a frame. RS may be reused among different groups, but may be different among UEs in the same group to avoid RS collisions. For example, UEs 1-6 may be assigned six different RS sequences, but UE 1 and UE 7 may be assigned the same RS sequence. UEs may be assigned to groups through broadcast channel or RRC signaling. Group based signaling, such as group based multicast DCI may be used to change the resource hopping pattern of the groups. If a UE is assigned a fixed ID among each group, the UE may select its RS based on its ID among groups without extra signaling. RSs assigned to each UE may follow a pseudo random hopping pattern such that no two UEs may collide with each other. A seed or sequence may represent the RS hopping pattern. When the number of UEs is larger than a number available RSs can support, a BS may signal through broadcast or RRC signaling so that the remaining UEs may randomly select physical resources and RS hopping patterns.

The fixed grouping resource pattern may also be generated using the cyclic shift method. And a first cyclic shift number between UE set i and UE set i−1 at time interval index k is the same from a second cyclic shift number between UE set i and UE set i−1 at time index k−1, wherein k is any value from 1 to M, and i is 2 to N. In some embodiments, UE set i at time interval index k has a cyclic shift relationship with the UE set i at time interval index k−1. This cyclic shift procedure guarantees that the same UE has different frequency location index at different time intervals in one frame, which provides frequency diversity gain.

The fixed grouping resource pattern can also be generated using an equation based rule, for example, the frequency location index of a UE=(UE index+time slot index+constant) mod (number of frequency partitions M). The difference between the equation of the fixed group resource pattern (FIG. 5F) and UE regrouping resource pattern (FIG. 5A) described earlier is that UE set index is always set as 1. Similar to the UE re-grouping resource pattern described in FIG. 5A, the resource pattern may be fixed from frame to frame or it may change from frame to frame following a predefined pattern. For example, a frame number and/or cell ID may be added to the equation in similar way to the method described for UE regrouping resource pattern (FIG. 5A).

Figure 4:
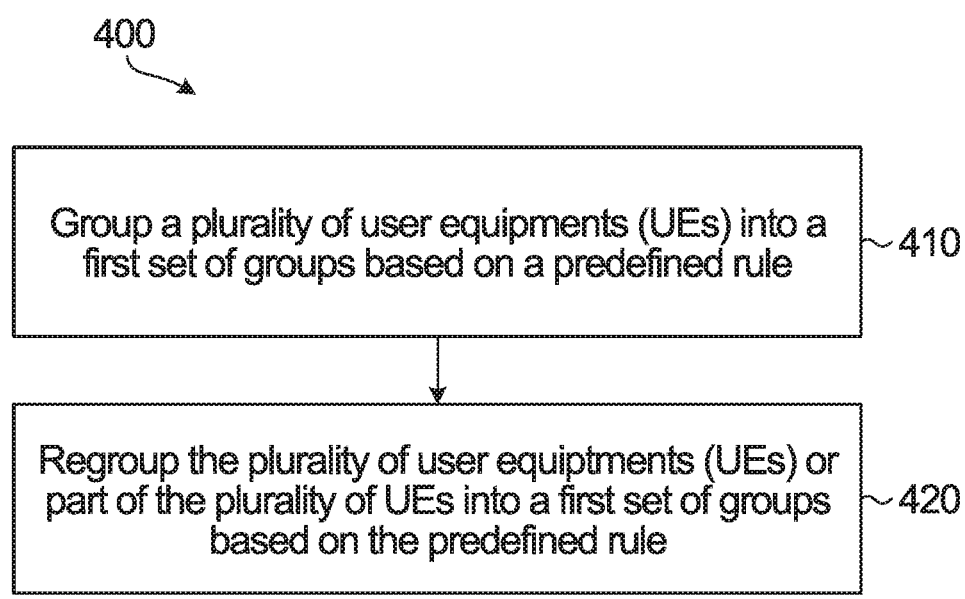
FIG. 4 illustrates a flowchart of an example grant-free transmission scheme.

FIG. 4 illustrates an embodiment method 400 for universal resources (for example, the MA hopping pattern) assignment for UL grant free transmissions, as may be performed by a wireless device such as a controller (e.g., base station (BS), gNB, etc.). Referring to FIG. 4, the method 400 begins at step 410, where a plurality of user equipments (UEs) are grouped by the BS into a first set of groups based on a predefined rule. The plurality of UEs are grouped based on a cyclic shift scheme or a pseudo random scheme to generate the time-frequency resource hopping pattern, the plurality of UEs are grouped based on RS collision-avoidance scheme to generate the RS hopping pattern. Based on the above cyclic shift scheme or pseudo random scheme, UEs may be grouped differently at each grant free resource such that the same UEs do not always collide with each other. The cyclic shift scheme may guarantee that when the number of UEs are below a certain threshold, no two UEs belong to the same group in two grant free opportunities if the number of partitions is a prime number and larger than or equal to the number of grant free resource opportunities a UE can access in a frame.

Based on the above RS collision-avoidance scheme, RS sequence assignment may be determined based on the time-frequency resource assignment results to avoid RS collisions over the same time-frequency resources. A RS pool may be gradually expanded from orthogonal pilot sequences to non-orthogonal pilot sequences, and then a random pilot sequence pool when more and more grant free UEs enter the system. An index of the mapping scheme may be updated based on a change in at least one of traffic load, a number of the plurality of UEs, RS resources, or time-frequency resources, and the update may be transmitted to the UEs through at least one of system information, a broadcast channel, or a common control channel or a UE specific control channel. These and other aspects and other described in greater detail below.

As mentioned above, RS detection may be crucial for grant free communications and an RS collision avoidance scheme for grant free communications is desirable. It should be noted that even though RS is described as a preferred embodiment in this disclosure, embodiments described herein are also applicable to other multiple access (MA) signatures. An MA signature may include (but is not limited to) at least one of the following: a codebook/codeword, a sequence, an interleaver and/or mapping pattern, a demodulation reference signal (e.g. a reference signal for channel estimation), a preamble, a spatial-dimension, and a power-dimension. The term "pilot" refers to a signal that at least includes a reference signal. In some embodiments, the pilot may include the demodulation reference signal (DMRS), possibly along with a channel-estimation-oriented preamble, or a random access channel (LTE-like RACH) preamble.

In some embodiments, when a new grant free UE accesses the network or a grant free UE leaves the network and releases the MA resource, the network or BS can update the predefined MA hopping pattern based on the above rules.

The method 400 proceeds to step 420, where the plurality of UEs are regrouped into a second set of groups. Subsequently, where time-frequency resources are reassigned based on the second set of groups for a second time interval.

To take advantage of channel diversity and user traffic imbalance between resource units, UE (re-)grouping with some resource hopping can be considered for different transmissions if multiple resource units are available for each transmission slot. Namely, resource units can be configured in different frequency locations and over different time slots following some pre-configured hopping patterns. UEs can then have transmissions in different resource units over different time slots, resulting in UE (re-)grouping over transmission slots. Here the different transmissions can be initial transmissions and/or re-transmissions from a UE. FIGS. 5A to 5D are examples to demonstrate the idea, in which the number of UEs sharing the same resource units is limited, and the resource units over consecutive retransmissions have different frequency locations. One of the benefits of such resource hopping with UE (re-)grouping scheme is to balance the resource usages among different resource units in the cases when non-uniform traffic loadings occur among the resource units.

Semi-Static Update of GF Resources without Reconfiguring UE Grouping

A network or a BS may update the amount of grant free resources according to traffic load, number of UEs, RS resources, and/or physical resources. The grant free resources may include several predefined patterns, and each pattern may represent a certain amount of grant free resources assigned among all the resource with fixed pattern(s). In an embodiment, the grant free resource configuration and update may only indicate an index of the pattern used. The BS may notify UEs of the update of grant free resource assignment through system information, a broadcast channel, and/or a common control channel.

Figure 5G:
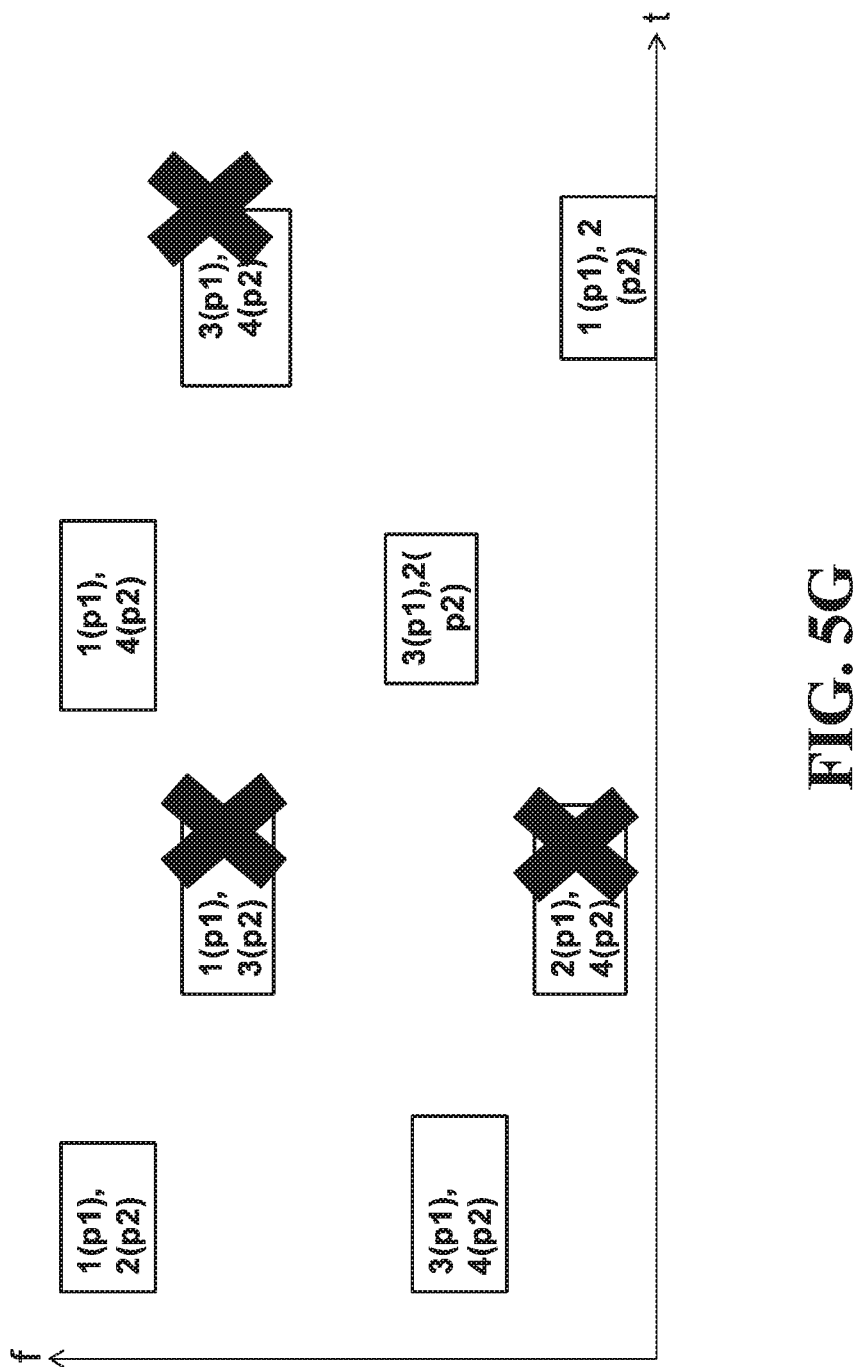
FIG. 5G illustrates an example semi-static update of grant-free resource according to an embodiment of the disclosure.

When grant free resources increase or decrease, the sequence may be punctured to maintain the controlled collision UE grouping and RS collision free assignment without signaling to individual UEs. As illustrated in FIG. 5G, after reducing the grant free resources to half, the number of opportunities may be reduced in half, but the number of max collisions and RS resource requirements may remain the same. For the example shown in FIG. 5G, since half of the grant free resources are eliminated, automatic resource hopping sequence update may be:

UE1: 0, 0, 0, 1=>0, 0;
UE2: 0, 1, 1, 1=>0, 1;
UE3: 1, 0, 1, 0=>1, 1; and
UE4: 1, 1, 0, 0=>1, 0, where 0, 1 denote frequency location index, and p1, p2 denote different pilot sequences for UEs assigned the same time frequency resource. Thus, the original resource hopping sequences "0, 0, 0, 1", "0, 1, 1, 1", "1, 0, 1, 0", and "1, 1, 0, 0" are for time intervals 1, 2, 3, and 4, and the updated resource hopping sequences "0, 0", "0, 1", "1, 1", and "1, 0" are for time intervals 1 and 3.

The Cyclic Shift Scheme

The grouping based on the cyclic shift scheme is to group the time-frequency resource hopping pattern, the time-frequency resource hopping pattern comprises M transmission resources allocated to N UE sets at time interval index k, each set of UE comprising M UEs, wherein UE set i at time interval index k has a cyclic shift relationship with the UE set i−1 at time interval index k. In some embodiments, UE set i at time interval index k has a cyclic shift relationship with the UE set i at time interval index k−1, wherein k is any value from 1 to M, and i is 1 to N. In some embodiments, wherein a first cyclic shift number between UE set i and UE set i−1 at time interval index k is different from a second cyclic shift number between UE set i and UE set i−1 at time index k−1, wherein k is any value from 1 to M, and i is 2 to N. In some embodiments, wherein a first cyclic shift number between UE set i and UE set i−1 at time interval index k is the same from a second cyclic shift number between UE set i and UE set i−1 at time index k−1, wherein k is any value from 1 to M, and i is 2 to N.

FIGS. 5A to 5D illustrate an embodiment resource assignment and hopping scheme based on the cyclic shift scheme. Each block in FIGS. 5A to 5D, such as CTU 0 to CTU 19, represents a time-frequency resource. It should be noted that even though the time-frequency resources shown in FIGS. 5A to 5D are equal, in other embodiments, time-frequency resources assigned to each group of UEs may not be equal to each other. Numbers 0-19 inside each time-frequency resource block may denote UE group index. Time location index 0 to 4 may represent time interval 1 to 4, the location index can present continue time intervals and/or non-continue time intervals. In one embodiment, time location index 0 to 4 may corresponds to subframes 0 to 3. In another embodiment, time location index 0 to 4, may correspond to subframes 0, 2, 4, and 6, or other subframes in other embodiments.

Taking FIG. 5A as an example, FIG. 5A shows a predefined time-frequency location of 20 CTU regions in each frame. The 20 CTU regions may be indexed as CTU 0 to CTU 19 as shown in the FIG. 5A and Table 6. As the time-frequency location and size of the CTU regions are known to both the BS and the GF UEs. If UEs knows the index of CTU region to access, it can find out the physical time and frequency location of the CTU region to access. Table 7 shows the predefined time-frequency location table of different CTU regions shown in FIG. 5A. As the table is known by the UE before perform a grant-free transmission, UE can find out the time frequency location of the CTU region if the CTU index is known. For example, a CTU 10 has a time-frequency location (t3, f1). The time frequency location may be an index of time slots, frequency bands or it may be a time interval with a known start and end time and frequency bands with a known start and end bandwidth.

TABLE 6

Map of UE index and the transmission resource hopping pattern

| UE Index | Time location index | | | |
|---|---|---|---|---|
| | 0 | 1 | 2 | 3 |
| 1 | CTU 0 | CTU 6 | CTU 12 | CTU 18 |
| 2 | CTU 1 | CTU 7 | CTU 13 | CTU 19 |
| 3 | CTU 2 | CTU 8 | CTU 14 | CTU 15 |
| 4 | CTU 3 | CTU 9 | CTU 10 | CTU 16 |
| 5 | CTU 4 | CTU 5 | CTU 11 | CTU 17 |
| 6 | CTU 0 | CTU 7 | CTU 14 | CTU 16 |
| 7 | CTU 1 | CTU 8 | CTU 10 | CTU 17 |
| 8 | CTU 2 | CTU 9 | CTU 11 | CTU 18 |
| 9 | CTU 3 | CTU 5 | CTU 12 | CTU 19 |
| 10 | CTU 4 | CTU 6 | CTU 13 | CTU 15 |
| 11 | CTU 0 | CTU 8 | CTU 11 | CTU 19 |
| 12 | CTU 1 | CTU 9 | CTU 12 | CTU 15 |
| 13 | CTU 2 | CTU 5 | CTU 13 | CTU 16 |
| 14 | CTU 3 | CTU 6 | CTU 14 | CTU 17 |
| 15 | CTU 4 | CTU 7 | CTU 10 | CTU 18 |
| 16 | CTU 0 | CTU 9 | CTU 13 | CTU 17 |
| 17 | CTU 1 | CTU 5 | CTU 14 | CTU 18 |
| 18 | CTU 2 | CTU 6 | CTU 10 | CTU 19 |
| 19 | CTU 3 | CTU 7 | CTU 11 | CTU 15 |
| 20 | CTU 4 | CTU 8 | CTU 12 | CTU 16 |

TABLE 7

Example of time frequency location table of different CTU regions

| | Time location | Frequency location |
|---|---|---|
| CTU 0 | t1 | f1 |
| CTU 1 | t1 | f2 |
| CTU 2 | t1 | f3 |
| CTU 3 | t1 | f4 |
| CTU 4 | t1 | f5 |
| CTU 5 | t2 | f1 |
| CTU 6 | t2 | f2 |
| CTU 7 | t2 | f3 |
| CTU 8 | t2 | f4 |
| CTU 9 | t2 | f5 |
| CTU 10 | t3 | f1 |
| CTU 11 | t3 | f2 |
| CTU 12 | t3 | f3 |
| CTU 13 | t3 | f4 |
| CTU 14 | t3 | f5 |
| CTU 15 | t4 | f1 |
| CTU 16 | t4 | f2 |
| CTU 17 | t4 | f3 |
| CTU 18 | t4 | f4 |
| CTU 19 | t4 | f5 |

In some embodiments, the time-frequency locations of the CTU regions may not be predefined but semi-persistently configured. They may be signaled in the broadcast channel or common control channel. A UE may decode the information before access the network or at least before performing a grant-free transmission.

A subframe may typically represent a time interval of each grant free resource, or a time interval where a UE has at least one opportunity to access a grant free resource. A subframe may be a LTE/5G subframe, a time slot, a TTI, a few millisecond, etc. The subframe or time location index 0 to 3 shown in FIGS. 5A to 5D may be a logical index that may map to a different physical resource index. A frame typically represents a time period where a resource and/or RS pattern may start to repeat itself or change based on a predefined rule. The terms "sub-frame index", "time location index", "time index", and "time slot index" are used interchangeably throughout this disclosure.

A UE may be able to access one or more grant free access opportunities every unit time, e.g. TTI, time interval or subframe. A UE may be assigned physical resource and/or RS hopping sequences indicating the resource hopping pattern and a RS index or RS hopping pattern index. Resource and RS hopping patterns may include different resource and RS assignments for grant free opportunities within a frame and may be a repetitive pattern for each frame or any unit time/frequency defined in the frame structure. In mMTC, the pattern may differ within a superframe and may repeat every superframe. The physical resource and RS assignment pattern may also change over each frame/superframe, but may follow a predefined rule that is known to both the BS and the UEs.

With the cyclic shift based resource hopping pattern generation, let M be the number of partitions such as frequency partitions (or the number of frequency location indices), and L be the number of grant free opportunities for each UE per frame (or the number of time location indices. In FIG. 5A, M=5 and L=4. If M is a prime number and M>=L, when number of UEs are less or equal to $M^2$ all UEs may be assigned to groups such that no two UEs belong to the same group in two opportunities within a frame. When the number of UEs are less than M*(M−1), all UEs may be assigned to groups such that no two UEs belong to the same group in two opportunities within a frame and also the same UE may be assigned to different frequency location index at different time intervals in one frame.

For the first M number of UEs or the first set of M UEs, M distinct permutations of UE indices may be found, L permutations among the M distinct permutations may be chosen, and the chosen L permutations may be mapped to the M frequency locations of the L time location indices. M distinct permutations may be generated by cyclic shifting one permutation pattern. For example, UE indices 1-5 in order may include M distinct permutations {1 2 3 4 5}, {5 1 2 3 4}, {4 5 1 2 3}, {3 4 5 1 2}, and {2 3 4 5 1}, which are generated by cyclic shifting permutation {1 2 3 4 5} with cyclic shift number 0, 1, 2, 3, 4, respectively. This cyclic shift procedure guarantees that the same UE has different frequency location index at different time intervals in one frame, which provides frequency diversity gain.

In general, any L out of the M permutations can be used for the grant free resource pattern generation. In this example, only the first four permutations are used for the grant free opportunities within a frame because L=4. The first four permutations {1 2 3 4 5}, {5 1 2 3 4}, {4 5 1 2 3}, and {3 4 5 1 2} may be used for time intervals 1, 2, 3, and 4, respectively. The order of the indices in each permutation corresponds to the frequency location indices. For the next M UEs or the second set of M UEs, the previous M UE allocation may be cyclically shifted by the subframe index or time location index with respect to the locations of the first set of M UEs in the same subframe: {6 7 8 9 10}, {9 10 6 7 8}, {7 8 9 10 6}, and {10 6 7 8 9}. Similarly, the next set of M UE for every subframe or time location may be cyclically shifted by the subframe index with respect to the previous set of M UEs {11 12 13 14 15}, {13 14 15 11 12}, {15 11 12 13 14}, and {12 13 14 15 11}. The mapping of the last M UEs or the fourth set of UEs may therefore be {16 17 18 19 20}, {17 18 19 20 16}, {18 19 20 16 17}, and {19 20 16 17 18} for the four time intervals. It should be noted that the cyclic shift by the subframe index is used as a preferred embodiment in this disclosure, and another number may be used for the cyclic shift procedure in another embodiment.

UEs of the same location from the sets for a corresponding subframe may be grouped into one group and assigned to the same time-frequency resource. For example, at time interval 1, UEs 1, 6, 11, and 16, at the first location of each set, are grouped and assigned time-frequency resource CTU 0. It should be noted the terms "set" and "group" are used here to differentiate permutation of UEs and groups of UEs for resource assignment. For example, UEs 1-5 are in the first set of UEs but in different groups for resource assignment. Taking time interval 1, 2, 3, and 4 of FIG. 5A as an example, comparing in time interval 1, the cyclic shift number of the first UE set of UEs 1 to 5 in time interval 2 is 1; comparing in time interval 2, the cyclic shift number of the first UE set of UEs 1 to 5 in time interval 3 is 1; comparing in time interval 3, the cyclic shift number of the first UE set of UEs 1 to 5 in time interval 4 is 1. Comparing in time interval 1, the cyclic shift number of the second UE set of UEs 6 to 10 in time interval 2 is 2; comparing in time interval 2, the cyclic shift number of the second UE set of UEs 6 to 10 in time interval 3 is 2; comparing in time interval 3, the cyclic shift number of the second UE set of UEs 6 to 10 in time interval 4 is 2. Comparing in time interval 1, the cyclic shift number of the third UE set of UEs 11 to 15 in time interval 2 is 3; comparing in time interval 2, the cyclic shift number of the third UE set of UEs 11 to 15 in time interval 3 is 3; comparing in time interval 3, the cyclic shift number of the third UE set of UEs 11 to 15 in time interval 4 is 3. Comparing in time interval 1, the cyclic shift number of the fourth UE set of UEs 16 to 20 in time interval 2 is 4; comparing in time interval 2, the cyclic shift number of the fourth UE set of UEs 16 to 20 in time interval 3 is 4; comparing in time interval 3, the fourth UE set of UEs 16 to 20 in time interval 4 is 4.

Comparing to FIG. 5A, the difference in FIG. 5B is the first to fourth UE set of UEs grouping pattern in time interval 4 be moved to time interval 2, the UEs grouping pattern in time interval 2 be moved to time interval 3, the UEs grouping pattern in time interval 3 be moved to time interval 4. Based on this alternative design, the time-frequency resource hopping pattern in time intervals 1 to 4 still can satisfy the requirement that any two UEs cannot be allocated the same CUT in time intervals 1 to 4. FIG. 5B only shows one example, however it is to be understood that the UEs grouping pattern in one time interval can be moved to other time interval.

Physical resources may be assigned to a UE which provides a unique definition of grant-free (GF) resources used for each frame. Time-frequency resources in a frame may be partitioned for this purpose. For example, an entire uplink transmission bandwidth may be divided into a number of partitions for a time period such as each time slot in a frame, and each time-frequency resource block may be assigned to UE(s). The physical resource assignment pattern may differ within a frame and may repeat every frame. The physical resource assignment pattern may also change over each frame, but may follow a predefined rule that is known to both the BS and the UEs. For example, this may be implemented through the addition of a frame number as described in more detail later in this disclosure. Comparing to FIG. 5A, the difference in FIG. 5C is the first to fourth UE set of UEs grouping pattern in time intervals 1 to 4 of the frame n has the same grouping pattern in time intervals 1 to 4 of frame n+1. FIG. 5C only provides the example of the same grouping pattern in different frame, in the alternative embodiment, the different grouping pattern in the different frame can be adopted, for an example, the frame n adopts the grouping pattern of FIG. 5A, and the frame n+1 adopt the grouping pattern of FIG. 5B.

FIG. 5C also illustrates a resource assignment scheme for automatic retransmissions until receipt of an ACK, as discussed above. As shown, data arrives for UE 1 to transmit before time index 1 of frame n, and UE 1 performs an initial transmission of data at time index 1 of frame n using resource with frequency index 1. At time index 2 and 3 of frame n and time index 0 of frame (n+1), UE 1 performs the first, second, and third retransmission of the data using resources with frequency index of 2, 3, and 0, respectively. UE 1 stops retransmission after receipt of an ACK at time index 1 of frame (n+1).

Similarly for FIG. 5C, if UE arrives between time index 1 and time index 2, UE1 may perform an initial transmission of data at time index 2 of frame n using resource with frequency index 2, UE 1 can then perform the first and second retransmission (or repetition) of the data using the resource with time index 3, frequency index 3 of frame n and time index 0, frequency index 0 of frame n+1, respectively. The UE may stop the retransmission/repetition when the number of transmission/repetition reaches K or an UL grant indicating a retransmission is received, and optionally, the repetition may be stopped if the UE receives an ACK from the BS.

There are several advantages of the UE re-grouping scheme with resource hopping pattern defined in FIGS. 5A to 5D in comparison with fixed grouping scheme (such as the resource pattern defined in FIG. 5F) when combined with the UE retransmission scheme. First, as can be seen from FIG. 5C, the resource units over consecutive retransmissions for the same UE have different frequency locations, this provide a frequency diversity gain in comparison to the case where transmission/retransmission taken the same frequency band. Second, the design in all FIGS. 5A to 5D and 5F has limited the number of potential collisions in each CTU to a maximum number (4 in the example of FIGS. 5A to 5D and 5F for 20 UEs). Thirdly, UE re-grouping scheme can avoid continuous transmission of two or more UEs in different attempt of transmission and retransmissions of the same data. For example, UE 1 and UE 10 may perform initial grant-free transmission in the same CTU 6 in FIG. 5C. In the next time interval, UE 1's retransmission hopped to CTU 12 while UE 10's retransmission hopped to CTU 13, therefore, avoid continuous collision of the two UEs in the next time interval. For a fixed UE grouping scheme as defined in FIG. 5F, two UEs collides in the initial transmission may continuously collide in the retransmission. Fourthly, UE re-grouping can better deal with user traffic imbalance. For example, in FIG. 5A to 5D, if UE groups in CTU 0 (UE 1, UE 6, UE 11, UE 16) all have very high data arrival rate in comparison to other UEs where they may collide with high probability, in the next slot, due to UE regrouping, the four UEs will be re-distributed to different groups, thus reducing the collision probability. Therefore, the cyclic shift and other methods used to design the resource hopping pattern aims to reduce the probability that two UEs be grouped together in multiple places in consecutive or close time intervals.

FIG. 5C shows an example of the process of FIG. 3B with resource pattern defined in FIG. 5A. In FIG. 5C, two frames with repeated resource pattern for each frame is shown. In this example, from the resource assignment, UE 1 has figured out that the resource hopping pattern or sequence for UE 1 is CTU 0, CTU 6, CTU 12, CTU 18. The first batch of data for UE1 arrives between time location index 0 and 1. Therefore, the next time interval for UE 1 is time location 1. Therefore, UE 1 performs continuous transmission/retransmission of first batch of data in resource region CTU 6 of Frame n, CTU 12 of Frame n, CTU 18 of Frame n and CTU 0 of Frame n+1. UE 1 then receives an ACK from TRP between time location 0 and 1 in frame n+1. As a result, UE 1 stops any further retransmission of first batch of data.

To generate a resource allocation pattern, such as the one defined by FIG. 5A, two methods are described above: a cyclic shift method and a pseudo random method. UEs may be grouped differently at each grant free resource such that the same UEs do not always collide with each other. The cyclic shift method may guarantee that no two UEs belong to the same group in two grant free opportunities if the number of partitions is a prime number and larger than or equal to the number of grant free resource opportunities a UE can access in a frame when the total number of UEs are below some threshold.

FIG. 5D illustrates an example resource group hopping and UE resource re-grouping along re-transmissions, comparing to the FIGS. 5A, 5B and 5C, the difference in FIG. 5D is that the CTU 5 occupies frequency resource fn, not frequency resource f1 in FIG. 5A; CTU 15 occupies frequency resource fn, not frequency resource f1 in FIG. 5A. Using different frequency resource may provide some frequency diversity gain when combined with retransmission scheme.

Pseudo Random Method Based Resource Hopping Sequence Generation

The resource hopping pattern generation may also be generated using pseudo random scheme. The pseudo random method means that once determined, the grouping may be fixed afterwards. One pseudo random method may be generated as follows. After the first M UEs are assigned to a group using distinct permutations, the 2nd and following sets of UEs that may collide with the first set of M UEs may be assigned in the same order as the first set of UEs for the first subframe or time interval in a frame. The first set of UEs are UEs 1-M, the second set of UEs are UEs (M+1)-(2M), the third set of UEs are UEs (2M+1)-(3M), etc. For the second and each following subframe, frequency partition may be randomly selected for a UE to avoid all other UEs that have been grouped together with the UE before. In addition, the partition one UE chose should also preclude all partitions the previous UEs selected in the same set. For example, since UE 8 and UE 3 can access the same grant free resources in the first sub-frame, UE 8 will avoid selecting the same partition as UE3 in the second subframe. In addition, UE 8 may not be placed in groups with UEs 6 and 7 since they are in the same set.

In another embodiment, the pseudo random method based resource hopping sequence may be generated in the following ways. For a set of M UEs as defined earlier. The BS may list all possible permutation of the M UE index. For example, for the first set of M users in FIG. 5A, where M=5, we can have permutations {1, 2, 3, 4, 5}, {1, 3, 5, 4, 2}, {2, 1, 4, 3, 5}, {3, 4, 5, 2, 1}, {5, 1, 4, 2, 3} . . . etc. Then the BS can randomly select L permutations among all possible permutations to be mapped on the L subframes in the resource allocation pattern (e.g. in FIG. 5A) for each time location index. The RS can be determined by the same method as described earlier, either fixed or hopped, but with a guarantee there is no RS collision with other UEs in the same group. Then the BS may send the resource and RS hopping sequences determined from the resource grouping map to the UE.

In another embodiment, the above pseudo random method may be applied on top of the cyclic shift method when the number of UEs is larger than a threshold. This is because, when the number of UEs is larger than a certain number, it may not be possible to guarantee that no two UEs will access the same grant free resource twice within a frame. In this case, it may be better to apply the pseudo random method when the number of UEs is larger than a threshold. For example, in FIG. 5A, it may apply the pseudo random scheme when the number of UEs are larger than 20.

RS Pattern

RS sequence assignment may be determined based on the time-frequency resource assignment results to avoid RS collisions over the same time-frequency resources. An RS may be assigned to each set of UEs for a whole frame as shown in Table 8, e.g., RSs P1-P6 may be assigned as: P1 to UE1-5, P2 to UE6-10, P3 to UE 11-15, P4 to UE16-20, P5 to UE21, and P6 reserved for grant based (GB) communications. Alternatively, each set of UEs may still be assigned the same RS but RS may hop over subframes within a frame, as shown in Table 9. P1-P6 may represent the same RS, different RS hopping patterns, or multiple RS tuples (e.g., for retransmission identification). Thus, for the RS index assigned to different UEs in the same physical resource, the RSs may be distinct, e.g., by using a permutation of RS index for each transmission time interval (TTI). For example, RS hopping index 1-6 may mean: P1: 1, 2, 3, 4; P2: 2, 3, 4, 5; P3: 3, 4, 5, 6; P4: 4, 5, 6, 1; P5: 5, 6, 1, 2; P6 (reserved for GB or for a GF UE access all opportunities): 6, 1, 2, 3.

TABLE 8

RS index table (fixed RS in one frame)

| UE index | Time location index | | | |
|---|---|---|---|---|
| | 0 | 1 | 2 | 3 |
| 1 | p1 | p1 | p1 | p1 |
| 2 | p1 | p1 | p1 | p1 |
| 3 | p1 | p1 | p1 | p1 |
| 4 | p1 | p1 | p1 | p1 |
| 5 | p1 | p1 | p1 | p1 |
| 6 | p2 | p2 | p2 | p2 |
| 7 | p2 | p2 | p2 | p2 |
| 8 | p2 | p2 | p2 | p2 |
| 9 | p2 | p2 | p2 | p2 |
| 10 | p2 | p2 | p2 | p2 |
| 11 | p3 | p3 | p3 | p3 |
| 12 | p3 | p3 | p3 | p3 |
| 13 | p3 | p3 | p3 | p3 |
| 14 | p3 | p3 | p3 | p3 |
| 15 | p3 | p3 | p3 | p3 |
| 16 | p4 | p4 | p4 | p4 |
| 17 | p4 | p4 | p4 | p4 |
| 18 | p4 | p4 | p4 | p4 |
| 19 | p4 | p4 | p4 | p4 |
| 20 | p4 | p4 | p4 | p4 |

TABLE 9

RS index table (with RS hopping)

| UE index | Time location index | | | |
|---|---|---|---|---|
| | 0 | 1 | 2 | 3 |
| 1 | p1 | p2 | p3 | p4 |
| 2 | p1 | p2 | p3 | p4 |
| 3 | p1 | p2 | p3 | p4 |
| 4 | p1 | p2 | p3 | p4 |
| 5 | p1 | p2 | p3 | p4 |
| 6 | p2 | p3 | p4 | p5 |
| 7 | p2 | p3 | p4 | p5 |
| 8 | p2 | p3 | p4 | p5 |
| 9 | p2 | p3 | p4 | p5 |
| 10 | p2 | p3 | p4 | p5 |
| 11 | p3 | p4 | p5 | p6 |
| 12 | p3 | p4 | p5 | p6 |
| 13 | p3 | p4 | p5 | p6 |
| 14 | p3 | p4 | p5 | p6 |
| 15 | p3 | p4 | p5 | p6 |
| 16 | p4 | p5 | p6 | p1 |
| 17 | p4 | p5 | p6 | p1 |
| 18 | p4 | p5 | p6 | p1 |
| 19 | p4 | p5 | p6 | p1 |
| 20 | p4 | p5 | p6 | p1 |

The above examples show RS assignment within one frame. The RS assignment may change from frame to frame while avoiding RS collisions. As an example, each UE may add a frame number mod the total number of RS to the index. As another example, RS assignment or RS index may hop over frames, e.g., RS index=assigned index for frame 0+(frame #)+(cell ID)mod (total RS available). The terms "frame #" and "(cell ID)mod (total RS available)" are optional in this equation. The term "frame #" denotes frame index here and mod denotes a remainder operator. Alternatively, RS index may hop over subframes or time intervals within a frame, e.g., to assure no RS collision in each GF opportunity. For example, RS index=assigned index for frame 0+(frame #)+(cell ID) mod (total RS available)+(subframe #) mod (total RS available), where "frame #", "(cell ID)mod (total RS available)", and "(subframe #) mod (total RS available)" are optional.

The subframe/time location index of the resource allocation pattern may be shuffled to improve the time-frequency resource usage and/or communication efficiency, for example to maximize frequency diversity. For instance, the original time-frequency assignment result obtained from the above method as shown in FIG. 5A may be shuffled to obtain the result shown in FIG. 5B. As in the example shown in FIGS. 5A and 5B, assignment result at time interval 2 in FIG. 5A is moved to time interval 3 in FIG. 5B, and assignment result at time interval 4 in FIG. 5A is moved to time interval 2 in FIG. 5B. Alternatively or additionally, the frequency location index corresponding to groups at the same time interval may be shuffled. For example, frequency index 0 and frequency index 1 at the same time interval may be exchanged. Thus in FIG. 5B, the assignment results of CTUs may be exchanged.

The above time-frequency assignment method may be represented in an equation, such as, for example, frequency location index of a UE=(UE index+(UE set index)*time slot index+constant) mod (number of frequency partitions M), where UE set index=floor ((UE index−1)/M)+1, and the time location index and frequency location index start at 0. For example, for UE 12 and M=5, UE set index=2. In time location index 2, using constant=−1, then frequency index of UE_12=(12+3*2−1) mod 5=2 as shown in FIG. 5A.

In another embodiment, the time slot or time location index may be a subframe index or some other time index. In yet another embodiment, a frame index may be added and the above equation: frequency index of a UE=(UE index+ (UE set index)*time slot index+frame index+constant) mod (number of frequency partitions M). In yet another embodiment, a cell ID may be added and the above equation may be: frequency location index of a UE=(UE index+(UE set index)*time slot index+cell ID+constant) mod (number of frequency partitions M). After the equation, the time slot and/or frequency index may be shuffled as mentioned above. Signaling may be very resource efficient because the BS may only need to signal a UE index. The time-frequency assignment result may be generated by the UE from the equation when the equation is a priori knowledge to the UE.

From the (L+1)th grant free opportunity or time intervals, the grouping of UEs may repeat as in the first L grant free opportunities. In an embodiment, the grouping may be reshuffled for resource mapping to achieve better frequency diversity.

Referring back to FIG. 3A, at step 302, the BS sends an UL transmission resource assignment to the UE after select the transmission resource to be used for the UE. In this embodiment, there are 3 options to allocate the transmission assignment.

Option 1: the UL transmission resource assignment includes a UE index to indicate the UE assigned transmission resource hopping pattern. In step 301, the BS selects transmission resources for the grant-free UE that may include assigning at least one of the physical resources and RS to the UE. The BS may assign the transmission resources according to a resource allocation pattern. The resource allocation pattern may include at least one of a physical resource allocation pattern and a RS allocation pattern. A physical resource allocation pattern may define the CTU regions that different UEs can access. FIG. 5A shows an example of such physical resource allocation pattern. In FIG. 5A, the index inside a CTU region box refers to the UEs that are allowed to access this CTU region. For example, UEs with assigned index 1, 6, 11, 16 can access CTU 0. Table 8 show an example of RS allocation pattern. In one embodiment, at step 302, the BS only assigns a UE index to a UE and the UE can figure out the CTU regions that the UE can access and RS to be used from the resource allocation pattern and RS allocation pattern based on the Table 10. Table 4 provide the table which defines the mapping of the UE index to the resource and RS hopping pattern derived from FIG. 5A and Tables 8 and 9. For example, if a UE is assigned a UE index 5, the UE can access CTU regions: CTU 4, CTU 5, CTU 11, CTU 17 and using RSs p1, p1, p1, p1, respectively. Once the UE determines the CTU index the UE can access, the UE can use the predefined or signaled CTU location table (e.g. Table 7) to obtain the time-frequency of the physical resources it can access. Similarly, the UE can figure out the RS sequence to be used based on the RS index.

TABLE 10

Map of UE index and the resource and RS hopping pattern

| UE Index | Time location index | | | |
|---|---|---|---|---|
| | 0 | 1 | 2 | 3 |
| 1 | CTU 0, p1 | CTU 6, p1 | CTU 12, p1 | CTU 18, p1 |
| 2 | CTU 1, p1 | CTU 7, p1 | CTU 13, p1 | CTU 19, p1 |

TABLE 10-continued

Map of UE index and the resource and RS hopping pattern

| UE Index | Time location index | | | |
|---|---|---|---|---|
| | 0 | 1 | 2 | 3 |
| 3 | CTU 2, p1 | CTU 8, p1 | CTU 14, p1 | CTU 15, p1 |
| 4 | CTU 3, p1 | CTU 9, p1 | CTU 10, p1 | CTU 16, p1 |
| 5 | CTU 4, p1 | CTU 5, p1 | CTU 11, p1 | CTU 17, p1 |
| 6 | CTU 0, p2 | CTU 7, p2 | CTU 14, p2 | CTU 16, p2 |
| 7 | CTU 1, p2 | CTU 8, p2 | CTU 10, p2 | CTU 17, p2 |
| 8 | CTU 2, p2 | CTU 9, p2 | CTU 11, p2 | CTU 18, p2 |
| 9 | CTU 3, p2 | CTU 5, p2 | CTU 12, p2 | CTU 19, p2 |
| 10 | CTU 4, p2 | CTU 6, p2 | CTU 13, p2 | CTU 15, p2 |
| 11 | CTU 0, p3 | CTU 8, p3 | CTU 11, p3 | CTU 19, p3 |
| 12 | CTU 1, p3 | CTU 9, p3 | CTU 12, p3 | CTU 15, p3 |
| 13 | CTU 2, p3 | CTU 5, p3 | CTU 13, p3 | CTU 16, p3 |
| 14 | CTU 3, p3 | CTU 6, p3 | CTU 14, p3 | CTU 17, p3 |
| 15 | CTU 4, p3 | CTU 7, p3 | CTU 10, p3 | CTU 18, p3 |
| 16 | CTU 0, p4 | CTU 9, p4 | CTU 13, p4 | CTU 17, p4 |
| 17 | CTU 1, p4 | CTU 5, p4 | CTU 14, p4 | CTU 18, p4 |
| 18 | CTU 2, p4 | CTU 6, p4 | CTU 10, p4 | CTU 19, p4 |
| 19 | CTU 3, p4 | CTU 7, p4 | CTU 11, p4 | CTU 15, p4 |
| 20 | CTU 4, p4 | CTU 8, p4 | CTU 12, p4 | CTU 16, p4 |

In Step 301, the BS may choose to assign the resources to the UE based on the order that the UE access to the system. For example, the first grant free UE access the system may be assigned UE index 1 in the resource allocation pattern. The second grant free UE that access the system may be assigned UE index 2, etc. When a grant free UE is no longer in connected state or no longer require grant free resources, the BS may re-assign the same index that is previously assigned to this UE to a new grant free UE that is connected to the system. In some embodiments, BS or TRP may assign the resources based on other orders. For example, the BS may randomly pick an index among the UE indexes that is below a threshold and not been used before and assign it to a new UE connected to the system.

Option 2: the UL transmission resource assignment includes a CTU index to indicate the UE assigned transmission resource hopping pattern. In step 301, the BS selects the transmission resource to a grant free UE, the TRP or BS may signal the index of the CTU regions that a UE can access. From the CTU index, the UE can obtain the physical location of the resources it can access. Also, the BS may directly signal the RS index to the UE, the CTU index and the RS index can be carried in the same transmission resource assignment or be sent by separate transmission resource assignment. For example, according to the resource allocation pattern defined in FIG. 5A, instead of assigning index 5 to the UE, the BS may directly signal the index of the CTU regions: CTU 4, CTU 5, CTU 11, CTU 17. The index of the CTU regions a UE can access may be referred a resource hopping pattern or a resource hopping sequence. Similarly in the example, the BS may also signal the actual RS index p1, p1, p1, p1, refer to the RS index used to access for the 4 CTU regions, respectively. The RS index used to access all CTU regions for a UE may be referred as a RS hopping pattern or a RS hopping sequence. In some embodiment, the RS index for each UE may be fixed over the whole frame. In this case, the BS may choose to signal a single RS index p1 for all CTU regions for UE 5. In some embodiment, TRP may signal some parameters of the actual RS sequence to be used by the UE. For example, when a Zadoff Chu sequence is used, the BS may signal the root index and the cyclic shift to be used for Zadoff Chu sequence.

For the resource allocation pattern, CTU regions may also be indexed by two dimensionally index, which typically include time and frequency location index and partitioned based on actual time and frequency locations. For example, in FIG. 5A, the 20 CTU regions may be divided into 4 set of resource regions with time location index 0 to 3. Each time location index may contain 5 CTU regions that are further indexed by the frequency location index 0 to 4. CTU 4 may correspond to a time location index 0 and a frequency location index 4, which correspond to a physical resource location of time interval 1 and frequency band f5. Time location index may corresponds to different subframes, different time intervals, etc. In this disclosure, time location index, time slot index and subframe index may be used interchangeably. The frequency location index may correspond to different frequency bands. The time location index and frequency location index may be logical index and can have different mapping to the actual physical time and frequency resources.

As described above, in some embodiments, the CTUs that have the same time location or frequency location indexes may not necessarily aligned in the actual physical time or frequency locations. The same frequency location index at different time location index may corresponds to different physical frequency bands. This has the advantage to provide frequency diversity gain through resource frequency hopping when the two CTU regions are assigned to the same UE.

Option 3: the UL transmission resource assignment includes frequency location index corresponding to each time location index of the CTU regions, which to indicate the UE assigned transmission resource hopping pattern. In step 301, the BS selects the transmission resource to a grant-free UE, TRP may signal the frequency location index of the CTU regions that a UE can access at each time location index. For example, according to the resource allocation pattern defined in FIG. 5A, instead of assigning index 5 to the UE, the TRP may directly signal the sequence of frequency location index of the CTU regions that the UE can access at each time location index: 4, 0, 1, 2. The mapping between the UE index and the frequency location index of CTU regions at each time location index derived from FIG. 5A is shown in Tables 7 to 10. This sequence of frequency index of the CTU regions a UE can access may also be referred as a resource hopping pattern or a resource hopping sequence.

FIG. 5E illustrates an embodiment UE and RS space expansion scheme. In this example, the RS assignment space gradually expands based on pilot sequences or RS sequences. Specifically, the RS assignment space may expand from orthogonal pilot sequence space 506 first to non-orthogonal pilot sequence space 504, and eventually to a random pilot sequence pool 502.

A number of first UEs registered may be assigned to different resources such that no two UEs can access the same grant free resources at the same time, and this scheme in space 508 may be similar to a contention-free semi-persistent scheduling (SPS) scheme. In this case, each UE may be assigned the same RS or different RSs, and there may be no RS or data collision. The resource and RS assignment from FIG. 5A can achieve this goal. For example, if only 5 grant-free UEs are connected to the system, the BS can assign UE index 1-5 to the 5 UEs according the resource allocation pattern in FIG. 5A. In this situation, the grant-free access is contention free as no two UEs can access the same region. In addition, UE resources are hopping at different frequency bands, thus providing diversity gain for retransmissions.

The RS space may expand to orthogonal RS space 206 when the total number of UEs exceeds a threshold, which typically corresponds to the number of UEs that the contention-free SPS scheme can support. In this case, multiple UEs may be assigned to the same grant free resource and the UEs that access the same grant free resource region may be assigned distinct orthogonal RSs. The RS space may expand to non-orthogonal RS space when the total number of UEs exceeds that orthogonal pilot sequences may support. New non-orthogonal RS sequences may be assigned to the UEs newly entering connected states. The non-orthogonal RS space may still guarantee no pilot collision. When the number of UEs further exceeds that non-orthogonal pilot sequence may support or when UEs are unaware of its current RS assignment, a UE may randomly select a RS from the random RS space 502 and do random hopping among available RSs.

For an example with five frequency partitions as shown in FIG. 5A, with a contention-free SPS scheme, a maximum of five UEs may be supported with an orthogonal sequence (OS). Each UE may be assigned with one distinct frequency resource block. All the five UEs within the SPS space 508 may be assigned the same RS, a fixed RS hopping index, or different RSs. With six cyclic shifts (CS) and one root of Zadoff Chu sequence, six orthogonal pilot sequences may be obtained, and a maximum of thirty UEs may be supported in the orthogonal RS space 506 using six orthogonal pilot sequences with no RS collision, as in ultra-reliable low latency communications (URLLC). With six orthogonal pilot sequences and thirty roots available, one hundred eighty non-orthogonal pilot sequences may be obtained. A maximum number of nine hundred UEs may be supported in the non-orthogonal RS space 504 without RS collisions, as in URLLC or massive machine-type communications (mMTC). With a scheme where a BS assigns RS sequences to UEs, when UEs are not active any more, for example inactive for a predefined period of time, the BS may release the assigned RS sequences and hopping resources to a new connected UE. The random RS space 502 may support any number of UEs, e.g., for massive connections, with random RS or physical resource selection, as in mMTC. Non-orthogonal pilot sequences may be provided with possible RS collisions. The random RS space 502 may support UEs in a non-connected state, as it may be harder for the BS to assign RS sequence for UEs in non-connected state.

When a UE performs initial access, at least one of time frequency resources and RS hopping pattern indexes may be assigned to the user which provides a unique definition of RSs and grant-free (GF) resources used for each frame. The frequency and time resources are examples of physical resources. Physical resources and MA signatures or RS sequences may be assigned via upper layer signaling such as RRC signaling or during initial access, e.g., during random access response (RAR) of initial access or random access procedure. An active UE may be assigned a resource hopping index and/or RS sequences during the initial access or radio resource control (RRC) connection stage.

The most-active UEs may be kept inside the orthogonal pilot sequence space. RS assignment may hop over time-frequency resources and/or update based on UE activities. The hopping pattern of RS sequences may be referred to as a RS hopping sequence or RS hopping pattern; the hopping pattern of physical resources for a UE may be referred to as a resource hopping pattern or resource hopping sequence. UE resources and RS selections may be dynamically updated through downlink control information (DCI) or group DCI.

FIG. 6A shows example formats for the message which are illustrated in stippled bubble 124. In example 126, the message includes a MA signature 152, in details in above embodiment the MA signature is the RS, for an example, the RS index to indicate the pilot. As well as data 154 and an indication of the identity of the UE: UE ID 156 (or UE index). The data 154 and the UE ID 156 are encoded together, and a corresponding cyclic redundancy check (CRC) 158 is generated and included in the message 126. In some embodiments, the UE ID 156 is instead embedded in the CRC 158, which may reduce the payload size. In another example, the MA signature 152 may be optional if the signature was previously acknowledged for use. Example 128 is a variation of example 126 in which the UE ID 156 is separately encoded from the data 154. Therefore, a separate CRC 161 is associated with the UE ID 156. In some embodiments, the UE ID 156 may be inside one or more other headers, in which case the CRC 161 is for the headers in which the CRC 161 is located. In example 128, the UE ID 156 may be transmitted with a lower modulation and coding scheme (MCS) than the data 154 in order to facilitate decoding of the UE ID 156. There may be situations in which the UE ID 156 is successfully decoded, but the data 154 is not successfully decoded.

Referring to FIG. 3A, the first batch of data may be transmitted in a form that may contain only a MA signature which is sent followed by a normal message that includes both a MA signature and data information. FIG. 6B shows another group of example message formats sent by UEs in a grant-free uplink transmission over an uplink channel. In example 326, the message includes UE ID 356 and a combination of data and one or more pilots 354.

In example 328, a first message includes a preamble 358 and a second message includes data and at least one pilot 354. In a particular example where the UE is utilizing URLLC, the preamble 358 may be a sequence assigned to the URLLC UE for dedicated usage in which the preamble 358 has a one-to-one mapping relationship with UE ID 356 for the URLLC UE. The first message may be transmitted separately from the data and at least one pilot 354. The BS receives the first message and identifies the URLLC UE based on the mapping relationship. The BS receives the second message, detects the pilot in the second message, performs channel estimation using the detected pilot and then decodes the data.

In another embodiment, the preamble 358 may be linked to a dedicated UE connection ID in which the preamble 358 has a one-to-one mapping relationship with the UE connection ID. The UE connection ID may be a dedicated Cell Radio Network Temporary Identifier (C-RNTI) or an assigned C-RNTI.

Such a scheme can also be applicable to other services such as eMBB.

In example 329, UE ID 356 may be transmitted separately from the data and at least one pilot 354. A first message includes UE ID 356 and a second message includes data and pilot 354.

The BS receives the first message and identifies the UE ID. The BS then receives the second message, detects the pilot in the second message, performs channel estimation using detected pilot and then decodes the data.

In one implementation of example 329, the UE ID 356 may be transmitted separately from the data and pilot 354 and the UE ID message is protected by a Cyclical Redundancy Code (CRC). The first message can be transmitted using a different numerology than the second message. Symbols used for the UE ID 356 message can use different numerology than the symbols used for the data and pilot 354. In a particular embodiment, symbols used for the UE ID 356 message can use a larger Cyclic Prefix (CP) for the UE ID message 356 than the symbols used for the data and pilot 354.

In some implementations, UE ID 356 of example 329, preamble 358 of the example 328, or the pilot included in the examples, may also carry buffer status information as well as MCS. This may allow the network to decide an appropriate resource size in the UL grant for future transmissions of the UE.

Figure 7:
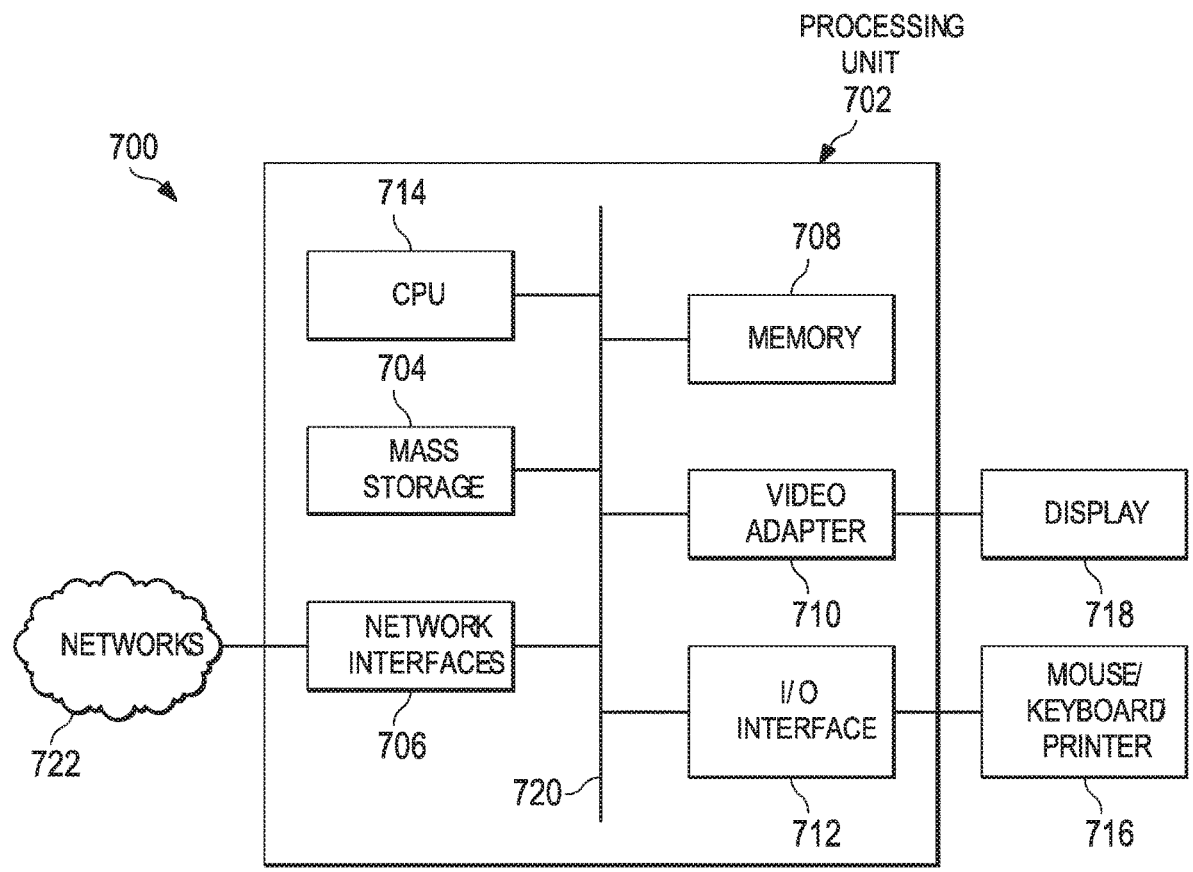
FIG. 7 illustrates a diagram of a computing system according to an embodiment of the disclosure.

FIG. 7 is a block diagram of a computing system 700 that may be used for implementing the devices and methods disclosed herein. For example, the computing system can be any entity of UE, access node (AN), MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 700 includes a processing unit 702. The processing unit includes a central processing unit (CPU) 714, memory 708, and may further include a mass storage device 704, a video adapter 710, and an I/O interface 712 connected to a bus 720.

The bus 720 may be one or more of any type of several bus architectures including a memory bus or memory controller, a peripheral bus, or a video bus. The CPU 714 may comprise any type of electronic data processor. The memory 708 may comprise any type of non-transitory system memory such as static random access memory (SRAM), dynamic random access memory (DRAM), synchronous DRAM (SDRAM), read-only memory (ROM), or a combination thereof. In an embodiment, the memory 708 may include ROM for use at boot-up, and DRAM for program and data storage for use while executing programs.

The mass storage 704 may comprise any type of non-transitory storage device configured to store data, programs, and other information and to make the data, programs, and other information accessible via the bus 720. The mass storage 704 may comprise, for example, one or more of a solid state drive, hard disk drive, a magnetic disk drive, or an optical disk drive.

The video adapter 710 and the I/O interface 712 provide interfaces to couple external input and output devices to the processing unit 702. As illustrated, examples of input and output devices include a display 718 coupled to the video adapter 710 and a mouse/keyboard/printer 716 coupled to the I/O interface 712. Other devices may be coupled to the processing unit 702, and additional or fewer interface cards may be utilized. For example, a serial interface such as Universal Serial Bus (USB) (not shown) may be used to provide an interface for an external device.

The processing unit 702 also includes one or more network interfaces 706, which may comprise wired links, such as an Ethernet cable, and/or wireless links to access nodes or different networks. The network interfaces 706 allow the processing unit 702 to communicate with remote units via the networks. For example, the network interfaces 706 may provide wireless communication via one or more transmitters/transmit antennas and one or more receivers/receive antennas. In an embodiment, the processing unit 702 is coupled to a local-area network 722 or a wide-area network for data processing and communications with remote devices, such as other processing units, the Internet, or remote storage facilities.

Figure 8:
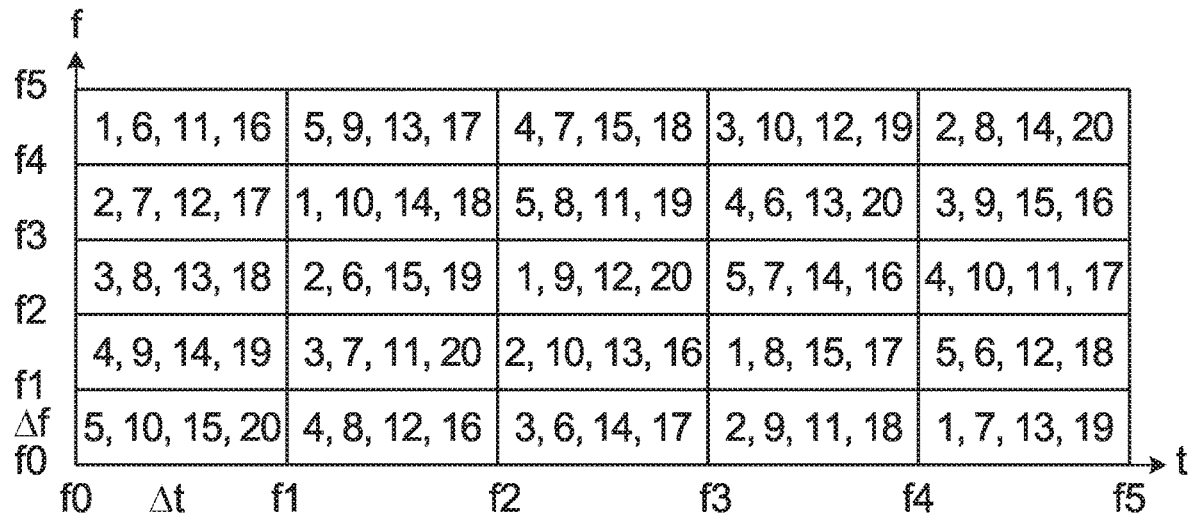
FIG. 8 illustrates an example grant free transmission resource assigned to multiple UEs according to an embodiment of the disclosure.

FIG. 8 illustrates an example of a grant free time-frequency transmission resource that may be used for multiple UEs. The numbers 1 to 20 in the blocks of FIG. 8 refer to twenty separate UEs. In the time dimension, the grant free transmission resource in FIG. 8 is a 10 ms frame containing 5 time intervals, in which each time interval corresponds to 2 subframe or 2 ms. In the frequency dimension, the transmission resource occupies 5 frequency intervals. There are 5 RB each in frequency interval. Therefore, there are a total of 25 resource blocks (RB). FIG. 8 is merely an example and thus a grant free transmission resource may have a different number of time intervals and frequency intervals and resource blocks.

System information (for example SIB signaling) may define the grant free transmission resource by setting a grant free frequency starting point at f0 and a grant frequency finish point at f5.

The SIB may also define a grant free CTU frequency size equal to $\Delta f$, in terms of the RB size (in the case of FIG. 8 it equals to 5), grant free CTU time size equal to $\Delta t$, which is equal to 2 ms. In some embodiments there may be a unit default to subframe=1 ms.

The above information transmitted in the SIB defines all the CTU region size, locations, number of partitions and time slots within a frame.

As part of the UE specific RRC signaling, the BS may transmit information in a number of fields.

One field may include a grant free UE identifier.

One field may include information defining the grant free frame interval for UL equal to 10, which equates to 10 subframe or 10 ms. Alternatively, the grant free frame interval for UL field may be empty as this may be by default the same frame defined for grant-based transmission.

One field may include information defining grant free schedule interval for UL equal to 2, which equates to 2 ms per time interval.

One field may include information defining CTU size in the frequency domain. It may be defined in terms of number of RBs. In some embodiments a default equals 5. If this is defined in the SIB, as described above, this field may not be used.

One field may include information defining a resource hopping pattern.

Referring to UE 2 in FIG. 8 for example, the resource assigned to UE2 is (1, 2, 3, 4, 0). This means that UE 2 appears in the 1st frequency partition (of 0 to 4 frequency partitions, 0 being the frequency partition at the top in FIG. 8) in a first time slot of the frame, in the 2nd frequency partition in a second time slot of the frame, in the 3rd frequency partition in a third time slot of the frame, in the 4th frequency partition in a fourth time slot of the frame and in the 0th frequency partition in a fifth time slot of the frame.

One field may include information defining a RS hopping pattern. The RS hopping pattern may be a RS index or a cyclic shift value, e.g. index p1. In some embodiments, this field may be optional if the RS hopping pattern can be derived from the resource hopping pattern.

One field may include information defining a MCS field. This field may also be optional as the MCS can be predefined, the UE can select the MCS itself or the MCS can be provided through complementary DCI signaling as described above.

One field may include information defining a search space for further DCI grant. The search space may be defined as part of RRC signaling or predefined as described earlier.

The above SIB and RRC signaling are enough to define grant free resource and RS assignment for UE2 in FIG. 8.

In some implementations, complementary DCI may be used, if for example SIB and RRC signaling does not define the CTU region, but RRC defines the resource hopping pattern in terms of an index sequence.

With regard to FIG. 8, a DCI message may indicate a first transmission resource at the first interval (for example by specifying the starting and end frequency band or RBs at time interval 0), RS index p1 to be used for time interval 0 and MCS. Based on this DCI message the UE can derive the remaining resources based on the first resource and RS in time interval 0 and resource hopping pattern defined in RRC signaling.

Figure 9:
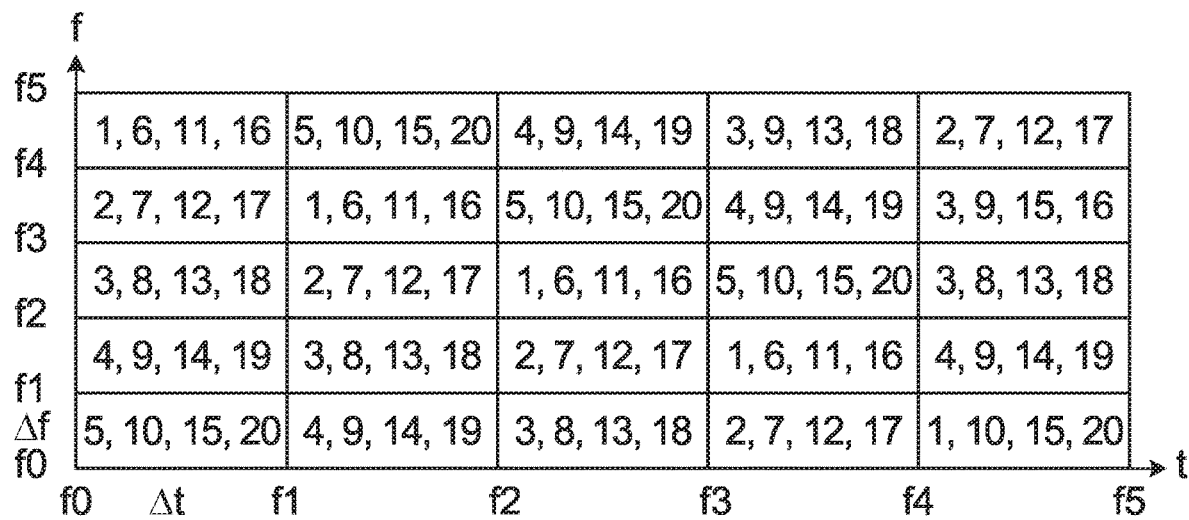
FIG. 9 illustrates an example grant free transmission resource assigned to multiple UEs where the UEs are grouped in a consistent manner according to an embodiment of the disclosure.

FIG. 9 illustrates another example of a grant free time-frequency transmission resource that may be used for multiple UEs. The numbers 1 to 20 in the blocks of FIG. 9 refer to twenty separate UEs. The size and intervals are the same as in FIG. 8. However, FIG. 9 is different from FIG. 8 in that groups of the same four UEs occur in different frequency partitions in each time interval, i.e. UEs 1, 6, 11 and 16 appears in the 0th frequency partition (of 0 to 4 frequency partition) in the first time slot of the frame, in the 1st frequency partition in the second time slot of the frame, in the 2nd frequency partition in the third time slot of the frame, in the 3rd frequency partition in the fourth time slot of the frame and in the 4th frequency partition in the fifth time slot of the frame. This allows all of the UEs assigned a given set of RBs to be assigned the same grant free group ID as opposed to individual grant free UE IDs.

In this type of fixed grouping resource assignment, the system information (SIB) may define the same grant free CTU regions as the previous example described above with regard to FIG. 8.

With regard to RRC signaling, groups of UEs, for example UEs 2, 7, 12, 17 in FIG. 9, may be assigned the same grant free group identifier.

With regard to DCI messages, the DCI message may configure grant free resources and RS for a group of UEs, for example UEs 2, 7, 12, 17 in FIG. 9, or schedule retransmission for the group of UEs, as a group, using the grant free group identifier assigned to them.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module for establishing a serving cluster, a instantiating unit/module, an establishing unit/module for establishing a session link, an maintaining unit/module, other performing unit/module for performing the step of the above step. The respective units/modules may be hardware, software, or a combination thereof. For instance, one or more of the units/modules may be an integrated circuit, such as field programmable gate arrays (FPGAs) or application-specific integrated circuits (ASICs).

According to a first example there is provided a method for uplink data transmission. The method comprises receiving, by a first user equipment (UE), a transmission resource assignment from a network entity, wherein the transmission resource assignment comprises an index, the index having a pre-defined relationship with a transmission resource hopping pattern, the transmission resource hopping pattern comprising a time-frequency resource hopping pattern and a reference signal (RS) pattern, the combination of each time-frequency resource and each RS being unique for each UE. The method also comprises obtaining, by the first UE, time-frequency resources and RSs corresponding to each time interval of a frame based on the pre-defined relationship. The method also comprises transmitting, by the first UE, data packets based on the obtained time-frequency resources without communicating, to the network entity, a corresponding transmission resource request requesting the transmission resources to be assigned to the first UE.

According to a second example here is provided, the method of the first example, wherein the index comprises any one of the following: a UE index to indicate the first UE assigned time-frequency resources and the at least one RS; at least one contention transmission unit (CTU) index to indicate the UE assigned time-frequency resources: or at least one frequency location index corresponding to each time location index of the CTU regions to indicate the UE assigned time-frequency resources.

According to a third example there is provided, the method of the first example or the second example, wherein the index has a pre-defined relationship with a time-frequency resource hopping pattern and a reference signal (RS) pattern comprises: each UE index has a predefined relationship with corresponding CTU index and a RS in each time interval of a frame, wherein the each CTU index indicates a unique time and frequency resource.

According to a fourth example there is provided, the method of the third example, wherein the time-frequency resource hopping pattern comprises M transmission resources allocated to N UE sets at time slot index k, each set of UE comprising M UEs, wherein UE set i at time slot index k has a cyclic shift relationship with the UE set i−1 at time slot index k.

According to a fifth example there is provided, the method of the fourth example, wherein UE set i at time slot index k has a cyclic shift relationship with the UE set i at time slot index k−1.

According to a sixth example there is provided, the method of the fifth example, wherein the method further comprises: wherein a first cyclic shift number between UE set i and UE set i−1 at time slot index k is different from a second cyclic shift number between UE set i at time slot index k and UE set i−1 at time slot index k−1.

According to a seventh example there is provided, the method of the fifth example, wherein the method further comprises: wherein a first cyclic shift number between UE set i and UE set i−1 at time slot index k is the same as a second cyclic shift number between UE set i at time slot index k and UE set i−1 at time slot index k−1.

According to an eighth example, there is provided a method for uplink data transmission. The method comprises transmitting, by a network entity, a transmission resource assignment to a user equipment (UE), wherein the transmission resource assignment comprise an index, the index having a pre-defined relationship with a transmission resource hopping pattern, the transmission resource hopping pattern comprising a time-frequency resource hopping pattern and a reference signal (RS) pattern, the combination of each time-frequency resource and each RS being unique for each UE. The method also comprises receiving, by the network entity, data packets transmitted over time-frequency resource based on the transmission resource assignment.

According to an ninth example there is provided, a user equipment (UE) configured for wireless communications. The UE comprises: a non-transitory memory storage comprising instructions; and one or more processors in communication with the memory, wherein the one or more processors execute the instructions to: receive a transmission resource assignment from a network entity, wherein the transmission resource assignment comprise an index, the index having a pre-defined relationship with a transmission resource hopping pattern, the transmission resource hopping pattern comprising a time-frequency resource hopping pattern and a reference signal (RS) pattern, the combination of each time-frequency resource and each RS being unique for each UE; obtain time-frequency resources and RSs corresponding to each time interval of a frame based on the pre-defined relationship; and transmit data packets based on the obtained time-frequency resources without communicating, to the network entity, a corresponding transmission resource request requesting the transmission resources to be assigned to the first UE.

According to a tenth example there is provided, a network entity, the network entity comprising: a non-transitory memory storage comprising instructions; and one or more processors in communication with the memory, wherein the one or more processors execute the instructions to: transmit a transmission resource assignment to a user equipment (UE), wherein the transmission resource assignment comprise an index, the index having a pre-defined relationship with a transmission resource hopping pattern, the transmission resource hopping pattern comprising a time-frequency resource hopping pattern and a reference signal (RS) pattern, the combination of each time-frequency resource and each RS being unique for each UE; and receive data packets transmitted over time-frequency resource based on the transmission resource assignment.

According to an eleventh example there is provided, a method for data transmission, comprising: receiving, by a first user equipment (UE), a transmission resource assignment from a network entity, wherein the transmission resource assignment indicates transmission resources to be used for the first UE, wherein the transmission resources comprise a pre-defined relationship with a time-frequency resource hopping pattern in a frame, wherein the time-frequency resource hopping pattern comprises M transmission resources allocated to N UE sets at time slot index k, each set of UE comprising M UEs, wherein UE set i at time index k has a cyclic shift relationship with the UE set i−1 at time index k; and sending, by the UE, a first data transmission based on the allocated transmission resource; wherein k is any value from 1 to N, and i is 2 to N.

According to a twelfth example there is provided, the method of the eleventh example, wherein the method further comprises: wherein UE set i at time index k has a cyclic shift relationship with the UE set i at time index k−1; wherein k is any value from 2 to N.

According to a thirteenth example there is provided, the method of the eleventh example or twelfth example, wherein the method further comprises: wherein a first cyclic shift number between UE set i and UE set i−1 at time index k is different from a second cyclic shift number between UE set at time index k and i UE set i−1 at time index k−1.

According to a fourteenth example there is provided, the method of the thirteenth example, wherein the first data transmission comprises a data field and a reference signal (RS) filed.

According to a fifthteenth example there is provided, the method of the fourteenth example, wherein each RS has a predefined relationship with each UE set.

According to a sixteenth example there is provided, the method of the fifteenth example, wherein the transmission resource assignment comprises a first index, the first index has a relationship with resource units of time-frequency resources.

According to a seventeenth example there is provided, the method of the eleventh example or twelfth example, wherein the method further comprises: wherein a first cyclic shift number between UE set i and UE set i−1 at time index k is the same as a second cyclic shift number between UE set i at time index k and UE set i−1 at time index k−1.

According to a eighteenth example there is provided, the method of the eleventh example, wherein the UEs of the same location in each set are grouped into one group and assigned the same time-frequency resource.

According to a nineteenth example there is provided, the method of the eighteenth example, wherein the UEs in each set are assigned the same reference signal (RS) sequence.

According to a twentieth example there is provided, the method of the nineteenth example, wherein the RS sequence assignment is determined based on the time-frequency resource assignment results to avoid RS collisions over the same time-frequency resources.

According to a twenty-first example there is provided, the method of the twentieth example, wherein a RS sequence identifies at least one of an initial transmission or a retransmission, or a redundancy version (RV).

According to a twenty-second example there is provided, the method of the nineteenth example, wherein an RS sequence assigned to a UE is reassigned to a second UE when a first UE becomes inactive.

According to a twenty-third example there is provided, the method of the nineteenth example, wherein the RS sequence assignment results are transmitted during at least one of an initial access period or RRC connection stage.

According to a twenty-fourth example there is provided, the method of the twenty-third example, wherein the RS sequence assignment results include an RS index.

According to a twenty-fifth example there is provided, the method of the twenty-fourth example, wherein a RS sequence assignment scheme comprising the RS index is a priori knowledge to the UE.

According to a twenty-sixth example there is provided, the method of the eighteenth example, wherein the time-frequency resources assigned to a first group at the first time index and the second time index are different.

According to a twenty-seventh example there is provided, the method of the eighteenth example, wherein the time-frequency resource assignment results are transmitted during at least one of an initial access period or radio resource control (RRC) connection stage.

According to a twenty-eighth example there is provided, the method of the eighteenth example, wherein the time-frequency resource assignment results include a time-frequency resource index.

According to a twenty-ninth example there is provided, the method of the twenty-eighth example, wherein a time-frequency resource assignment scheme comprising the time-frequency resource index is a priori knowledge to the UE.

According to a thirtieth example there is provided, the method of the eighteenth example, the time-frequency resource assignment results include at least one of an initial time-frequency resource assignment and a time-frequency resource hopping pattern.

According to a thirty-first example there is provided, a method for data transmission, comprising: sending, by a network entity, a transmission resource assignment from a network entity, wherein the transmission resource assignment indicates transmission resources to be used for the first UE, wherein the transmission resources comprise a pre-defined relationship with a time-frequency resource hopping pattern in a frame, wherein the time-frequency resource hopping pattern comprises M transmission resources allocated to N UE sets at time slot index k, each set of UE comprising M UEs, wherein UE set i at time index k has a cyclic shift relationship with the UE set i−1 at time index k; and receiving, by the network entity, a first data transmission based on the allocated transmission resource; wherein k is any value from 1 to N, and i is 2 to N.

According to a thirty-second example there is provided, a method of the thirty-first example, wherein the method further comprises: wherein UE set i at time index k has a cyclic shift relationship with the UE set i at time index k−1; wherein k is any value from 2 to N.

According to a thirty-third example there is provided, a method of the thirty-first example or the thirty-second example, wherein the method further comprises: wherein a first cyclic shift number between UE set i and UE set i−1 at time index k is different from a second cyclic shift number between UE set at time index k and i UE set i−1 at time index k−1.

According to a thirty-fourth example there is provided, a method of any one of the thirty-first example to the thirty-third example, wherein the first data transmission comprises a data field and a reference signal (RS) filed.

According to a thirty-fifth example there is provided, a method of any one of the thirty-first example to the thirty-fourth example, wherein each RS has a predefined relationship with each UE set.

According to a thirty-sixth example there is provided, a method of the thirty-fifth example, further comprising: identifying, by the network entity, the RS based on the pre-defined relationship with a UE set comprising a UE.

According to a thirty-seventh example there is provided, a method of the thirty-sixth example, further comprising: identifying, by the network entity, the UE based on the pre-defined relationship between the transmission resources and the set UE group; and decoding, by the network entity, the data based on the first data transmission.

According to a thirty-eighth example there is provided, a user equipment (UE) configured for wireless communications, the UE comprising: a non-transitory memory storage comprising instructions; and one or more processors in communication with the memory, wherein the one or more processors execute the instructions to: receive a transmission resource assignment from a network entity, wherein the transmission resource assignment indicates transmission resources to be used for the first UE, wherein the transmission resources comprise a pre-defined relationship with a time-frequency resource hopping pattern in a frame, wherein the time-frequency resource hopping pattern comprises M transmission resources allocated to N UE sets at time slot index k, each set of UE comprising M UEs, wherein UE set i at time index k has a cyclic shift relationship with the UE set i−1 at time index k; and send a first data transmission based on the allocated transmission resource; wherein k is any value from 1 to N, and i is 2 to N.

According to a thirty-ninth example there is provided, a network entity configured for wireless communications, the network entity comprising: a non-transitory memory storage comprising instructions; and one or more processors in communication with the memory, wherein the one or more processors execute the instructions to: send a transmission resource assignment to a user equipment (UE), wherein the transmission resource assignment indicates transmission resources to be used for the first UE, and the transmission resources has a pre-defined relationship with a time-frequency resource hopping pattern in a frame, and the time-frequency resource hopping pattern comprises M set transmission resources allocated to N set UE groups, wherein i set UE group in the k set transmission resource has a cyclic shift relationship with the i−1 set UE group in the k set transmission; and receive a first data transmission based on the allocated transmission resource from the UE; wherein the value k is 2 to M, the value i is 2 to N.

According to a fortieth example there is provided, a method for reference signal (RS) assignment for uplink (UL) grant-free (GF) transmissions, the method comprising: assigning, by a base station (BS), a plurality of orthogonal RS sequences to a first set of user equipments (UEs) when a number of the first set of UEs is below a first threshold, a UE using an RS for each GF opportunity; and transmitting, by the BS, RS sequence assignment results to at least one UE of the first set of UEs.

According to a forty-first example there is provided, The method of the fortieth example, further comprising: assigning, by the BS, a plurality of non-orthogonal RS sequences to a second set of UEs when a total number of the first set of UEs and the second set of UEs is above the first threshold and below a second threshold; and transmitting, by the BS, RS sequence assignment results to at least one UE of the second set of UEs.

According to a forty-second example there is provided, a method of the fortieth example, further comprising: assigning, by the BS, a pool of random RS sequences to a third set of UEs when a total number of the first set of UEs, the second set of UEs, and the third set of UEs is above the second threshold; and transmitting, by the BS, RS sequence assignment results to at least one UE of the third set of UEs.

According to a forty-third example there is provided, a method of the fortieth example, wherein a RS sequence identifies at least one of an initial transmission or a retransmission, or a redundancy version (RV).

According to a forty-fourth example there is provided, a method of the fortieth example, wherein a UE of the third set of UEs randomly selects a RS sequence from the pool of random RS sequences.

According to a forty-fifth example there is provided, a method of the fortieth example, wherein the RS sequence assignment results are transmitted during at least one of an initial access period or radio resource control (RRC) connection stage.

According to a forty-sixth example there is provided, a method of the fortieth example, wherein an RS sequence assigned to a first UE is reassigned to a second UE when the first UE becomes inactive.

According to a forty-seventh example there is provided, a network entity configured for wireless communications, the network entity comprising: a non-transitory memory storage comprising instructions; and one or more processors in communication with the memory, wherein the one or more processors execute the instructions to: assign a plurality of orthogonal RS sequences to a first set of user equipments (UEs) when a number of the first set of UEs is below a first threshold, a UE using an RS for each GF opportunity; and transmit RS sequence assignment results to at least one UE of the first set of UEs.

According to a forty-eighth example there is provided, a method for unified resource and reference signal (RS) assignment for uplink (UL) grant-free transmissions, the method comprising: transmitting, by a base station (BS), an index of at least one of time-frequency resources or RS sequences to a plurality of user equipments (UEs); and updating an index of the mapping scheme based on a change in at least one of traffic load, a number of the plurality of UEs, RS resources, or time-frequency resources.

According to a forty-ninth example there is provided, a method of the forty-eighth example, wherein the mapping scheme is transmitted to the plurality of user equipments (UEs) during at least one of an initial access procedure or a random access procedure.

According to a fiftieth example there is provided, a method of the forty-eighth example, wherein the update on the index of the mapping scheme is transmitted to the plurality of UEs through at least one of system information, a broadcast channel, or a common control channel.

According to a fifty-first example there is provided, a network entity configured for wireless communications, the network entity comprising: a non-transitory memory storage comprising instructions; and one or more processors in communication with the memory, wherein the one or more processors execute the instructions to: transmitting an index of at least one of time-frequency resources or RS sequences to a plurality of user equipments (UEs); and update an index of the mapping scheme based on a change in at least one of traffic load, a number of the plurality of UEs, RS resources, or time-frequency resources.

According to a fifty-second example there is provided, a method for uplink (UL) grant-free transmissions, the method comprising: receiving, by a user equipment (UE), resource assignment from a base station (BS), wherein the resource assignment comprises transmission resource information for each time slot; transmitting, by the UE, a first data packet using the assigned resource of a first time slot; retransmitting, by the UE, the first data packet using the assigned resource of a second time slot; receiving an acknowledgement for the first data packet from the BS; and ceasing to retransmit the first data packet According to a fifty-third example there is provided, a user equipment (UE) configured for wireless communications, the UE comprising: a non-transitory memory storage comprising instructions; and one or more processors in communication with the memory, wherein the one or more processors execute the instructions to: receive resource assignment from a base station (BS), wherein the resource assignment comprises transmission resource information for each time slot; transmit a first data packet using the assigned resource of a first time slot; retransmit the first data packet using the assigned resource of a second time slot; receive an acknowledgement for the first data packet from the BS; and cease to retransmit the first data packet.

According to a fifty-fourth example there is provided, a method for configuring grant free transmission comprising: transmitting a grant free uplink transmission resource assignment for a User Equipment (UE) using Radio Resource Control (RRC) signaling.

According to a fifty-fifth example there is provided, a method of the fifty-fourth example, wherein the RRC signaling format includes at least one of: a grant free UE identifier; a group identifier for a plurality of grant free UEs; a transmission resource; a resource hopping pattern; a reference signaling (RS) hopping pattern; modulation and coding scheme (MCS) information; and a definition of a search space for a locating Downlink Control Information (DCI) message.

According to a fifty-sixth example there is provided, a method of fifty-fifth example further comprising determining the value to be transmitted for at least one of: a grant free UE identifier; a group identifier for a plurality of grant free UEs; a transmission resource; a resource hopping pattern, a reference signaling (RS) hopping pattern; modulation and coding scheme (MCS) information; and a definition of a search space for a locating Downlink Control Information (DCI) message.

According to a fifty-seventh example there is provided, a method of the fifty-fourth example comprising: receiving a first data transmission or a subsequent retransmission on the grant free uplink transmission resource assignment assigned to the UE.

According to a fifty-eighth example there is provided, a method of the fifty-seventh example comprising, in response to receiving the first data transmission or a subsequent retransmission, transmitting at least one of: an acknowledgement (ACK) if the first data transmission or subsequent retransmission was successfully decoded; a negative acknowledgement (NACK) if the first data transmission or subsequent retransmission was not successfully decoded; and a grant for retransmission if the first data transmission or subsequent retransmission was not successfully decoded.

According to a fifty-ninth example there is provided, a method of the fifty-eighth example comprising transmitting the ACK, NAK or grant for retransmission in a Downlink Control Information (DCI) message.

According to a sixtieth example there is provided, a method of the fifty-fourth example comprising transmitting an update of transmission resources in a DCI message.

According to a sixty-first example there is provided, a method of the sixtieth example wherein the DCI message is encoded with a grant free group ID.

According to a sixty-second example there is provided, a method of the fifty-fourth example comprising transmitting an activation indicator in a DCI message.

According to a sixty-third example there is provided, a method of the fifty-fourth example comprising transmitting a deactivation indicator in a DCI message.

According to a sixty-fourth example there is provided, a method of the fifty-fourth example further comprising broadcasting system information accessible to a plurality of UEs.

According to a sixty-fifth example there is provided, a method of the sixty-fourth example wherein the system information includes at least one of information that defines the start of a grant free frequency transmission resource (GFfrequencyStart), the end of the grant free frequency transmission resource (GFfrequencyFinish), a grant free CTU size and the CTU time size (GFCTUSizeTime).

According to a sixty-sixth example there is provided, a method for configuring grant free transmission comprising: receiving a grant free uplink transmission resource assignment for a User Equipment (UE) using Radio Resource Control (RRC).

According to a sixty-seventh example there is provided, a method of the sixty-sixth example, wherein the RRC signaling format includes at least one of: a grant free UE identifier; a group identifier for a plurality of grant free UEs; a transmission resource; a resource hopping pattern, a reference signaling (RS) hopping pattern; modulation and coding scheme (MCS) information; and a definition of a search space for a locating Downlink Control Information (DCI) message.

According to a sixty-eighth example there is provided, a method of the sixty-sixth example comprising: transmitting a first data transmission or a subsequent re-transmission on the grant free uplink transmission resource assignment assigned to the UE.

According to a sixty-ninth example there is provided, a method of the sixty-eighth example comprising receiving at least one of: an acknowledgement (ACK) if the first data transmission or subsequent retransmission was successfully decoded; a negative acknowledgement (NACK) if the first data transmission or subsequent retransmission was not successfully decoded; and a grant for retransmission if the first data transmission or subsequent retransmission was not successfully decoded.

According to a seventieth example there is provided, a method of the sixty-ninth example comprising receiving the ACK, NAK or grant for retransmit in a Downlink Control Information (DCI) message.

According to a seventy-first example there is provided, a method of the seventieth example comprising searching a predetermined search space for the DCI message.

According to a seventy-second example there is provided, a method of seventy-first example further comprising decoding the DCI message based on a grant free UE identifier assigned to the grant free UE in the RRC signaling.

According to a seventy-third example there is provided, a method of the sixty-sixth example comprising receiving an update of transmission resources in a DCI message.

According to a seventy-fourth example there is provided, a method of the seventy-third example wherein the DCI message is encoded with a grant free group ID.

According to a seventy-fifth example there is provided, a method of the sixty-sixth example comprising receiving an activation indicator in a DCI message.

According to a seventy-sixth example there is provided, a method of the sixty-sixth example comprising receiving a deactivation indicator in a DCI message.

According to a seventy-seventh example there is provided, a method of the sixty-sixth example further comprising receiving system information defining information for a plurality of UEs.

According to a seventy-eighth example there is provided, a method of the seventy-sixth example wherein the system information includes at least one of information that defines the start of a grant free frequency transmission resource (GFfrequencyStart), the end of the grant free frequency transmission resource (GFfrequencyFinish), a grant free CTU size and the CTU time size (GFCTUSizeTime).

According to a seventy-nine example there is provided, a method of the sixty-sixth example wherein the transmission resource to be used for grant free transmission is determined based on the RRC information and at least one of: system information; and decoded DCI messages.

According to a eightieth example there is provided, a network device comprising: a processor; and a computer readable storage medium storing programming for execution by the processor, the programming including instructions to perform actions in accordance with a method in any one of the fifty-fourth example to sixty-fifth example.

According to a eighty-first example there is provided, a UE comprising: a processor; and a computer readable storage medium storing programming for execution by the processor, the programming including instructions to perform actions in accordance with a method in any one of the sixty-sixth example to 26.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for a user equipment (UE) for grant free transmissions, the method comprising:
    receiving, from a network equipment, a radio resource control (RRC) signaling indicating an uplink grant free transmission resource configuration for transmission and re-transmission of uplink data, the uplink grant free transmission resource configuration including a time resource, a frequency resource, reference signal (RS) resource information, and a periodicity of grant free transmission opportunities;
    obtaining uplink grant free transmission resources based on the RRC signaling, without receiving downlink control information (DCI) for the uplink grant free transmission resources;
    transmitting, to the network equipment, the uplink data using the uplink grant free transmission resources; and
    transmitting, to the network equipment, a re-transmission of uplink data.

2. The method of claim 1, the method further comprising:
    receiving, from the network equipment, a DCI message indicating a grant of uplink transmission resources for the re-transmission of the uplink data, wherein transmitting the re-transmission of the uplink data is based on the grant.

3. The method of claim 2, wherein the RRC signaling further comprises a grant free UE identifier, the method further comprising:
    decoding the DCI message using the grant free UE identifier.

4. The method of claim 2, wherein the DCI message comprises a new data indicator field set to a value of 1 indicating that the grant is for the re-transmission of the uplink data.

5. The method of claim 1, wherein the RRC signaling further comprises a number of transmission repetitions of the uplink data.

6. The method of claim 1, wherein the RRC signaling further comprises a number of configured HARQ processes.

7. The method of claim 1, wherein the RRC signaling further comprises at least one of the following:
    power control parameters;
    a group identifier for a plurality of grant free UEs;
    a resource hopping pattern;
    a RS hopping pattern; and
    modulation and coding scheme (MCS) information.

8. The method of claim 1 further comprising re-transmitting the uplink data using the uplink grant free transmission resources if no DCI message indicating a grant for a re-transmission of the uplink data has been received.

9. The method of claim 5 further comprising re-transmitting the uplink data using the uplink grant free transmission resources until the number of transmission repetitions is reached.

10. A user equipment (UE) configured for grant free transmissions, the UE comprising:
    a processor; and
    a computer readable storage medium storing programming instructions for execution by the processor, the programming including instructions to:
    receive, from a network equipment, a radio resource control (RRC) signaling from a network equipment, wherein the RRC signaling indicates an uplink grant free transmission resource configuration for transmission and re-transmission of uplink data, and wherein the uplink grant free transmission resource configuration includes a time resource, a frequency resource, reference signal (RS) resource information, and a periodicity of grant free transmission opportunities;
    obtain uplink grant free transmission resources based on the RRC signaling, without receiving downlink control information (DCI) for the uplink grant free transmission resources;
    transmit, to network equipment, the uplink data using the uplink grant free transmission resources; and
    transmit, to the network equipment, a re-transmission of uplink data.

11. The UE of claim 10, the computer-readable medium having stored thereon computer-executable instructions, that when executed by the processor cause the UE to:
    receive, from the network equipment, a DCI message indicating a grant of uplink transmission resources for a re-transmission of the uplink data, wherein transmitting the re-transmission of the uplink data is based on the grant.

12. The UE of claim 11, wherein the RRC signaling further comprises a grant free UE identifier, the computer-readable medium having stored thereon computer-executable instructions, that when executed by the processor cause the UE to:
    decode the DCI message using the grant free UE identifier.

13. The UE of claim 11, wherein the DCI message comprises a new data indicator field set to a value of 1 indicating that the grant is for the re-transmission of the uplink data.

14. The UE of claim 10, wherein the RRC signaling further comprises a number of transmission repetitions of the uplink data.

15. The UE of claim 10, wherein the RRC signaling further comprises a number of configured HARQ processes.

16. The UE of claim 10, wherein the RRC signaling further comprises at least one of the following:
    power control parameters;
    a group identifier for a plurality of grant free UEs;
    a resource hopping pattern;
    a RS hopping pattern; and
    modulation and coding scheme (MCS) information.

17. The UE of claim 10, the computer-readable medium having stored thereon computer-executable instructions, that when executed by the processor cause the UE to: re-transmit the uplink data using the uplink grant free transmission resources if no DCI message indicating a grant for a re-transmission of the uplink data has been received.

18. The UE of claim 14, the computer-readable medium having stored thereon computer-executable instructions, that when executed by the processor cause the UE to: re-transmit the uplink data using the uplink grant free transmission resources until the number of transmission repetitions is reached.

19. A method for a network equipment for grant free transmissions, the method comprising:
- transmitting, to a user equipment (UE), a radio resource control (RRC) signaling indicating an uplink grant free transmission resource configuration for transmission and re-transmission of uplink data, wherein the uplink grant free transmission resource configuration includes a time resource, a frequency resource, reference signal (RS) resource information, and a periodicity of grant free transmission opportunities;
- receiving, from the UE, uplink data transmitted using uplink grant free transmission resources allocated based on the RRC signaling, without transmitting downlink control information (DCI) for the uplink grant free transmission resources; and
- receiving, from the UE, a re-transmission of uplink data.

20. The method of claim 19, the method further comprising:
- transmitting, to the UE, a DCI message indicating a grant of uplink transmission resources for a re-transmission of the uplink data, wherein receiving
- the re-transmission of the uplink data is based on the grant.

21. The method of claim 20, wherein the RRC signaling further includes a grant-free UE identifier.

22. The method of claim 20, wherein the DCI message comprises a new data indicator field set to a value of 1 indicating that the grant is for the re-transmission of the uplink data.

23. The method of claim 19, wherein the RRC signaling further comprises a number of transmission repetitions of the uplink data.

24. The method of claim 19, wherein the RRC signaling further comprises a number of configured HARQ processes.

25. The method of claim 19, wherein the RRC signaling further comprises at least one of the following:
- power control parameters;
- a group identifier for a plurality of grant free UEs;
- a resource hopping pattern;
- a RS hopping pattern; and
- modulation and coding scheme (MCS) information.

26. The method of claim 19 further comprising receiving a re-transmission of the uplink data using the uplink grant free transmission resources.

27. The method of claim 23 further comprising receiving a re-transmission of the uplink data using the uplink grant free transmission resources until the number of transmission repetitions is reached.

28. A network equipment configured for grant free transmissions, the network equipment comprising:
- a processor; and
- a computer readable storage medium storing programming instructions for execution by the processor, the programming including instructions to:
  - transmit, to a user equipment (UE), a radio resource control (RRC) signaling indicating an uplink grant free transmission resource configuration for transmission and re-transmission of uplink data, wherein the uplink grant free transmission resource configuration includes a time resource, a frequency resource, reference signal (RS) resource information, and a periodicity of grant free transmission opportunities;
  - receive, from the UE, uplink data transmitted using uplink grant free transmission resources allocated based on the RRC signaling, without transmitting downlink control information (DCI) for the uplink grant free transmission resources; and
  - receive, from the UE, a re-transmission of uplink data.

29. The network equipment of claim 28, the computer-readable medium having stored thereon computer-executable instructions, that when executed by the processor cause the network equipment to:
- transmit, to the UE, a DCI message indicating a grant of uplink transmission resources for a re-transmission of the uplink data, wherein receiving
- the re-transmission of the uplink data based on the grant.

30. The network equipment of claim 29, wherein the RRC signaling further comprises a grant free UE identifier.

31. The network equipment of claim 29, wherein the DCI message comprises a new data indicator field set to a value of 1 indicating that the grant is for the re-transmission of the uplink data.

32. The network equipment of claim 28, wherein the RRC signaling further comprises a number of transmission repetitions of the uplink data.

33. The network equipment of claim 28, wherein the RRC signaling further comprises a number of configured HARQ processes.

34. The network equipment of claim 28, wherein the RRC signaling further comprises at least one of the following:
- power control parameters;
- a group identifier for a plurality of grant free UEs;
- a resource hopping pattern;
- a RS hopping pattern; and
- modulation and coding scheme (MCS) information.

35. The network equipment of claim 28, the computer-readable medium having stored thereon computer-executable instructions, that when executed by the processor cause the network equipment to: receive a re-transmission of the uplink data using the uplink grant free transmission resources.

36. The network equipment of claim 32, the computer-readable medium having stored thereon computer-executable instructions, that when executed by the processor cause the network equipment to: receive a re-transmission of the uplink data using the uplink grant free transmission resources until the number of transmission repetitions is reached.

* * * * *